United States Patent
Pavlish et al.

(10) Patent No.: US 11,179,673 B2
(45) Date of Patent: *Nov. 23, 2021

(54) SORBENTS FOR THE OXIDATION AND REMOVAL OF MERCURY

(71) Applicant: Midwest Energy Emissions Corp., Lewis Center, OH (US)

(72) Inventors: John H. Pavlish, East Grand Forks, MN (US); Edwin S. Olson, Grand Forks, ND (US); Michael J. Holmes, Thompson, ND (US)

(73) Assignee: Midwwest Energy Emission Corp., Corsicana, TX (US)

( * ) Notice: Subject to any disclaimer, the term of this patent is extended or adjusted under 35 U.S.C. 154(b) by 504 days.

This patent is subject to a terminal disclaimer.

(21) Appl. No.: 15/853,029

(22) Filed: Dec. 22, 2017

(65) Prior Publication Data

US 2018/0133646 A1 May 17, 2018

Related U.S. Application Data

(60) Continuation-in-part of application No. 15/295,594, filed on Oct. 17, 2016, now abandoned, which is a (Continued)

(51) Int. Cl.
*B01D 53/10* (2006.01)
*B01D 53/64* (2006.01)
(Continued)

(52) U.S. Cl.
CPC .............. *B01D 53/64* (2013.01); *B01D 53/10* (2013.01); *B01D 53/83* (2013.01); *B01J 20/027* (2013.01);
(Continued)

(58) Field of Classification Search
CPC ........ B01D 53/04; B01D 53/06; B01D 53/10; B01D 53/64; B01D 53/83;
(Continued)

(56) References Cited

U.S. PATENT DOCUMENTS 1,984,164 A 12/1934 Alfred
2,317,857 A 4/1943 Soday
(Continued)

FOREIGN PATENT DOCUMENTS

CA 1099490 A 4/1981
CA 2150529 A1 12/1995
(Continued)

OTHER PUBLICATIONS

U.S. Appl. No. 15/997,091, filed Jun. 4, 2018, Sorbents for the Oxidation and Removal of Mercury.
(Continued)

*Primary Examiner* — Frank M Lawrence, Jr.
(74) *Attorney, Agent, or Firm* — Schwegman Lundberg & Woessner, P.A.

(57) ABSTRACT

Various embodiments disclosed relate to sorbents for the oxidation and removal of mercury. The present invention includes removing mercury from a mercury-containing gas using a halide-promoted and optionally ammonium-protected sorbent that can include carbon sorbent, non-carbon sorbent, or a combination thereof.

23 Claims, 11 Drawing Sheets

Related U.S. Application Data continuation of application No. 14/102,896, filed on Dec. 11, 2013, now Pat. No. 9,468,886, which is a continuation of application No. 12/429,058, filed on Apr. 23, 2009, now Pat. No. 8,652,235, which is a continuation-in-part of application No. 12/201,595, filed on Aug. 29, 2008, now abandoned, which is a division of application No. 11/209,163, filed on Aug. 22, 2005, now Pat. No. 7,435,286, application No. 15/853,029, filed on Dec. 22, 2017, which is a continuation-in-part of application No. 15/382,114, filed on Dec. 16, 2016, now Pat. No. 10,828,596, which is a continuation-in-part of application No. 14/712,558, filed on May 14, 2015, now Pat. No. 10,589,225, which is a continuation of application No. 13/966,768, filed on Aug. 14, 2013, now Pat. No. 8,821,819, which is a continuation of application No. 13/427,665, filed on Mar. 22, 2012, now Pat. No. 8,512,655, which is a continuation of application No. 12/419,219, filed on Apr. 6, 2009, now Pat. No. 8,168,147, which is a continuation of application No. 12/201,595, filed on Aug. 29, 2008, now abandoned, which is a division of application No. 11/209,163, filed on Aug. 22, 2005, now Pat. No. 7,435,286, said application No. 15/382,114 is a continuation-in-part of application No. 14/195,360, filed on Mar. 3, 2014, now Pat. No. 9,669,355, said application No. 15/382,114 is a continuation-in-part of application No. 10/554,018, filed on Jan. 23, 2007, now Pat. No. 8,173,566.

(60) Provisional application No. 60/605,640, filed on Aug. 30, 2004, provisional application No. 61/773,549, filed on Mar. 6, 2013, provisional application No. 60/464,868, filed on Apr. 23, 2003.

(51) Int. Cl.
| | |
|---|---|
| *B01J 20/04* | (2006.01) |
| *B01D 53/83* | (2006.01) |
| *B01J 20/02* | (2006.01) |
| *B01J 20/10* | (2006.01) |
| *B01J 20/12* | (2006.01) |
| *B01J 20/20* | (2006.01) |
| *B01J 20/22* | (2006.01) |
| *B01J 20/28* | (2006.01) |
| *B01J 20/34* | (2006.01) |

(52) U.S. Cl.
CPC .......... *B01J 20/0262* (2013.01); *B01J 20/04* (2013.01); *B01J 20/041* (2013.01); *B01J 20/043* (2013.01); *B01J 20/10* (2013.01); *B01J 20/106* (2013.01); *B01J 20/12* (2013.01); *B01J 20/20* (2013.01); *B01J 20/223* (2013.01); *B01J 20/28004* (2013.01); *B01J 20/3416* (2013.01); *B01D 2251/108* (2013.01); *B01D 2251/206* (2013.01); *B01D 2253/102* (2013.01); *B01D 2257/602* (2013.01); *B01D 2258/0283* (2013.01); *B01J 2220/42* (2013.01)

(58) Field of Classification Search
CPC ........ B01D 2251/108; B01D 2251/206; B01D 2253/102; B01D 2257/602; B01D 2258/0283; B01J 20/0262; B01J 20/027; B01J 20/04; B01J 20/041; B01J 20/043; B01J 20/10; B01J 20/106; B01J 20/12; B01J 20/20; B01J 20/223; B01J 20/28004; B01J 20/3416; B01J 2220/42
USPC ..................... 95/134, 142; 110/345; 423/210
See application file for complete search history.

(56) References Cited

U.S. PATENT DOCUMENTS

| | | |
|---|---|---|
| 3,194,629 A | 7/1965 | Dreibelbis et al. |
| 3,341,185 A | 9/1967 | Kennedy, Sr. |
| 3,662,523 A | 5/1972 | Revoir et al. |
| 3,786,619 A | 1/1974 | Melkersson |
| 3,826,618 A | 7/1974 | Capuano |
| 3,849,267 A | 11/1974 | Hilgen et al. |
| 3,876,393 A | 4/1975 | Kasai et al. |
| 3,935,708 A | 2/1976 | Harrewijne et al. |
| 4,013,516 A | 3/1977 | Greenfield et al. |
| 4,094,777 A | 6/1978 | Sugier et al. |
| 4,101,631 A | 7/1978 | Ambrosini et al. |
| 4,196,173 A | 4/1980 | DeJong et al. |
| 4,338,896 A | 7/1982 | Papasideris |
| 4,342,192 A | 8/1982 | Heyn et al. |
| 4,500,327 A | 2/1985 | Nishino et al. |
| 4,530,765 A | 7/1985 | Sabherwal |
| 4,699,896 A | 10/1987 | Sing et al. |
| 4,708,853 A | 11/1987 | Matviya et al. |
| 4,772,455 A | 9/1988 | Izumi et al. |
| 4,786,483 A | 11/1988 | Audeh |
| 4,814,152 A | 3/1989 | Yan |
| 4,820,318 A | 4/1989 | Chang et al. |
| 4,889,698 A | 12/1989 | Moller et al. |
| 4,956,162 A | 9/1990 | Smith et al. |
| 5,245,120 A | 9/1993 | Srinivasachar et al. |
| 5,288,306 A | 2/1994 | Aibe et al. |
| 5,300,137 A | 4/1994 | Weyand et al. |
| 5,336,835 A | 8/1994 | McNamara |
| 5,346,674 A | 9/1994 | Weinwurm et al. |
| 5,409,522 A | 4/1995 | Durham et al. |
| 5,419,834 A | 5/1995 | Straten |
| 5,435,980 A | 7/1995 | Felsvang et al. |
| 5,462,908 A | 10/1995 | Liang et al. |
| 5,480,619 A | 1/1996 | Johnson et al. |
| 5,500,306 A | 3/1996 | Hsu et al. |
| 5,505,766 A | 4/1996 | Chang |
| 5,556,447 A | 9/1996 | Srinivasachar et al. |
| 5,569,436 A | 10/1996 | Lerner |
| 5,575,982 A | 11/1996 | Reiss et al. |
| 5,607,496 A | 3/1997 | Brooks |
| 5,672,323 A | 9/1997 | Bhat et al. |
| 5,695,726 A | 12/1997 | Lerner |
| 5,785,935 A | 7/1998 | Fristad et al. |
| 5,827,352 A | 10/1998 | Altman et al. |
| 5,891,324 A | 4/1999 | Ohtsuka |
| 6,001,762 A | 12/1999 | Harmer et al. |
| 6,013,593 A | 1/2000 | Lee et al. |
| 6,027,551 A | 2/2000 | Hwang et al. |
| 6,074,974 A | 6/2000 | Lee et al. |
| 6,080,281 A | 6/2000 | Attia |
| 6,103,205 A | 8/2000 | Wojtowicz et al. |
| 6,136,072 A | 10/2000 | Sjostrom et al. |
| 6,136,749 A | 10/2000 | Gadkaree et al. |
| 6,214,304 B1 | 4/2001 | Rosenthal et al. |
| 6,258,334 B1 | 7/2001 | Gadkaree et al. |
| 6,284,199 B1 | 9/2001 | Downs et al. |
| 6,342,462 B1 | 1/2002 | Kulprathipanja |
| 2,456,272 A1 | 2/2002 | Pahlman et al. |
| 6,372,187 B1 | 4/2002 | Madden et al. |
| 6,375,909 B1 | 4/2002 | Dangtran et al. |
| 6,383,981 B1 | 5/2002 | Blankenship et al. |
| 6,471,936 B1 | 10/2002 | Chen et al. |
| 6,475,451 B1 | 11/2002 | Leppin et al. |
| 6,475,471 B1 | 11/2002 | Wehrli |
| 6,528,030 B2 | 3/2003 | Madden et al. |
| 6,558,454 B1 | 5/2003 | Chang et al. |
| 6,576,585 B2 | 6/2003 | Fischer et al. |
| 6,579,507 B2 | 6/2003 | Pahlman et al. |

(56) References Cited

U.S. PATENT DOCUMENTS

| | | |
|---|---|---|
| 6,596,661 B2 | 7/2003 | Neufert |
| 6,610,263 B2 | 8/2003 | Pahlman et al. |
| 6,638,485 B1 | 10/2003 | Iida et al. |
| 6,719,828 B1 | 4/2004 | Lovell et al. |
| 6,808,692 B2 | 10/2004 | Oehr |
| 6,818,043 B1 | 11/2004 | Chang et al. |
| 6,848,374 B2 | 2/2005 | Srinivasachar et al. |
| 6,878,358 B2 | 4/2005 | Vosteen et al. |
| 6,942,840 B1 | 9/2005 | Broderick |
| 6,953,494 B2 | 10/2005 | Nelson, Jr. |
| 6,960,329 B2 | 11/2005 | Sellakumar |
| 7,017,330 B2 | 3/2006 | Bellows |
| 7,081,434 B2 | 7/2006 | Sinha |
| 7,124,591 B2 | 10/2006 | Baer et al. |
| 7,211,707 B2 | 5/2007 | Axtell et al. |
| 7,247,279 B2 | 7/2007 | Pahlman et al. |
| 7,293,414 B1 | 11/2007 | Huber |
| 7,361,209 B1 | 4/2008 | Durham et al. |
| 7,435,286 B2 | 10/2008 | Olson et al. |
| 7,442,239 B2 | 10/2008 | Armstrong et al. |
| 7,479,263 B2 | 1/2009 | Chang et al. |
| 7,514,052 B2 | 4/2009 | Lissianski et al. |
| 7,521,032 B2 | 4/2009 | Honjo et al. |
| 7,544,338 B2 | 6/2009 | Honjo et al. |
| 7,563,311 B2 | 7/2009 | Graham |
| 7,611,564 B2 | 11/2009 | Mcchesney et al. |
| 7,622,092 B2 | 11/2009 | Honjo et al. |
| 7,722,843 B1 | 5/2010 | Srinivasachar |
| 7,767,174 B2 | 8/2010 | Liu et al. |
| 7,780,765 B2 | 8/2010 | Srinivasachar et al. |
| 7,938,571 B1 | 5/2011 | Irvine |
| 7,942,566 B1 | 5/2011 | Irvine |
| 8,007,749 B2 | 8/2011 | Chang et al. |
| 8,080,088 B1 | 12/2011 | Srinivasachar |
| 8,124,036 B1 | 2/2012 | Baldrey et al. |
| 8,168,147 B2 | 5/2012 | Olson et al. |
| 8,168,149 B2 | 5/2012 | Gal et al. |
| 8,173,566 B2 | 5/2012 | Olson et al. |
| 8,216,535 B2 | 7/2012 | Pollack et al. |
| 8,512,655 B2 | 8/2013 | Olson et al. |
| 8,652,235 B2 | 2/2014 | Olson et al. |
| 8,821,819 B2 | 9/2014 | Olson et al. |
| 9,011,805 B2 | 4/2015 | Olson et al. |
| 9,468,886 B2 | 10/2016 | Olson et al. |
| 9,662,629 B2 | 5/2017 | Olson et al. |
| 9,669,355 B2 | 6/2017 | Olson et al. |
| 9,757,689 B2 | 9/2017 | Olson et al. |
| 10,343,114 B2 | 7/2019 | Olson et al. |
| 10,589,225 B2 | 3/2020 | Olson et al. |
| 10,596,517 B2 | 3/2020 | Olson et al. |
| 10,668,430 B2 | 6/2020 | Olson et al. |
| 10,828,596 B2 | 11/2020 | Olson |
| 2001/0002387 A1 | 5/2001 | Tsutsumi et al. |
| 2001/0003116 A1 | 6/2001 | Neufert |
| 2002/0033097 A1 | 3/2002 | El-shoubary et al. |
| 2002/0043496 A1 | 4/2002 | Boddu et al. |
| 2002/0114749 A1 | 8/2002 | Cole |
| 2002/0134242 A1 | 9/2002 | Yang et al. |
| 2002/0150516 A1 | 10/2002 | Pahlman et al. |
| 2002/0198097 A1* | 12/2002 | El-Shoubary ............ B01J 20/20 502/56 |
| 2003/0057293 A1 | 3/2003 | Boecking |
| 2003/0104937 A1 | 6/2003 | Sinha |
| 2003/0113239 A1 | 6/2003 | Pahlman et al. |
| 2003/0136509 A1 | 7/2003 | Virtanen |
| 2003/0161771 A1 | 8/2003 | Oehr |
| 2003/0206843 A1 | 11/2003 | Sidney, Jr. |
| 2003/0206846 A1 | 11/2003 | Jangbarwala |
| 2004/0003716 A1 | 1/2004 | Nelson, Jr. |
| 2004/0013589 A1 | 1/2004 | Vosteen et al. |
| 2004/0076570 A1 | 4/2004 | Jia |
| 2004/0086439 A1* | 5/2004 | Vosteen ................ B01D 53/64 423/210 |
| 2004/0109800 A1 | 6/2004 | Pahlman et al. |
| 2004/0244657 A1 | 12/2004 | Srinivasachar et al. |
| 2005/0000197 A1 | 1/2005 | Krantz |
| 2005/0019240 A1 | 1/2005 | Lu et al. |
| 2005/0039598 A1* | 2/2005 | Srinivasachar ........ B01D 53/10 95/134 |
| 2005/0074380 A1 | 4/2005 | Boren et al. |
| 2005/0147549 A1 | 7/2005 | Lissianski et al. |
| 2005/0227146 A1 | 10/2005 | Ghantous et al. |
| 2005/0274307 A1 | 12/2005 | Lissianski et al. |
| 2006/0048646 A1 | 3/2006 | Olson et al. |
| 2006/0057044 A1 | 3/2006 | Chang et al. |
| 2006/0112823 A1 | 6/2006 | Avina |
| 2006/0191835 A1 | 8/2006 | Petrik et al. |
| 2006/0204418 A1 | 9/2006 | Chao et al. |
| 2007/0167309 A1 | 7/2007 | Olson |
| 2007/0168213 A1 | 7/2007 | Comrie |
| 2007/0180990 A1 | 8/2007 | Downs et al. |
| 2007/0234902 A1 | 10/2007 | Fair et al. |
| 2007/0259781 A1 | 11/2007 | Sinha |
| 2007/0295347 A1 | 12/2007 | Paine et al. |
| 2008/0090951 A1 | 4/2008 | Mao et al. |
| 2008/0107579 A1* | 5/2008 | Downs .................. B01D 53/10 423/210 |
| 2008/0134888 A1 | 6/2008 | Chao et al. |
| 2008/0182747 A1 | 7/2008 | Sinha |
| 2008/0207443 A1 | 8/2008 | Gadkaree et al. |
| 2008/0292512 A1 | 11/2008 | Kang |
| 2009/0031708 A1 | 2/2009 | Schmidt |
| 2009/0062119 A1 | 3/2009 | Olson et al. |
| 2009/0081092 A1 | 3/2009 | Yang et al. |
| 2009/0136401 A1 | 5/2009 | Yang et al. |
| 2009/0235848 A1 | 9/2009 | Eiteneer et al. |
| 2009/0320678 A1 | 12/2009 | Chang et al. |
| 2010/0047146 A1 | 2/2010 | Olson et al. |
| 2011/0076210 A1 | 3/2011 | Pollack et al. |
| 2011/0168018 A1 | 7/2011 | Mohamadalizadeh et al. |
| 2011/0195003 A1* | 8/2011 | Durham ................ B01D 53/64 423/210 |
| 2011/0229388 A1 | 9/2011 | Gadgil et al. |
| 2012/0183458 A1 | 7/2012 | Olson et al. |
| 2013/0276682 A1* | 10/2013 | Durham ................... F23J 7/00 110/342 |
| 2013/0280156 A1 | 10/2013 | Olson et al. |
| 2014/0056787 A1 | 2/2014 | Olson et al. |
| 2014/0099244 A1 | 4/2014 | Olson et al. |
| 2014/0140908 A1 | 5/2014 | Nalepa et al. |
| 2014/0224121 A1 | 8/2014 | Mimna et al. |
| 2014/0255279 A1 | 9/2014 | Olson et al. |
| 2014/0308188 A1 | 10/2014 | Olson et al. |
| 2015/0098878 A1 | 4/2015 | Olson |
| 2015/0246315 A1 | 9/2015 | Olson et al. |
| 2017/0056853 A1 | 3/2017 | Mimna et al. |
| 2017/0100692 A1 | 4/2017 | Olson et al. |
| 2017/0128908 A1 | 5/2017 | Olson et al. |
| 2017/0173524 A1 | 6/2017 | Olson et al. |
| 2017/0173557 A1 | 6/2017 | Olson et al. |
| 2017/0239644 A1 | 8/2017 | Boren et al. |
| 2018/0229182 A1 | 8/2018 | Olson et al. |
| 2018/0257030 A1 | 9/2018 | Olson et al. |
| 2018/0257031 A1 | 9/2018 | Olson et al. |
| 2018/0280870 A1 | 10/2018 | Olson et al. |
| 2019/0329179 A1 | 10/2019 | Olson et al. |
| 2019/0329215 A1 | 10/2019 | Olson et al. |
| 2019/0336913 A1 | 11/2019 | Olson et al. |
| 2021/0129079 A1 | 5/2021 | Olson et al. |
| 2021/0170332 A1 | 6/2021 | Olson et al. |

FOREIGN PATENT DOCUMENTS

| | | |
|---|---|---|
| CA | 2327602 A1 | 6/2001 |
| CA | 2400898 A1 | 8/2001 |
| CA | 2584327 A1 | 4/2006 |
| CA | 2757309 A1 | 10/2010 |
| CA | 2757309 C | 1/2017 |
| CN | 1048173 A | 1/1991 |
| CN | 101048218 A | 10/2007 |
| CN | 101053820 A | 10/2007 |
| CN | 101293196 A | 10/2008 |
| CN | 101816922 A | 9/2010 |

(56) References Cited

FOREIGN PATENT DOCUMENTS

| | | |
|---|---|---|
| CN | 102413899 A | 4/2012 |
| CN | 104519410 A | 4/2015 |
| CN | 105188910 A | 12/2015 |
| CN | 104619410 B | 5/2016 |
| CN | 107661744 | 2/2018 |
| DE | 3426059 A1 | 1/1986 |
| DE | 3816600 A1 | 11/1989 |
| DE | 10233173 A1 | 2/2004 |
| DE | 202012003747 U1 | 11/2012 |
| EP | 0208490 A1 | 1/1987 |
| EP | 1386655 A1 | 2/2004 |
| EP | 1458474 | 9/2004 |
| EP | 1570894 A1 | 9/2005 |
| FR | 2529802 | 1/1984 |
| GB | 2122916 A | 1/1984 |
| JP | 4953590 A | 5/1974 |
| JP | 4953593 A | 5/1974 |
| JP | 4966592 A | 6/1974 |
| JP | 4943197 B4 | 11/1974 |
| JP | 506438 B4 | 3/1975 |
| JP | 51003386 A | 1/1976 |
| JP | 544868 A | 1/1979 |
| JP | 50145324 A | 3/1980 |
| JP | 09256812 | 9/1997 |
| KR | 1020027006149 | 7/2002 |
| SU | 732207 A1 | 5/1980 |
| SU | 1163982 A | 6/1985 |
| WO | WO-0162368 A1 | 8/2001 |
| WO | WO-0228513 A2 | 4/2002 |
| WO | WO-03072241 A1 | 9/2003 |
| WO | WO-2004089501 A2 | 10/2004 |
| WO | WO-2004094024 A2 | 11/2004 |
| WO | WO-2006039007 A2 | 4/2006 |
| WO | WO-2006039007 A3 | 4/2006 |
| WO | WO-2006099611 A1 | 9/2006 |
| WO | WO-2009018539 A3 | 2/2009 |
| WO | WO-2010123609 A1 | 10/2010 |
| WO | WO-2013162968 A2 | 10/2013 |
| WO | WO-2013162968 A3 | 10/2013 |
| WO | WO-2014137907 A2 | 9/2014 |

OTHER PUBLICATIONS

U.S. Appl. No. 11/209,163 U.S. Pat. No. 7,435,286, filed Aug. 22, 2005, Sorbents for the Oxidation and Removal of Mercury.
U.S. Appl. No. 12/201,595, filed Aug. 29, 2008, Sorbents for the Oxidation and Removal of Mercury.
U.S. Appl. No. 12/419,219 U.S. Pat. No. 8,168,147, filed Apr. 6, 2009, Sorbents for the Oxidation and Removal of Mercury.
U.S. Appl. No. 13/427,665 U.S. Pat. No. 8,512,655, filed Mar. 22, 2012, Sorbents for the Oxidation and Removal of Mercury.
U.S. Appl. No. 13/966,768 U.S. Pat. No. 8,821,819, filed Aug. 14, 2013, Sorbents for the Oxidation and Removal of Mercury.
U.S. Appl. No. 14/712,558, filed May 14, 2015, Sorbents for the Oxidation and Removal of Mercury.
U.S. Appl. No. 15/951,970, filed Apr. 12, 2018, Sorbents for the Oxidation and Removal of Mercury.
U.S. Appl. No. 15/974,343, filed May 8, 2018, Sorbents for the Oxidation and Removal of Mercury.
U.S. Appl. No. 10/554,018 U.S. Pat. No. 8,173,566, filed Jan. 23, 2007, Process for Regenerating a Spent Sorbent.
U.S. Appl. No. 14/195,360 U.S. Pat. No. 9,669,355, filed Mar. 3, 2014, Activated Carbon Sorbent Including Nitrogen and Methods of Using the Same.
U.S. Appl. No. 15/382,114, filed Dec. 16, 2016, Promoted Ammonium Salt-Protected Activated Carbon Sorbent Particles for Removal of Mercury From Gas Streams.
U.S. Appl. No. 12/429,058 U.S. Pat. No. 8,652,235, filed Apr. 23, 2009, Sorbents for the Oxidation and Removal of Mercury.
U.S. Appl. No. 14/102,896 U.S. Pat. No. 9,468,886, filed Dec. 11, 2013, Sorbents for the Oxidation and Removal of Mercury.
U.S. Appl. No. 15/295,594, filed Oct. 17, 2016, Sorbents for the Oxidation and Removal of Mercury.
U.S. Appl. No. 15/978,760, filed May 14, 2018, Sorbents for the Oxidation and Removal of Mercury.
"U.S. Appl. No. 14/712,558, Supplemental Amendment filed Jun. 13, 2018", 14 pgs.
"U.S. Appl. No. 14/712,558, Amendment and Response filed Dec. 3, 2018 to Non Final Office Action dated Oct. 19, 2018", 28 pgs.
"U.S. Appl. No. 15/978,760, Amendment and Response filed Dec. 3, 2018 to Non Final Office Action dated Oct. 10, 2018", 25 pgs.
"U.S. Appl. No. 15/974,343, Amendment and Response filed Dec. 3, 2018 to Non Final Office Action dated Oct. 29, 2018", 37 pgs.
"U.S. Appl. No. 15/974,343, Final Office Action dated Jan. 14, 2019", 25 pgs.
"U.S. Appl. No. 14/712,558, Final Office Action dated Jan. 11, 2019", 27 pgs.
"U.S. Appl. No. 15/997,091, Final Office Action dated Jan. 11, 2019", 20 pgs.
"U.S. Appl. No. 15/978,760, Final Office Action dated Dec. 26, 2018", 21 pgs.
"U.S. Appl. No. 15/997,091, Response filed Dec. 3, 2018 Non Final Office Action dated Nov. 2, 2018", 40 pgs.
"U.S. Appl. No. 15/382,114, Non Final Office Action dated Dec. 12, 2018", 46 pgs.
"U.S. Appl. No. 15/978,760, Non Final Office Action dated Oct. 10, 2018", 17 pgs.
"U.S. Appl. No. 14/712,558, Non-Final Office Action dated Oct. 19, 2018", 35 pgs.
"U.S. Appl. No. 14/712,558, Non Final Office Action dated Oct. 19, 2018", 26 pgs.
"U.S. Appl. No. 15/295,594, Non Final Office Action dated Oct. 23, 2018", 20 pgs.
"U.S. Appl. No. 15/974,343, Non Final Office Action dated Oct. 29, 2018", 22 pgs.
"U.S. Appl. No. 15/997,091, Non Final Office Action dated Nov. 2, 2018", 27 pgs.
"Activated carbon", Wikipedia, [Online] Retrieved from the Internet: <URL: https://en.wikipedia.org/wiki/Activated_carbon>, (Retrieved on May 11, 2020), 21 pgs.
"U.S. Appl. No. 14/712,558, Notice of Allowance dated Dec. 13, 2019", 7 pgs.
"U.S. Appl. No. 15/382,114, Non Final Office Action dated Dec. 31, 2019", 33 pgs.
"U.S. Appl. No. 15/382,114, Notice of Allowance dated Aug. 10, 2020", 11 pgs.
"U.S. Appl. No. 15/382,114, Response filed Jun. 30, 2020 to Non Final Office Action dated Dec. 31, 2019", 21 pgs.
"U.S. Appl. No. 15/951,970, Non Final Office Action dated May 27, 2020", 26 pgs.
"U.S. Appl. No. 15/974,343, Notice of Allowance dated Apr. 13, 2020", 7 pgs.
"U.S. Appl. No. 15/974,343, Response filed Apr. 2, 2020 to Non-Final Office action filed Dec. 2, 2019", 13 pgs.
"U.S. Appl. No. 16/509,071, Final Office Action dated Dec. 12, 2019", 23 pgs.
"U.S. Appl. No. 16/509,071, Non Final Office Action dated May 29, 2020", 31 pgs.
"U.S. Appl. No. 16/509,071, Response filed May 12, 2020 to Final Office Action dated Dec. 12, 2019", 31 pgs.
"U.S. Appl. No. 16/509,102, Final Office Action dated Feb. 14, 2020", 13 pgs.
"U.S. Appl. No. 16/509,146, Final Office Action dated Feb. 14, 2020", 23 pgs.
"DARCO Hg, Powdered Activated Carbon Data SHeet", CABOT Corp., (Oct. 24, 2017), 2 pgs.
"Fluegas Properties Calculator", Increase Performance Inc., [Online] Retrieved from the Internet: <URL: http://www.increase-performance.com/calc-flue-gas-prop.html>, (Retrieved on May 11, 2020), 1 pg.
"STEAM Table 8a, 8b", Steam: Its Generation and Use 42nd Ed, (2015), 2 pgs.
"Coal Combustion Products (CCPs): Characteristics, Utilization and Beneficiation", Edited by Tom Robl, et al., Woodhead Publishing (Elsevier), (2017), 565 pgs.

(56) References Cited

OTHER PUBLICATIONS

"U.S. Appl. No. 15/978,760, Ex Parte Quayle Action dated Apr. 19, 2019", 13 pgs.
"U.S. Appl. No. 15/295,594, Response filed Apr. 23, 2019 to Non Final Office Action dated Oct. 23, 2018", 45 pgs.
"U.S. Appl. No. 15/978,760, Response filed Apr. 23, 2019 to Ex Parte Quayle Action dated Apr. 19, 2019", 15 pgs.
"U.S. Appl. No. 15/978,760, Notice of Allowance dated May 8, 2019", 7 pgs.
"U.S. Appl. No. 15/978,760, Notice of Allowability dated May 30, 2019", 3 pgs.
"Control of Mercury Emissions from Coal Fired Electric Utility Boilers: An Update", US EPA Air Pollution Prevention and Control Division, National Risk Management Research Laboratory, Office of Research and Development, (Feb. 18, 2005), 59 pgs.
"Sorbent Enhancement Additives for Mercury Control", US DOE Office of Fossil Energy, National Energy Technology Laboratory, (Jun. 2008), 4 pgs.
"U.S. Appl. No. 15/978,760, Response filed Mar. 20, 2019 to Final Office Action dated Dec. 26, 2018", 90 pgs.
"U.S. Appl. No. 15/382,114, Response filed Mar. 12, 2019 to Non Final Office Action dated Dec. 12, 2018", 24 pgs.
Benson, Steven A., "Pilot-and Full-Scale Demonstration of Advanced Mercury Control Technologies for Lignite-Fired Power Plants", University of North Dakota Energy and Environmental Research Center, (Feb. 2005), 97 pgs.
Benson, Steven A., "JV Task 73—Mercury Control Technologies for Electric Utilities Burning Subbituminous Coals—Draft Final Report", University of North Dakota Energy and Environmental Research Center, (Jun. 2005), 165 pgs.
Berry, Mark, "Mercury control evaluation of calcium bromide injection into a PRB-fired furnace with an SCR", Proc. of the Air Quality VI Conference, Arlington, VA, (2007), 9 pgs.
Brown, Thomas D., "Mercury Measurement and Its Control: What We Know, Have Learned, and Need to Further Investigate", Journal of the Air and Waste Management Association, 49(6), (Jun. 1999), 98 pgs.
Feeley, Thomas J., "A Review of DOE NETL's Mercury Control Technology R and D Program for Coal-Fired Power Plants", DOE NETL Hg R and D Program Review, (Apr. 2003), 32 pgs.
French, Charles L., "Study of Hazardous Air Pollutant Emissions from Electric Utility Steam Generating Units—Final Report to Congress: vol. 1", US EPA Office of Air Quality Planning and Standards, (Feb. 1998), 502 pgs.
Ghorishi, Behrooz S., "In-Flight Capture of Elemental Mercury by Chlorine-Impregnated Activated Carbon", Proc. of the 94th Annual Meeting of the Air and Waste Management Association, Orlando, FL, (Jun. 2001), 14 pgs.
Jones, Andrew P., "DOE NETL's Phase II Mercury Control Technology Field Testing Program: Preliminary Economic Analysis of Activated Carbon Injection", Environmental Science and Technology, 41(4), (2007), 7 pgs.
Keating, Martha H., "Mercury Study Report to Congress vol. 1: Executive Summary", US EPA Office of Air Quality Planning and Standards, (Dec. 1997), 95 pgs.
Kilgroe, James D., "Control of Mercury Emissions from Coal-Fired Electric Utility Boilers: Interim Report", US EPA Office of Research and Development, National Risk Management Laboratory, Air Pollution Prevention and Control Division, (Dec. 2001), 485 pgs.
Nelson, Sid Jr., "How China Can Leapfrog the World in Mercury Emission Reductions", Proc. of the AWMA Intl. Specialty Conference on Leapfrogging Opportunities for Air Quality Improvement, (2010), 24 pgs.
Pavlish, John H., "Status review of mercury control options for coal-fired power plants", Fuel Processing Technology, vol. 82, (2003), 77 pgs.
Yang, Yang, "Effect of HBr formation on mercury oxidation via CaBr(2) addition to coal during combustion", RSC Advances, 6(64), (2016), 7 pgs.

U.S. Appl. No. 16/509,071, filed Jul. 11, 2019, Sorbents for the Oxidation and Removal of Mercury.
U.S. Appl. No. 16/509,102, filed Jul. 11, 2019, Treatment of Coal With Mercury Control Additives.
U.S. Appl. No. 16/509,146, filed Jul. 11, 2019, Sorbents for the Oxidation and Removal of Mercury.
"U.S. Appl. No. 15/295,594, Response filed Jul. 24, 2018 to Restriction Requirement dated Jun. 29, 2018", 9 pgs.
"U.S. Appl. No. 15/997,091, Non Final Office Action dated Jul. 27, 2018", 13 pgs.
"U.S. Appl. No. 15/974,343, Non Final Office Action dated Jul. 27, 2018", 12 pgs.
"U.S. Appl. No. 15/997,091,Response filed Aug. 14, 2018 to Non Final Office Action dated Jul. 27, 2018", 10 pgs.
"U.S. Appl. No. 15/974,343, Response filed Aug. 14, 2018 to Non Final Office Action dated Jul. 27, 2018", 11 pgs.
"U.S. Appl. No. 14/712,558, Response filed Aug. 14, 2018 to Non Final Office Action dated Jul. 2, 2018", 11 pgs.
"U.S. Appl. No. 15/382,114, Restriction Requirement dated Aug. 28, 2018", 9 pgs.
"U.S. Appl. No. 15/382,114, Response filed Sep. 12, 2018 to Restriction Requirement dated Aug. 28, 2018", 8 pgs.
"Canadian Application Serial No. 2,871,422, Office Action dated Aug. 31, 2017", 4 pgs.
"Chinese Application Serial No. 201480025701.9, Response filed Mar. 27, 2018 to Office Action dated Jan. 16, 2018", w English Claims, 20 pgs.
"Canadian Application Serial No. 2,871,422, Office Action dated Apr. 24, 2018", 4 pgs.
"U.S. Appl. No. 14/712,558, Non Final Office Action dated Jul. 2, 2018", 16 pgs.
"U.S. Appl. No. 15/295,594, Restriction Requirement dated Jun. 29, 2018", 5 pgs.
"U.S. Appl. No. 15/978,760, Non Final Office Action dated Jun. 29, 2018", 9 pgs.
"U.S. Appl. No. 15/295,594, Response filed Jul. 3, 2018 to Restriction Requirement dated May 22, 2018", 9 pgs.
"Response filed Sep. 4, 2017 to Notification Regarding Rule 164 and Article 94(3) EPC dated Apr. 24, 2017", 7 pgs.
"U.S. Appl. No. 15/978,760 , Response filed Jul. 13, 2018 to Non Final Office Action dated Jun. 29, 2018", 12 pgs.
"Canadian Application Serial No. 2,871,422, Response filed Feb. 26, 2018 to Office Action dated Aug. 31, 2017", w Amended Claims, 53 pgs.
"European Application Serial No. 13719338.9, Notification Regarding Rule 164 and Article 94(3) EPC dated Apr. 24, 2017", 8 pgs.
"Database WPI Week 197450", Thomson Scientific, London, GB; AN 1974-86199V XP002514926.
"Canadian Application Serial No. 2,871,422, Response filed Jun. 21, 2017 to Office Action dated Dec. 22, 2016", 41 pgs.
"Chinese Application Serial No. 201480025701.9, Office Action dated Jan. 16, 2018", (English Translation), 8 pgs.
"U.S. Appl. No. 10/554,018 Response filed Nov. 1, 2010 to Final Office Action dated Apr. 27, 2010", 17 pgs.
"U.S. Appl. No. 10/554,018, Final Office Action dated Apr. 27, 2010", 8 pgs.
"U.S. Appl. No. 10/554,018, Non Final Office Action dated Oct. 6, 2009", 8 pgs.
"U.S. Appl. No. 10/554,018, Notice of Allowance dated Jan. 19, 2012", 7 pgs.
"U.S. Appl. No. 10/554,018, Response filed Feb. 8, 2010 to Non Final Office Action dated Oct. 6, 2009", 9 pgs.
"U.S. Appl. No. 10/554,018, Response filed Aug. 10, 2009 to Restriction Requirement dated Jun. 9, 2009", 1 pg.
"U.S. Appl. No. 10/554,018, Restriction Requirement dated Jun. 9, 2009", 5 pgs.
"U.S. Appl. No. 11/209,163, Advisory Action dated Apr. 21, 2008", 3 pgs.
"U.S. Appl. No. 11/209,163, Final Office Action dated Jan. 23, 2008", 20 pgs.
"U.S. Appl. No. 11/209,163, Non Final Office Action dated Aug. 13, 2007", 14 pgs.

(56) References Cited

OTHER PUBLICATIONS

"U.S. Appl. No. 11/209,163, Notice of Allowance dated Jul. 14, 2008", 7 pgs.
"U.S. Appl. No. 11/209,163, Preliminary Amendment filed Feb. 27, 2007", 9 pgs.
"U.S. Appl. No. 11/209,163, Response filed Mar. 24, 2008 to Final Office Action dated Jan. 23, 2008", 29 pgs.
"U.S. Appl. No. 11/209,163, Response filed Jul. 9, 2007 to Restriction Requirement dated Jun. 7, 2007", 2 pgs.
"U.S. Appl. No. 11/209,163, Response filed Nov. 13, 2007 to Non Final Office Action dated Aug. 13, 2007", 19 pgs.
"U.S. Appl. No. 11/209,163, Restriction Requirement dated Jun. 7, 2007", 6 pgs.
"U.S. Appl. No. 12/184,860, Examiner Interview Summary dated Apr. 5, 2011", 3 pgs.
"U.S. Appl. No. 12/184,860, Final Office Action dated May 11, 2011", 15 pgs.
"U.S. Appl. No. 12/184,860, Non Final Office Action dated Jan. 19, 2011", 14 pgs.
"U.S. Appl. No. 12/184,860, Response filed Apr. 7, 2011 to Non Final Office Action dated Jan. 19, 2011", 12 pgs.
"U.S. Appl. No. 12/184,860, Response filed Jul. 8, 2011 to Final Office Action dated May 11, 2011", 11 pgs.
"U.S. Appl. No. 12/201,595, Final Office Action dated Mar. 10, 2010", 13 pgs.
"U.S. Appl. No. 12/201,595, Non Final Office Action dated Apr. 16, 2009", 21 pgs.
"U.S. Appl. No. 12/201,595, Response filed Oct. 16, 2009 to Non Final Office Action dated Apr. 16, 2009", 18 pgs.
"U.S. Appl. No. 12/419,219, Final Office Action dated Oct. 14, 2010", 17 pgs.
"U.S. Appl. No. 12/419,219, Non Final Office Action dated Jun. 15, 2010", 13 pgs.
"U.S. Appl. No. 12/419,219, Non Final Office Action dated Feb. 23, 2011", 17 pgs.
"U.S. Appl. No. 12/419,219, Non Final Office Action dated Aug. 4, 2011", 16 pgs.
"U.S. Appl. No. 12/419,219, Notice of Allowance dated Jan. 10, 2012", 7 pgs.
"U.S. Appl. No. 12/419,219, Preliminary Amendment filed Apr. 6, 2009", 7 pgs.
"U.S. Appl. No. 12/419,219, Response filed Feb. 14, 2011 to Final Office Action dated Oct. 14, 2010", 19 pgs.
"U.S. Appl. No. 12/419,219, Response filed May 20, 2011 to Non Final Office Action dated Feb. 23, 2011", 14 pgs.
"U.S. Appl. No. 12/419,219, Response filed Jul. 15, 2010 to Non Final Office Action dated Jan. 15, 2020", 22 pgs.
"U.S. Appl. No. 12/419,219, Response filed Oct. 27, 2011 to Non Final Office Action dated Aug. 4, 2011", 12 pgs.
"U.S. Appl. No. 12/429,058, Advisory Action dated May 29, 2012", 3 pgs.
"U.S. Appl. No. 12/429,058, Ex Parte Quayle Action dated Feb. 14, 2013", 7 pgs.
"U.S. Appl. No. 12/429,058, Examiner Interview Summary dated Dec. 28, 2012", 4 pgs.
"U.S. Appl. No. 12/429,058, Final Office Action dated Oct. 31, 2012", 21 pgs.
"U.S. Appl. No. 12/429,058, Final Office Action dated Dec. 20, 2011", 21 pgs.
"U.S. Appl. No. 12/429,058, Non Final Office Action dated Jun. 11, 2012", 18 pgs.
"U.S. Appl. No. 12/429,058, Non Final Office Action dated Jul. 19, 2011", 20 pgs.
"U.S. Appl. No. 12/429,058, Notice of Allowance dated Jan. 16, 2014", 5 pgs.
"U.S. Appl. No. 12/429,058, Notice of Allowance dated Sep. 11, 2013", 11 pgs.
"U.S. Appl. No. 12/429,058, Response filed Jan. 31, 2013 to Final Office Action dated Oct. 31, 2012", 19 pgs.
"U.S. Appl. No. 12/429,058, Response filed Mar. 7, 2013 to Ex Parte Quayle Action dated Feb. 14, 2013", 7 pgs.
"U.S. Appl. No. 12/429,058, Response filed May 11, 2012 to Final Office Action dated Dec. 20, 2011", 11 pgs.
"U.S. Appl. No. 12/429,058, Response filed Sep. 11, 2012 to Non Final Office Action dated Jun. 11, 2012", 16 pgs.
"U.S. Appl. No. 12/429,058, Response filed Oct. 18, 2011 to Non Final Office Action dated Jul. 19, 2011", 17 pgs.
"U.S. Appl. No. 13/427,665, Non Final Office Action dated Jan. 4, 2013", 23 pgs.
"U.S. Appl. No. 13/427,665, Non Final Office Action dated Aug. 3, 2012", 12 pgs.
"U.S. Appl. No. 13/427,665, Notice of Allowance dated Apr. 16, 2013", 8 pgs.
"U.S. Appl. No. 13/427,665, Response filed Mar. 21, 2013 to Non Final Office Action dated Jan. 4, 2013", 20 pgs.
"U.S. Appl. No. 13/427,665, Response filed Oct. 10, 2012 to Non Final Office Action dated Aug. 3, 2012", 15 pgs.
"U.S. Appl. No. 13/427,685, Preliminary Amendment filed Mar. 22, 2012", 3 pgs.
"U.S. Appl. No. 13/453,274, Advisory Action dated Nov. 24, 2014", 3 pgs.
"U.S. Appl. No. 13/453,274, Final Office Action dated Oct. 16, 2014", 4 pgs.
"U.S. Appl. No. 13/453,274, Non Final Office Action dated May 30, 2014", 6 pgs.
"U.S. Appl. No. 13/453,274, Notice of Allowance dated Jan. 5, 2015", 5 pgs.
"U.S. Appl. No. 13/453,274, Response filed Sep. 2, 2014 to Non Final Office Action dated May 30, 2014", 13 pgs.
"U.S. Appl No. 13/453,274, Response filed Nov. 6, 2014 to Final Office Action dated Oct. 16, 2014", 7 pgs.
"U.S. Appl. No. 13/453,274, Response filed Dec. 9, 2014 to Advisory Action dated Nov. 24, 2014", 6 pgs.
"U.S. Appl. No. 13/966,768, Non Final Office Action dated Dec. 6, 2013", 7 pgs.
"U.S. Appl. No. 13/966,768, Notice of Allowability dated Aug. 1, 2014", 6 pgs.
"U.S. Appl. No. 13/966,768, Notice of Allowance dated Apr. 18, 2014", 7 pgs.
"U.S. Appl. No. 13/966,768, Preliminary Amendment filed Aug. 14, 2013", 3 pgs.
"U.S. Appl. No. 13/966,768, Response filed Mar. 6, 2014 to Non Final Office Action dated Dec. 6, 2013", 6 pgs.
"U.S. Appl. No. 13/966,768, Supplemental Preliminary Amendment filed Aug. 15, 2013", 6 pgs.
"U.S. Appl. No. 14/102,896, Advisory Action dated Dec. 16, 2016", 3 pgs.
"U.S. Appl. No. 14/102,896, Final Office Action dated Aug. 26, 2015", 12 pgs.
"U.S. Appl. No. 14/102,896, Non Final Office Action dated Mar. 23, 2015", 13 pgs.
"U.S. Appl. No. 14/102,896, Notice of Allowance dated Jun. 10, 2016", 7 pgs.
"U.S. Appl. No. 14/102,896, Response filed Jan. 22, 2016 to Advisory Action dated Dec. 16, 2015", 11 pgs.
"U.S. Appl. No. 14/102,896, Response filed Jun. 22, 2015 to Non Final Office Action dated Mar. 23, 2015", 10 pgs.
"U.S. Appl. No. 14/102,896, Response filed Nov. 24, 2015 to Final Office Action dated Aug. 26, 2015", 5 pgs.
"U.S. Appl. No. 14/195,360, Corrected Notice of Allowance dated Feb. 27, 2017", 2 pgs.
"U.S. Appl. No. 14/195,360, Corrected Notice of Allowance dated Mar. 29, 2017", 2 pgs.
"U.S. Appl. No. 14/195,360, Final Office Action dated Mar. 18, 2016", 18 pgs.
"U.S. Appl. No. 14/195,360, Final Office Action dated Nov. 22, 2016", 7 pgs.
"U.S. Appl. No. 14/195,360, Non Final Office Action dated Jul. 20, 2016", 11 pgs.
"U.S. Appl. No. 14/195,360, Non Final Office Action dated Jun. 20, 2016", 11 pgs.

(56) References Cited

OTHER PUBLICATIONS

"U.S. Appl. No. 14/195,360, Non Final Office Action dated Nov. 24, 2015", 19 pgs.
"U.S. Appl. No. 14/195,360, Notice of Allowance dated Feb. 7, 2017", 5 pgs.
"U.S. Appl. No. 14/195,360, Response filed Jan. 18, 2017 to Final Office Action dated Nov. 22, 2016", 7 pgs.
"U.S. Appl. No. 14/195,360, Response filed Feb. 22, 2016 to Non Final Office Action dated Nov. 24, 2015", 21 pgs.
"U.S. Appl. No. 14/195,360, Response filed May 17, 2016 to Final Office Action dated Mar. 18, 2016", 15 pgs.
"U.S. Appl. No. 14/318,270, Advisory Action dated Feb. 17, 2017", 4 pgs.
"U.S. Appl. No. 14/318,270, Corrected Notice of Allowance dated May 22, 2017", 2 pgs.
"U.S. Appl. No. 14/318,270, Final Office Action dated Nov. 25, 2016", 25 pgs.
"U.S. Appl. No. 14/318,270, Non Final Office Action dated Jun. 2, 2016", 24 pgs.
"U.S. Appl. No. 14/318,270, Notice of Allowance dated May 15, 2017", 8 pgs.
"U.S. Appl. No. 14/318,270, Response filed Jan. 25, 2017 to Final Office Action dated Nov. 25, 2016", 14 pgs.
"U.S. Appl. No. 14/318,270, Response filed Feb. 27, 2017 to Final Office Action dated Nov. 25, 2016", 15 pgs.
"U.S. Appl. No. 14/318,270, Response filed Mar. 2, 2016 to Restriction Requirement dated Jan. 14, 2016", 9 pgs.
"U.S. Appl. No. 14/318,270, Response filed Aug. 22, 2016 to Non Final Office Action dated Jun. 2, 2016", 14 pgs.
"U.S. Appl. No. 14/318,270, Restriction Requirement dated Jan. 14, 2016", 8 pgs.
"U.S. Appl. No. 14/564,860, Final Office Action dated Nov. 17, 2016", 4 pgs.
"U.S. Appl. No. 14/564,860, Non Final Office Action dated Jul. 12, 2016", 6 pgs.
"U.S. Appl. No. 14/564,860, Notice of Allowance dated Jan. 30, 2017", 6 pgs.
"U.S. Appl. No. 14/564,860, Preliminary Amendment filed Dec. 10, 2014", 8 pgs.
"U.S. Appl. No. 14/564,860, Preliminary Amendment filed Dec. 10, 2014", 6 pgs.
"U.S. Appl. No. 14/564,860, Response filed May 6, 2016 to Restriction Requirement dated Mar. 16, 2016", 9 pgs.
"U.S. Appl. No. 14/564,860, Response filed Oct. 3, 2016 to Non Final Office Action dated Jul. 12, 2016", 11 pgs.
"U.S. Appl. No. 14/564,860, Restriction Requirement dated Mar. 16, 2016", 5 pgs.
"U.S. Appl. No. 14/712,558, Advisory Action dated Apr. 12, 2018", 8 pgs.
"U.S. Appl. No. 14/712,558, Examiner Interview Summary dated Mar. 12, 2018", 3 pgs.
"U.S. Appl. No. 14/712,558, Final Office Action dated Dec. 6, 2017", 9 pgs.
"U.S. Appl. No. 14/712,558, Non Final Office Action dated Jul. 6, 2017", 7 pgs.
"U.S. Appl. No. 14/712,558, Response filed Jan. 23, 2018 to Final Office Action dated Dec. 6, 2017", 13 pgs.
"U.S. Appl. No. 14/712,558, Response filed Apr. 2, 2018 to Final Office Action dated Dec. 6, 2017", 7 pgs.
"U.S. Appl. No. 14/712,558, Response filed Oct. 6, 2017 to Non Final Office Action dated Jul. 6, 2017", 12 pgs.
"U.S. Appl. No. 14/712,558, Supplemental Amendment Filed May 15, 2018", 6 pgs.
"U.S. Appl. No. 14/712,558, Supplemental Preliminary Amendment filed May 15, 2015", 6 pgs.
"U.S. Appl. No. 15/974,343 Preliminary Amendment Filed May 15, 2018", 7 pgs.
"U.S. Appl. No. 15/978,760, Preliminary Amendment Filed May 15, 2018", 7 pgs.
"U.S. Appl. No. 15/295,594, Preliminary Amendment filed Jan. 26, 2017", 8 pgs.
"U.S. Appl. No. 15/295,594, Preliminary Amendment filed Jun. 13, 2017", 7 pgs.
"U.S. Appl. No. 15/295,594, Restriction Requirement dated May 22, 2018", 6 pgs.
"U.S. Appl. No. 15/295,594, Supplemental Amendment Filed May 15, 2018", 10 pgs.
"U.S. Appl. No. 15/382,114, Preliminary Amendment filed Apr. 4, 2017", 3 pgs.
"U.S. Appl. No. 15/449,112, Non Final Office Action dated Sep. 27, 2017", 17 pgs.
"U.S. Appl. No. 15/452,527, Preliminary Amendment filed Mar. 8, 2017", 3 pgs.
"Application Serial No. PCT/US04/12828, International Search Report dated Oct. 22, 2004", 2 pgs.
"Application Serial No. PCT/US2014/019916, International Preliminary Report on Patentability dated Sep. 17, 2015", 14 pgs.
"U.S. Appl. No. 14/195,360, Response filed Sep. 16, 2016 to Non Final Office Action dated Jun. 30, 2016", 12 pgs.
"Bromine and its Compounds", Jolles, Z. E., Editor, Academic Press, Inc., New York, NY, (1966), pp. 193 and 205.
"Canadian Application Serial No. 2,523,132, Office Action dated Jul. 18, 2011", 3 pgs.
"Canadian Application Serial No. 2,523,132, Response filed Jan. 16, 2012 to Office Action dated Jul. 18, 2011", 5 pgs.
"Canadian Application Serial No. 2,584,327, Office Action dated Mar. 3, 2009", 4 pgs.
"Canadian Application Serial No. 2,584,327, Office Action dated Dec. 7, 2009", 2 pgs.
"Canadian Application Serial No. 2,584,327, Response filed Mar. 19, 2010 to Office Action dated Dec. 7, 2009", 8 pgs.
"Canadian Application Serial No. 2,584,327, Response filed Sep. 2, 2009 to Office Action dated Mar. 3, 2009", 21 pgs.
"Canadian Application Serial No. 2,707,363, First Examiners Report Received Jun. 16, 2011", 2 pgs.
"Canadian Application Serial No. 2,757,309, Office Action dated Dec. 7, 2015", 3 pgs.
"Canadian Application Serial No. 2,757,309, Response filed Jun. 6, 2016 to Office Action dated Dec. 7, 2015", 13 pgs.
"Canadian Application Serial No. 2,757,309, Voluntary Amendment filed Jan. 30, 2015", 27 pgs.
"Canadian Application Serial No. 2,871,422, Response filed Feb. 26, 2016 to Office Action dated Sep. 9, 2015", 13 pgs.
"Canadian Application Serial No. 2,757,309, Office Action dated Apr. 2, 2015", 3 pgs.
"Canadian Application Serial No. 2,871,422, Office Action dated Sep. 9, 2015", 3 pgs.
"Canadian Application Serial No. 2,871,422, Office Action dated Dec. 22, 2016", 5 pgs.
"Canadian Application Serial No. 2,871,422, Response filed Aug. 28, 2015 to Canadian Office Action dated Apr. 2, 2015", 22 pgs.
"Chinese Application Serial No. 200480017704.4, Office Action dated Dec. 8, 2011", (w/ English Translation), 6 pgs.
"Chinese Application Serial No. 200480017704.4, Response filed Jan. 20, 2012 to Office Action dated Dec. 8, 2012", (w/ English Translation of Amended Claims), 10 pgs.
"Chinese Application Serial No. 200580037037.0, Chinese Office Action, dated Jun. 25, 2013 (and English translation)", no english translation, 46 pgs.
"Chinese Application Serial No. 201380033231.6, Office Action dated Sep. 21, 2015", w/ Partial English Translation, 6 pgs.
"Chinese Application Serial No. 201380033231.6, Response filed Jan. 14, 2016 to Office Action dated Sep. 21, 2015", w/English Claims, 7 pgs.
"Chinese Application Serial No. 201480025701.9, Office Action dated Jul. 12, 2017", W/ English Translation, 8 pgs.
"Chinese Application Serial No. 201480025701.9, Office Action dated Jul. 25, 2016", (With English Translation), 4 pgs.
"Chinese Application Serial No. 201480025701.9, Office Action dated Dec. 23, 2016", W/ English Translation, 39 pgs.
"Chinese Application Serial No. 201480025701.9, Office Action dated Dec. 23, 2016", 24 pgs.

(56) References Cited

OTHER PUBLICATIONS

"Chinese Application Serial No. 201480025701.9, Response filed Sep. 15, 2017 to Office Action dated Jul. 12, 2017", w/ English Translation, 21 pgs.
"DARCO® FGD-Powdered Activated Carbon", Norit Americas Inc. Datasheet No. 1100, (May 2009), 1 pg.
"European Application Serial No. 05814011.2, Response filed Sep. 9, 2011 to European Search Report dated Apr. 14, 2009 and Office Actioin dated Nov. 5, 2009", 20 pgs.
"European Application Serial No. 05814011.2, Communication Pursuant to Article 94(3) EPC dated Nov. 5, 2009", 4 pgs.
"European Application Serial No. 05814011.2, Decision to grant dated Jun. 8, 2012", 2 pgs.
"European Application Serial No. 05814011.2, Extended European Search Report dated Jul. 14, 2009", 13 pgs.
"European Application Serial No. 05814011.2, Office Action dated Jan. 25, 2008", 2 pgs.
"European Application Serial No. 05814011.2, Office Action dated Jan. 31, 2012", 4 pgs.
"European Application Serial No. 05814011.2, Office Action dated Apr. 27, 2012", 6 pgs.
"European Application Serial No. 05814011.2, Office Action dated Nov. 5, 2009", 2 pgs.
"European Application Serial No. 05814011.2, Partial European Search Report dated Apr. 14, 2009", 13 pgs.
"European Application Serial No. 05814011.2, Response filed Feb. 28, 2012 to Office Action dated Jan. 31, 2012", 30 pgs.
"European Application Serial No. 05814011.2, Response filed Apr. 18, 2008 to Office Action dated Jan. 25, 2008 and Third Party Observations submitted Dec. 4, 2007", 7 pgs.
"European Application Serial No. 05814011.2, Response filed May 11, 2010 to Communication Pursuant to Article 94(3) EPC dated Nov. 5, 2009", 11 pgs.
"European Application Serial No. 05814011.2, Response filed May 11, 2010 to Office Action dated Nov. 5, 2009", 11 pgs.
"European Application Serial No. 05814011.2, Response filed Sep. 9, 2011 to Extended European Search Report dated Apr. 14, 2009", 20 pgs.
"European Application Serial No. 05814011.2, Third Party Observations submitted Mar. 19, 2012", 5 pgs.
"European Application Serial No. 05814011.2, Third Party Observations submitted Dec. 4, 2007", 5 pgs.
"European Application Serial No. 10767465.7, Decision to grant dated Apr. 17, 2014", 2 pgs.
"European Application Serial No. 10767465.7, Extended European Search Report dated Dec. 6, 2012", 5 pgs.
"European Application Serial No. 10767465.7, Intention to Grant dated Mar. 17, 2014", 44 pgs.
"European Application Serial No. 10767465.7, Intention to Grant dated Sep. 30, 2013", 44 pgs.
"European Application Serial No. 10767465.7, Response filed Feb. 3, 2014 to Intention to Grant dated Sep. 30, 2013", 11 pgs.
"European Application Serial No. 10767465.7, Response filed Jun. 20, 2013 to Extended European Search Report dated Dec. 6, 2012", 18 pgs.
"European Application Serial No. 11189249.3, Communication Pursuant to Article 94(3) EPC dated Nov. 26, 2012", 4 pgs.
"European Application Serial No. 11189249.3, Decision to Refuse dated Dec. 19, 2013", 18 pgs.
"European Application Serial No. 11189249.3, Extended European Search Report dated Feb. 1, 2012", 7 pgs.
"European Application Serial No. 11189249.3, Office Action dated Nov. 4, 2013", 4 pgs.
"European Application Serial No. 11189249.3, Response filed Feb. 4, 2013 to Communication Pursuant to Article 94(3) EPC dated Nov. 26, 2012", 9 pgs.
"European Application Serial No. 11189249.3, Response filed Aug. 28, 2012 to Extended European Search Report dated Feb. 1, 2012", 9 pgs.
"European Application Serial No. 11189249.3, Summons to Attend Oral Proceedings mailed Apr. 15, 2013", 7 pgs.
"European Application Serial No. 11189252.7, Communication Pursuant to Article 94(3) EPC dated Jan. 9, 2013", 4 pgs.
"European Application Serial No. 11189252.7, Decision to grant dated May 2, 2014", 2 pgs.
"European Application Serial No. 11189252.7, Extended European Search Report dated Jan. 23, 2012", 6 pgs.
"European Application Serial No. 11189252.7, Extended European Search Report dated May 9, 2012", 12 pgs.
"European Application Serial No. 11189252.7, Office Action dated Oct. 30, 2013", 4 pgs.
"European Application Serial No. 11189252.7, Office Action dated Dec. 11, 2013", 6 pgs.
"European Application Serial No. 11189252.7, Response filed Feb. 11, 2013 to Communication Pursuant to Article 94(3) EPC dated Jan. 9, 2013", 5 pgs.
"European Application Serial No. 11189252.7, Response filed Oct. 10, 2013 to Office Action dated Apr. 15, 2013", 18 pgs.
"European Application Serial No. 11189252.7, Response filed Nov. 22, 2012 to Extended European Search Report dated May 9, 2012", 13 pgs.
"European Application Serial No. 11189252.7, Summons to Attend Oral Proceedings mailed Apr. 15, 2013", 6 pgs.
"European Application Serial No. 13719338.9, Office Action dated May 12, 2017", 6 pgs.
"European Application Serial No. 13719338.9, Office Action dated Dec. 19, 2014", 2 pgs.
"European Application Serial No. 13719338.9, Response filed Jun. 29, 2015 to Office Action dated Dec. 19, 2014", 19 pgs.
"European Application Serial No. 14711106.6, Communication Pursuant to Article 94(3) EPC dated Feb. 22, 2017", 6 pgs.
"European Application Serial No. 14711106.6, Response filed Aug. 17, 2017 to Communication Pursuant to Article 94(3) EPC dated Feb. 22, 2017", 10 pgs.
"International Application Serial No. PCT/US2008/071986, International Search Report dated Jan. 30, 2009", 3 pgs.
"International Application Serial No. PCT/US2005/030018, International Preliminary Report on Patentability dated Dec. 27, 2006", 3 pgs.
"International Application Serial No. PCT/US2005/030018, International Search Report dated Jul. 25, 2006", 2 pgs.
"International Application Serial No. PCT/US2005/030018, Written Opinion dated Jul. 25, 2006", 3 pgs.
"International Application Serial No. PCT/US2010/022807, International Preliminary Report on Patentability dated Nov. 3, 2011", 6 pgs.
"International Application Serial No. PCT/US2010/022807, International Search Report dated Sep. 13, 2010", 3 pgs.
"International Application Serial No. PCT/US2010/022807, Written Opinion dated Sep. 13, 2010", 4 pgs.
"International Application Serial No. PCT/US2013/036964, International Preliminary Report on Patentability dated Jul. 17, 2014", 11 pgs.
"International Application Serial No. PCT/US2013/036964, International Search Report dated Nov. 29, 2013", 7 pgs.
"International Application Serial No. PCT/US2013/036964, Invitation to Pay Additional Fees and Partial Search Report dated Aug. 2, 2013", 7 pgs.
"International Application Serial No. PCT/US2013/036964, Written Opinion dated Apr. 15, 2014", 10 pgs.
"International Application Serial No. PCT/US2013/036964, Written Opinion dated Nov. 29, 2013", 13 pgs.
"International Application Serial No. PCT/US2014/019916, International Search Report dated Oct. 13, 2014", 6 pgs.
"International Application Serial No. PCT/US2014/019916, Invitation to Pay Additional Fees and Partial Search Report dated May 30, 2014", 6 pgs.
"International Application Serial No. PCT/US2014/019916, Written Opinion dated Oct. 13, 2014", pgs.
"Powdered Activated Carbon", Cabot Corp, URL: http://www.cabotcorp.com/solutions/products-plus/activated-carbon/powdered, (Jan. 3, 2015), 3 pgs.

(56) References Cited

OTHER PUBLICATIONS

"Supplementary European Search Report, dated Dec. 6, 2012".
Arenillas, A, et al., "CO2 removal potential of carbons prepared by co-pyrolysis of sugar and nitrogen containing compounds", Journal of analytical and applied pyrolysis 74.1, (2005), 298-306.
Bakandritsos, A., et al., "Aqueous and Gaseous Adsorption from Montmorillonite-Carbon Composites and from Derived Carbons", Langmuir, 21, (2005), 2349-2355.
Bakandritsos, A., et al., "High Surface Area Montmorillonite—Carbon Composites and Derived Carbons", Chemistry of Materials, vol. 16, No. 8, (Mar. 16, 2004), 1551-1559.
Bimer, Jan, et al., "Modified active carbons from precursors enriched with nitrogen functions: sulfur removal capabilities", (1998), 519-525.
Chang, Shih-Ger, "Method for Oxidation of Mercury Vapor", U.S. Appl. No. 60/560,904, filed Apr. 9, 2004, (Apr. 9, 2004), 9 pgs.
Criswell, Gordon, et al., "Progress Report on Mercury Control Retrofit at the Colstrip Power Station", Paper #91, Mega Symposium, Baltimore, MD, (Aug. 2011), 1-23.
Darder, M., et al., "Caramel-clay nanocomposites", Journal of Materials Chemistry, 15, (2005), 3913-3918.
Diamantopoulou LR G Skodas, et al., "Sorption of mercury by activated carbon in the presence of flue gas components", Fuel Processing Technology 91.2, (2010), 158-163.
Dong, J., et al., "Mercury Removal from Flue Gases by Novel Regenerable Magnetic Nanocomposite Sorbents", Environ. Sci. Technol., 43, (2009), 3266-3271.
Dunham, G. E., et al., "Mercury Capture by an Activated Carbon in a Fixed-Bed Bench-Scale System", Environmental Progress, 17(3), (1998), 203-208.
Eisazadeh, H., "Removal of Mercury from Water Using Polypyrrole and its Composites", Chinese Journal of Polymer Science, 25(4), (2007), 393-397.
Felsvang, K., et al., "Mercury Reduction and Control Options", The U.S. EPA-DOE-EPRI Combined Power Plant Air Pollutant Control Symposium; The Mega Symposium and the A&WMA Specialty Conference and Mercury Emissions: Fate, Effects and Control; Chicago, IL, (Aug. 2001), 1-19.
Fernandez-Saavedra, R., et al., "Polymer-Clay Nanocomposites as Precursors of Nanostructured Carbon Materials for Electrochemical Devices: Templating Effect of Clays", Journal of Nanoscience and Nanotechnology, 8, (2008), 1741-1750.
Ghorbani, M., et al., "Application of polyaniline nanocomposite coated on rice husk ash for removal of Hg(II) from aqueous media", Synthetic Metals, (2001), 4 pgs.
Ghorishi, Behrooz, et al., "Sorption of Mercury Species by Activated Carbons and Calcium-Based Sorbents: Effect of Temperature, Mercury Concentration and Acid Gases", Waste Manage. Res., 16:6, (1998), 582-593.
Gomez-Aviles, A., et al., "Functionalized Carbon-Silicates from Caramel-Sepiolite Nanocomposites", Angew. Chem. Int. Ed., 46, (2007), 923-925.
Gomez-Aviles, A., et al., "Multifunctional materials based on graphene-like/sepiolite nanocomposites", Applied Clay Science, 47, (2010), 203-211.
Ha, et al., "Effect of unburnt carbon on the corrosion performance of fly ash cement mortar", Construction and Building Materials, (Sep. 1, 2005), 7 pgs.
Ikeue, K., et al., "Noble-metal-containing nanoporous carbon synthesized within the interlayer space of montmorillonite and its catalytic property", Applied Catalysis A: General, 351, (2008), 68-74.
Kawabuchi, Yuji, et al., "Chemical vapor deposition of heterocyclic compounds over active carbon fiber to control its porosity and surface function", Langmuir 13.8, (1997), 2314-2317.
Kyotani, T., et al., "Formation of highly orientated graphite from polyacrylonitrile by using a two-dimensional space between montmorillonite lamellae", Nature, 331, (1988), 331-333.

Lancia, A., et al., "Adsorption of Mercuric Chloride Vapours from Incinerator Flue Gases on Calcium Hydroxide Particles", Combust. Sci. & Tech., 93, (1993), 277-289.
Laumb, Jason D., et al., "X-ray photoelectron spectroscopy analysis of mercury sorbent surface chemistry", Fuel Processing Technology, 85, (2004), 577-585.
Li, Y., et al., "Removal of elemental mercury from simulated coal-combustion flue gas using a SiO2—TiO2 nanocomposite", Fuel Processing Technology, 89, (2008), 567-573.
M, Hocquel, "Quecksilber and seine Verbindungen bei der Abfallverbrennung", with English Abstract p. 3, (Dec. 31, 2000), 112 pgs.
Maroto-Valer, M. Mercedes, et al., "Development of Activated Carbons From Coal and Biomass Combustion and Gasification Chars", (2004), 2 pgs.
Mochida, I., et al., "Preparation of nitrogen containing pitches from quinoline and isoquinoline by AID of AlCl3", Carbon, 33(8), (1995), 1069-1077.
Nguyen-Thanh, D., et al., "High Porosity Carbonaceous Adsorbents Templated From Porous Clay Heterostructures", Prepr. Pap.-Am. Chem. Soc., Div. Fuel Chem., 51(1), (2006), 7-8.
Nguyen-Thanh, D., et al., "Metal-loaded carbonaceous adsorbents templated from porous clay heterostructures", Microporous and Mesoporous Materials, 92, (2006), 47-55.
Nickels, Dale L, et al., "Processing and reuse of activated carbon used to adsorb mercury from power plant flue gases", Final report, (2004).
Olson, David, et al., "The reduction of gas phase air toxics from combustion and incineration sources using the MET-Mitsui-BF activated coke process", Fule Processing Technology, (2000), 13 pgs.
Olson, David G., et al., "The Reduction of Gas Phase Air Toxics from Combustion and Incineration Sources using the MET-Mitsui-BF Activated Coke Process", Fuel Processing Technology, 65-66, (2000), 393-405.
Olson, E. S., et al., "Catalytic effects of carbon sorbents for mercury capture", Journal of Hazardous Materials, 74, (2000), 61-79.
Olson, Edwin S., et al., "Surface Compositions of Carbon Sorbents Exposed to Simulated Low-Rank Coal Flue Gases", J. Air & Water Waste Manage. Assoc., 55, (2005), 747-754.
Padak, Bihter, "Understanding mercury binding on activated carbon", Carbon 47.1 2, (2009), 2855-2864.
Przepiorski, J, et al., "High temperature ammonia treatment of activated carbon for enhancement of CO2 adsorption", Applied Surface Science 225.1, (2004), 235-242.
Rachel, Ribeirovieira Azzi Rios, et al., "Tailoring Activated Carbon by Surface Chemical Modification with O, S, and N Containing Molecules", Materials Research. 6 (2), (2003), 129-135.
Raymundo-Pinero, E, et al., "Structural characterization of N-containing activated carbon fibers prepared from a low softening point petroleum pitch and a melamine resin", Carbon 40.4, (2002), 597-608.
Smokey, et al., "Alternative to Activated Carbon for Mercury Control", Power Engineering, (Oct. 2012), 10 pgs.
Streng, Sabine, et al., "Toxics control by activated charcoal within the "System Dusseldorf" full scale experience", B. Fuel Processing Technology, (1994), 14 pgs.
Tsuji, K, et al., "The Activated Coke Process for Combinded SOx/NOx/Air Toxics Reduction", Air and Water Management Assoc., (Mar. 10, 1993), 27 pgs.
Vosteen, B, et al., "Chlor-und Bromgestutzte Hg-Sorption an Elektrofilter-Flugaschen eines kohlegefeuerten Schmelzkammerkessels und an Zementrohmehl", Matin-Luther-Universitat Halle-Wittenberg, English translation and abstract unavailable., (2003), 1-30.
Vosteen, B. W., "Bromine-enhanced Mercury Abatement from Combustion Flue Gases—Recent Industrial Applications and Laboratory Research", VGB PowerTech, vol. 86, Issue Mar. 2006, (2006), 70-75.
Vosteen, B. W., et al., "Mercury—Emissions, Measuring and Mitigation Techniques", Flyer on Mercury Abatement given at the VDI-Wissensforum, Dusseldorf, Germany, German language with machine translation, (Sep. 2003), 11 pgs.

(56) References Cited

OTHER PUBLICATIONS

Vosteen, B.W., et al., "Emissionsminderung von Quecksilber durch chlor- und bromgestutzte Hg-Oxidation in Rauchgas", (Sep. 2003), 23 pgs.

Wan, Q., et al., "Removal of gaseous elemental mercury over a $CeO_2$—$WO_3$/$TiO_2$ nanocomposite in simulated coal-fired flue gas", Chemical Engineering Journal, 170, (2011), 512-517.

Wang, B., et al., "Performance of a diatomite-based sorbent in removing mercury from aqueous and oil matrices", J. Environ. Eng. Sci., 6, (2007), 469-476.

Zhang, Y., et al., "High efficient removal of mercury from aqueous solution by polyaniline/humic acid nanocomposite", Journal of Hazardous Materials, 175, (2010), 404-409.

Zhao, Yongxin, et al., "Effects of Sulfur Dioxide and Nitric Oxide on Mercury Oxidation and Reduction under Homogeneous Conditions", J. Air & Waste Manage. Assoc., 56, (2006), 628-635.

Zheng, Yuanjing, et al., "Review of technologies for mercury removal from flue gas from cement production processes", Progress in Energy and Combustion Science, vol. 38, No. 5, (Apr. 26, 2012), 599-629.

U.S. Appl. No. 10/554,018 U.S. Pat. No. 8,173,566, filed Jan. 23, 2007, Process for Generating a Spent Sorbent.

"U.S. Appl. No. 15/951,970, Notice of Allowance dated Jan. 12, 2021", 10 pgs.

"U.S. Appl. No. 15/951,970, Response filed Nov. 25, 2020 to Non Final Office Action dated May 27, 2020", 19 pgs.

"U.S. Appl. No. 16/509,071, Examiner Interview Summary dated Dec. 21, 2020", 3 pgs.

"U.S. Appl. No. 16/509,071, Final Office Action dated Dec. 8, 2020", 10 pgs.

"U.S. Appl. No. 16/509,071, Notice of Allowance dated Jan. 6, 2021", 8 pgs.

"U.S. Appl. No. 16/509,071, Response filed Nov. 25, 2020 to Non Final Office Action dated May 29, 2020", 29 pgs.

"U.S. Appl. No. 16/509,071, Response filed Dec. 17, 2020 to Final Office Action dated Dec. 8, 2020", 12 pgs.

"U.S. Appl. No. 14/712,558, Non Final Office Action dated Sep. 12, 2019", 15 pgs.

"U.S. Appl. No. 14/712,558, Response filed Jul. 10, 2019 to Final Office Action dated Jan. 11, 2019", 57 pgs.

"U.S. Appl. No. 14/712,558, Response filed Sep. 17, 2019 to Non Final Office Action dated Sep. 12, 2019", 12 pgs.

"U.S. Appl. No. 15/295,594, Final Office Action dated Aug. 2, 2019", 18 pgs.

"U.S. Appl. No. 15/382,114, Final Office Action dated Jun. 21, 2019", 31 pgs.

"U.S. Appl. No. 15/382,114, Response filed Oct. 3, 2019 to Final Office Action dated Jun. 21, 2019", 23 pgs.

"U.S. Appl. No. 15/974,343, Corrected Notice of Allowability dated Oct. 23, 2019", 2 pgs.

"U.S. Appl. No. 15/974,343, Non Final Office Action dated Aug. 21, 2019", 13 pgs.

"U.S. Appl. No. 15/974,343, Non Final Office Action dated Dec. 2, 2019", 12 pgs.

"U.S. Appl. No. 15/974,343, Notice of Allowance dated Sep. 17, 2019". 7 pgs.

"U.S. Appl. No. 15/974,343, Response Filed Jul. 10, 2019 to Final Office Action dated Jan. 14, 2019", 81 pgs.

"U.S. Appl. No. 15/997,091, Corrected Notice of Allowability dated Oct. 23, 2019", 3 pgs.

"U.S. Appl. No. 15/997,091, Corrected Notice of Allowability dated Nov. 22, 2019", 3 pgs.

"U.S. Appl. No. 15/997,091, Non Final Office Action dated Aug. 23, 2019", 14 pgs.

"U.S. Appl. No. 15/997,091, Notice of Allowance dated Sep. 18, 2019", 8 pgs.

"U.S. Appl. No. 15/997,091, Response filed Jul. 10, 2019 to Final Office Action dated Jan. 11, 2019", 80 pgs.

"U.S. Appl. No. 16/509,071, Non Final Office Action dated Sep. 11, 2019", 21 pgs.

"U.S. Appl. No. 16/509,071, Response filed Oct. 3, 2019 to Non Final Office Action dated Sep. 11, 2019", 26 pgs.

"U.S. Appl. No. 16/509,102, Amendment and Response filed Nov. 11, 2019 to Non Final Office Action dated Oct. 23, 2019", 34 pgs.

"U.S. Appl. No. 16/509,102, Non Final Office Action dated Jul. 23, 2019", 26 pgs.

"U.S. Appl. No. 16/509,146, Amendment and Response filed Nov. 11, 2019 to Non Final Office Action dated Oct. 17, 2019", 34 pgs.

"U.S. Appl. No. 16/509,146, Non Final Office Action dated Oct. 17, 2019", 24 pgs.

"Ch. 35: Mercury, Hazardous Air Pollutants and other Multi-Pollutant Control", Tomei, G. L. (Ed.). Steam: its generation and use, Babcock and Wilcox Co., (2015), 24 pgs.

"Defendant's Answer and Counterclaim", *Midwest Energy Emissions Corp., et al.,* v. *Vista Energy Corp., et al.*—Case 1:19-cv-01334-RGA, (Oct. 9, 2019), 71 pgs.

"Original Complaint for Patent Infringement", *Midwest Energy Emissions Corp., et al.,* v. *Vistra Energy Corp., et al.*—Case 1:19-cv-01334-UNA. (Jul. 17, 2019), 31 pgs.

"Plaintiffs Answer to Defendant's Counterclaims", *Midwest Energy Emissions Corp., et al.,* v. *Vistra Energy Corp., et al.*—Case 1:19-cv-01334-RGA, (Oct. 30, 2019), 37 pgs.

Olson, E.S., et al., "Chemical mechanisms in mercury emission control technologies", J. Phys. IV France 107, Proc. of the XIIth Intl. Conference on Heavy Metals in the Environment vol. II, pp. 979-982, (2003), 6 pgs.

Olson, Edwin S., "Abstract—Multiple Site Model for Flue Gas—Mercury interactions on Activated Carbons: The Basic Site", Abstracts of Papers Part 1, 225th ACS National Meeting, New Orleans, LA, (2003), 3 pgs.

Olson, Edwin S., et al., "An Improved Model for Flue Gas—Mercury Interactions on Activated Carbons", Proceedings of the Combined Power Plant Air Pollutant Control Mega Symposium, (May 2003), 8 pgs.

Olson, Edwin, et al., "The Multiple Site Model for Flue Gas—Mercury Interactions on Activated Carbons: The Basic Site", Fuel Chemistry Preprints, 48(1), (2003), 3 pgs.

"U.S. Appl. No. 17/125,641, Examiner Interview Summary dated Apr. 8, 2021".

* cited by examiner

SORBENTS FOR THE OXIDATION AND REMOVAL OF MERCURY

CROSS-REFERENCE TO RELATED APPLICATIONS

This application is a continuation-in-part of and claims the benefit of priority under 35 U.S.C. § 120 to U.S. patent application Ser. No. 15/295,594, filed on Oct. 17, 2016, which is a continuation of U.S. patent application Ser. No. 14/102,896 filed on Dec. 11, 2013, which is a continuation of U.S. patent application Ser. No. 12/429,058 filed on Apr. 23, 2009 (now U.S. Pat. No. 8,652,235), which is a continuation-in-part of U.S. patent application Ser. No. 12/201,595 filed on Aug. 29, 2008 (abandoned), which is a divisional of U.S. patent application Ser. No. 11/209,163 filed on Aug. 22, 2005 (now U.S. Pat. No. 7,435,286), which claims priority from provisional application No. 60/605,640 filed on Aug. 30, 2004. The disclosures of U.S. patent application Ser. Nos. 14/102,896; 12/429,058; 12/201,595; 11/209,163; and 60/605,640 are hereby incorporated herein by reference in their entirety.

This application is a continuation-in-part of and claims the benefit of priority under 35 U.S.C. § 120 to U.S. patent application Ser. No. 15/382,114, filed on Dec. 16, 2016, which is a continuation-in-part of and claims the benefit of priority under 35 U.S.C. § 120 to U.S. patent application Ser. No. 14/712,558, filed on May 14, 2015, which is a continuation of U.S. patent application Ser. No. 13/966,768, filed on Aug. 14, 2013 (now U.S. Pat. No. 8,821,819), which is a continuation of U.S. patent application Ser. No. 13/427,665, filed on Mar. 22, 2012 (now U.S. Pat. No. 8,512,655), which is a continuation of U.S. patent application Ser. No. 12/419,219, filed on Apr. 6, 2009 (now U.S. Pat. No. 8,168,147), which is a continuation of U.S. patent application Ser. No. 12/201,595, filed on Aug. 29, 2008, which is a division of U.S. patent application Ser. No. 11/209,163, filed on Aug. 22, 2005 (now U.S. Pat. No. 7,435,286), which claims the benefit of priority under 35 U.S.C. § 119(e) to U.S. provisional patent application No. 60/605,640, filed on Aug. 30, 2004, the disclosures of which are incorporated herein in their entirety by reference. U.S. patent application Ser. No. 15/382,114 is also a continuation-in-part of and claims the benefit of priority under 35 U.S.C. § 120 to U.S. application Ser. No. 14/195,360, filed Mar. 3, 2014, which claims the benefit of priority under 35 U.S.C. § 119(e) to U.S. provisional patent application No. 61/773,549, filed Mar. 6, 2013, the disclosures of which are incorporated herein in their entirety by reference. U.S. patent application Ser. No. 15/382,114 is also a continuation-in-part and claims the benefit of priority under 35 U.S.C. § 120 to U.S. patent application Ser. No. 10/554,018 (now U.S. Pat. No. 8,173,566), filed Jan. 23, 2007, which claims the benefit of priority under 35 U.S.C. § 119(e) to U.S. provisional patent application Ser. No. 60/464,868, filed Apr. 23, 2003, the disclosures of which are incorporated herein in their entirety by reference.

STATEMENT OF GOVERNMENT SUPPORT

This invention was made with United States Government support under Grant Numbers R 827649-01 and CR 830929-01 awarded by the United States Environmental Protection Agency and under Contract Number DE-FC26-98FT40320 awarded by the United States Department of Energy. The United States Government has certain rights in this invention.

BACKGROUND

The combustion and gasification of fossil fuel such as coal generates flue gas that contains mercury and other trace elements that originate from the fuel. The release of the mercury (and other pollutants) to the environment must be controlled by use of sorbents, scrubbers, filters, precipitators, and other removal technologies. Mercury is initially present in the elemental form during combustion and gasification. In downstream process sections, such as in the ducts, emissions control equipment, and stack of a combustion system, some of the elemental mercury is oxidized. The amount that is oxidized depends on the amount of acid gases present in the flue gas, residence time, temperatures, and several other factors. Amounts of mercury vary with the fuel, but concentrations of mercury in the stream of flue gas from coal combustion are typically less than 5 parts per billion (ppb). Large coal combustion facilities such as electric utilities may emit a pound of mercury, or more, per day. Mercury removal applications include, without limitation, flue gas from coal (or other fossil fuel) combustion, waste incineration, product gas from gasification, as well as off gases from mineral processing, metal refining, retorting, cement manufacturing, chloralkali plants, dental facilities, and crematories.

Several types of mercury control methods for flue gas have been investigated, including addition (e.g., injection) of fine sorbent particles into a flue gas duct and passing the flue gas through a sorbent bed. Fine-particle sorbents for addition/injection include, for example, activated carbon, metal oxide sorbent, sodium sulfide particles, and basic silicate or oxide sorbents. When the particles are added the mercury captured on the sorbent particles is removed from the gas stream in a bag house or electrostatic precipitator (ESP) and collected along with ash particulate. The sulfide and basic silicate and oxide particles are effective only for the oxidized mercury, and the metal oxide sorbents exhibit slower capture kinetics than the carbon particles. Additionally, injection (or addition) of fine carbon particles into the flue gas stream has been only partially successful in removing mercury, especially elemental mercury, where effective removal of only about 60% is attained for some applications with a FF (fabric filter) to collect carbon and ash. Even lower removal rates have been observed when using an ESP to collect the carbon because the contact time of the carbon with the gas is very short.

The addition of halogen or halogen precursors in a hot zone, followed by contact with an alkaline material in a wet or dry scrubber is another approach known in the art. With such an approach, elemental mercury is claimed to be oxidized by the halogen to Hg(II) which is collected by the alkaline material in the scrubber. For example, see U.S. Pat. No. 6,808,692 (Oehr), U.S. Pat. No. 3,849,267 (Hilgen). U.S. Pat. No. 5,435,980 (Felsvang), U.S. Pat. No. 6,375,909 (Dangtran), U.S. patent application no. 20020114749 (Cole), U.S. Pat. No. 6,638,485 (Iida). U.S. patent application no. 20030185718 (Sellakumar). U.S. patent application no. 20030147793 (Breen), and U.S. Pat. No. 6,878,358 (Vosteen). However, even though it is known to add halogen forms at some stage of the combustion process, such a process does not utilize a complexing method on a sorbent surface for conducting the oxidation and capture. Further, the alkaline material is rapidly surface-coated by the large concentrations of acid gases, lowering its capacity for adsorption of Hg(II). It is also recognized that the halogen forms initially introduced or generated are far more reactive to the large concentrations of $SO_2$ and moisture in the flue gas, and so gas-phase reactions of the halogens with Hg are hindered.

A more efficient way to capture mercury vapor is to combine the halogen compounds with activated carbons. This method for capturing elemental Hg in air or flue gas is described in several patents. In U.S. Pat. No. 1,984,164, Stock teaches impregnation of activated carbon with halogens, particularly iodine, to remove mercury from ambient air. In U.S. Pat. No. 3,194,629, Dreibelbis et al. impregnated activated carbon with an iodine-potassium iodide mixture. In U.S. Pat. No. 3,662,523, Revoir et al. used interhalogens such as ICl and $ICl_3$ with activated carbon. In U.S. Pat. No. 3,956,458, Anderson teaches a dual sulfur and iodide filter system. In U.S. Pat. No. 4,196,173 deJong et al use chlorinated activated carbon filters. Owing to the very weak adsorption of iodine on activated carbon, the iodine in these described inventions is quickly desorbed rendering the iodinated sorbent ineffective at the temperatures encountered in flue gas cleaning.

SUMMARY OF THE INVENTION

In various embodiments, the present invention provides a method of separating mercury from a mercury-containing gas. The method includes combusting a fossil fuel in a combustion chamber, to provide the mercury-containing gas, wherein the mercury-containing gas includes a halogen or halide promoter, wherein the halogen or halide promoter includes iodine, iodide, or a combination thereof. The method includes adding a sorbent material into the mercury-containing gas downstream of the combustion chamber such that the sorbent material reacts with the halogen or halide promoter in the mercury-containing gas to form a promoted sorbent. The method includes reacting mercury in the mercury-containing gas with the promoted sorbent, to form a mercury/sorbent composition. The method also includes separating the mercury/sorbent composition from the mercury-containing gas.

In various embodiments, the present invention provides a method of separating mercury from a mercury-containing gas. The method includes combusting a fossil fuel in a combustion chamber, to provide the mercury-containing gas, wherein the mercury-containing gas includes the first halogen or halide promoter. The method includes adding a sorbent material into the mercury-containing gas downstream of the combustion chamber such that the sorbent material reacts with the first halogen or halide promoter in the mercury-containing gas to form a promoted sorbent, wherein the sorbent material is a promoted sorbent obtained by reaction of a base sorbent with a second halogen or halide promoter. Conditions (a), (b), or (c) are satisfied, wherein (a) the first halogen or halide promoter includes iodine, iodide, or a combination thereof, (b), the second halogen or halide promoter includes iodine, iodide, or a combination thereof, or (c) both (a) and (b). The method includes reacting mercury in the mercury-containing gas with the promoted sorbent, to form a mercury/sorbent composition. The method also includes separating the mercury/sorbent composition from the mercury-containing gas.

In various embodiments, the present invention provides a method for separating mercury from a mercury containing gas. The method includes (a) providing a sorbent material. The method includes (b) providing a halogen or halide promoter, wherein the halogen or halide promoter includes iodine, iodide, or a combination thereof. The method includes (c) promoting at least a portion of the sorbent material by chemically reacting the sorbent material with the halogen or halide promoter to form a promoted halogenated sorbent. The method includes (d) chemically reacting elemental mercury in the mercury containing gas with the promoted halogenated sorbent to form a mercury/sorbent chemical composition. The method also includes (e) separating particulates from the mercury containing gas to form a cleaned gas, the particulates including ash and the first mercury/sorbent chemical composition.

In various embodiments, the present invention provides a method for separating mercury from a mercury-containing gas stream. The method includes contacting a mercury-containing gas stream with a sorbent including promoted ammonium salt-protected sorbent particles, to form a mercury-sorbent composition, wherein the ammonium salt-protected sorbent particles are iodine-promoted, iodide-promoted, or a combination thereof. The method also includes separating at least some of the mercury-sorbent composition from the mercury-containing gas stream, to give a separated gas.

In various embodiments, the present invention provides a method for separating mercury from a mercury-containing gas stream. The method includes contacting a mercury-containing gas stream with an activated carbon sorbent including HI-promoted ammonium sulfate-protected activated carbon sorbent particles, to form a mercury-sorbent composition. The method also includes separating at least some of the mercury-sorbent composition from the mercury-containing gas stream, to give a separated gas.

In various embodiments, the present invention provides ammonium salt-protected sorbent particles. The ammonium salt-protected sorbent particles include active sites that bind with mercury atoms, wherein the active sites include carbocations bound to promoter anions. The ammonium salt-protected sorbent particles also include ammonia, an ammonium salt, or a combination thereof, in at least a surface layer thereof.

In various embodiments, the present invention provides a method for separating mercury from a mercury-containing gas stream. The method includes contacting a mercury-containing gas stream with a sorbent including promoted or non-promoted sorbent particles and ammonia, to form a mercury-sorbent composition. The method also includes separating at least some of the mercury-sorbent composition from the mercury-containing gas stream, to give a separated gas.

In various embodiments, the present invention provides certain advantages over other mercury sorbents and methods of using the same, at least some of which are unexpected. For example, the method and materials of various embodiments of the present invention can operate more efficiently than other methods of mercury removal. In some embodiments, the method and materials of various embodiments can remove a given amount of mercury for a smaller amount of financial expenditure, as compared to other methods. For example, the method and materials of various embodiments can remove a larger amount of mercury for a given mass of sorbent, as compared to other methods of removing mercury, including as compared to other methods of removing mercury that include a carbon sorbent or a non-carbon sorbent.

In some embodiments, the promoted and optionally ammonium salt-protected sorbent particles provide significantly more effective and economical mercury sorbents for effluent gases, advantageously applicable to treating gas streams from coal-fired equipment and gasification systems. In some embodiments, ammonia formed from the ammonium salt-protection/decomposition adsorbed or complexed on the sorbent surface or in the gas phase that (e.g., owing to its basic character) can react with $SO_2$ or $SO_3$ in the mercury-containing gas stream and can prevent their interference with the sorption of mercury in or near active sites on the sorbent. In some embodiments, the promoted and optionally ammonium salt-protected sorbent particles can separate mercury from a gas stream more effectively than other sorbents, such as in the presence of $SO_3$. In various embodiments, mercury removal efficiencies of promoted and optionally ammonium salt-protected sorbent particles exceeds or matches that of conventional methods with added benefits such as reduced costs.

In some embodiments, in-flight preparation (e.g., in the furnace, in the mercury-containing gas, in the injection/transport system, or a combination thereof) of the promoted and optionally ammonium salt-protected sorbent on location produces certain advantages. For example, the treatment system can be combined with the sorbent injection system at the end-use site. With this technique, the halogen/halide can be introduced to the sorbent-air mixture (or to another gas such as to a combustion or gasification gas) mixture, such as in a transport line (or other part of the sorbent storage and injection system), introduced to the coal that produces the gas, or can be prepared in-flight in the mercury-containing gas. In some embodiments, this can provide the following benefits over current conventional concepts for treating sorbents off-site: capital equipment costs at a treatment facility are eliminated; costs to operate the treatment facility are eliminated; there are no costs for transporting sorbent and additive to a treatment facility; the inventive process uses existing hardware and operation procedures; the inventive technology ensures that the sorbent is always fresh, and thus, more reactive; no new handling concerns are introduced; there are no costs for removing carbon from treatment system; the inventive process allows rapid on-site tailoring of additive-sorbent ratios in order to match the requirements of flue gas changes, such as may be needed when changing fuels or reducing loads, thus further optimizing the economics; the inventive technology reduces the amount of spent sorbents that are disposed; or a combination thereof.

In various embodiments, another advantage of the present invention relates to the use of a feedback system to more efficiently utilize certain aspects of the invention. Where possible and desirable, the mercury control technology of the present invention may utilize continuous measurement of mercury emissions as feedback to assist in control of the promoter and/or sorbent addition or addition rate. Tighter control on the sorbent and optional component(s) levels can be achieved in this way, which will ensure mercury removal requirements are met with minimal material requirements, thus minimizing the associated costs. In some embodiments, the mercury emissions are continuously measured downstream of the addition location, such as in the exhaust gas at the stack.

In some embodiments, the promoted and optionally ammonium salt-protected sorbent particles can be regenerated and reused, reducing disposal of spent sorbents and decreasing the cost of mercury removal. In some embodiments, preparation or promotion of the promoted and optionally ammonium salt-protected sorbent particles can advantageously occur on-site. On-site preparation and promotion can have advantages including, for example: reduction or elimination of equipment costs and operating costs of a separate preparation facility or location, reduction or elimination of transportation costs, fresher and more reactive sorbent, reduction of handling, on-site tailoring of composition (such as when changing fuels or reducing loads).

Mercury removal efficiencies obtained exceed or match conventional methods with added benefits such as reduced costs. In an embodiment, a method is provided for control of mercury in a flue gas with substantially lower sorbent requirements. Through enhanced sorbent reactivity, mercury removal per gram of sorbent is increased, thereby decreasing the capital and operating costs by decreasing sorbent requirements.

In various embodiments, the use of an iodide as a promoter, such as hydrogen iodide, can result in a promoted sorbent having greater mercury reducing and absorption activity than sorbent promoted via other materials such as other halides. In various embodiments, the use of an ammonium salt such as ammonium sulfate in combination with the sorbent provides a sorbent having greater mercury reducing and absorption activity than sorbent that is protected via other materials. In various embodiments, the combined use of an iodide such as hydrogen iodide on the coal or placed into the combustion chamber, along with an ammonium salt added along with the sorbent into the flue gas, provides a promoted ammonium-salt protected sorbent that has superior mercury reducing and absorption activity as compared to other sorbents.

BRIEF DESCRIPTION OF THE FIGURES

The drawings illustrate generally, by way of example, but not by way of limitation, various embodiments of the present invention.

DETAILED DESCRIPTION OF THE INVENTION

Figure 1:
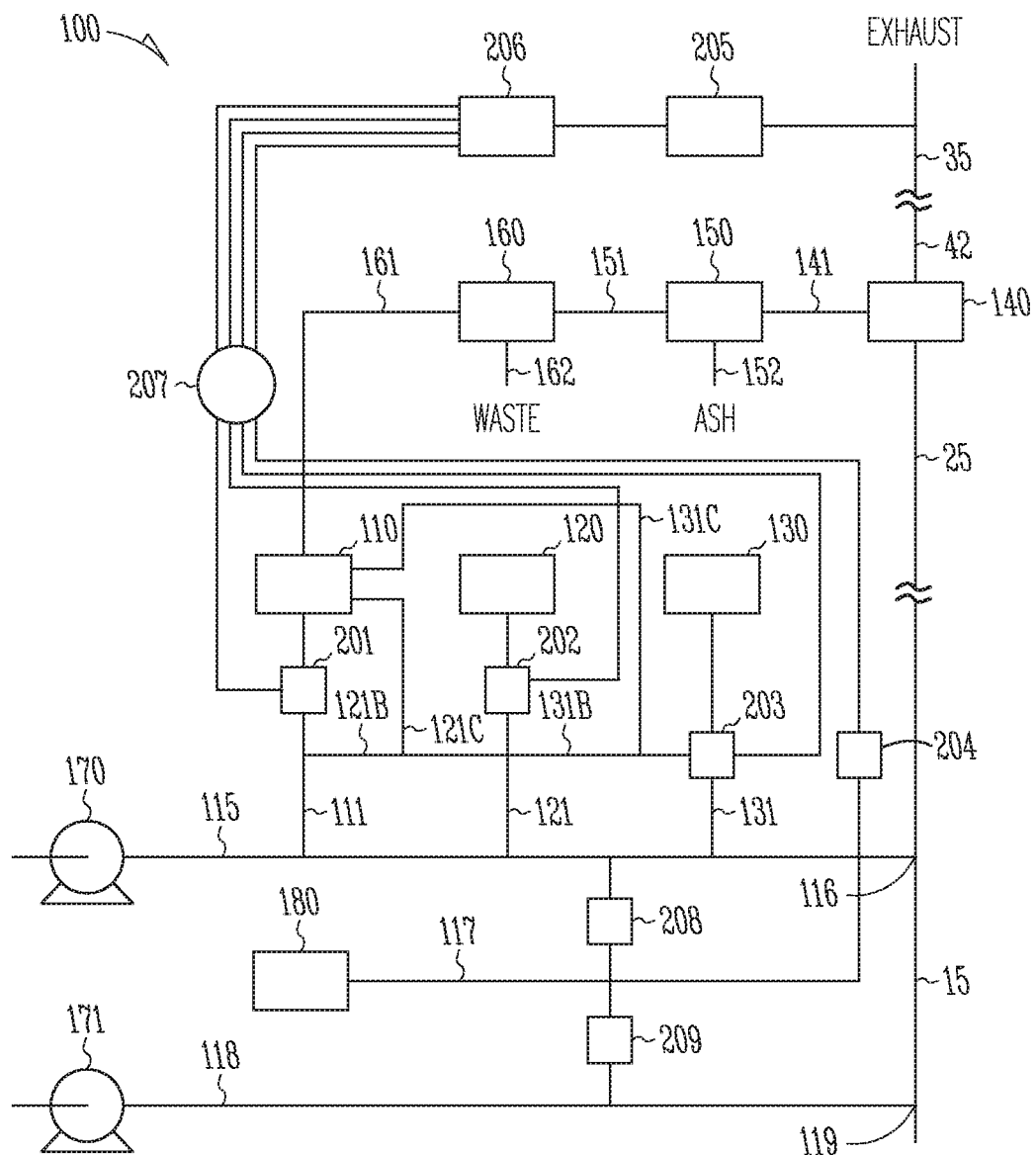
FIG. 1 schematically illustrates preparation of promoted sorbents and processes for flue gas mercury reduction in flue gases and/or product gases from a gasification system in accordance with the present invention, including in-flight preparation of promoted sorbent, in accordance with various embodiments.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that the composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less. The term "substantially free of" can mean having a trivial amount of, such that a composition is about 0 wt % to about 5 wt % of the material, or about 0 wt % to about 1 wt %, or about 5 wt % or less, or less than, equal to, or greater than about 4.5 wt %, 4, 3.5, 3.2.5, 2, 1.5, 1, 0.9, 0.8, 0.7, 0.6, 0.5, 0.4, 0.3, 0.2, 0.1, 0.01, or about 0.001 wt % or less, or about 0 wt %.

As used herein, the term "polymer" refers to a molecule having at least one repeating unit and can include copolymers.

A novel type of promoted halogenated sorbent was described in U.S. Pat. No. 7,435,286, wherein a carbenium halide ion pair is formed on the edge structure of an activated carbon. This carbenium halide ion pair was a highly effective oxidant and capturing agent for elemental Hg in combustion flue gas. To generate an even more effective form of the sorbent, a second acidic promoter was used, thus further distinguishing the sorbent from those prepared by simply adding chlorine or bromine vapor to activated carbon. These secondary components include ammonium salts as well as Lewis acids of the nonmetal halide type. Although it is effective when chloride or bromide are the halide counterions, the sorbent exhibits similar or higher reaction rates for oxidation of elemental Hg and similar or higher capture efficiencies when iodide is the counterion in the carbenium sorbent. This continuation describes further demonstrations of the high reactivity and effectiveness of the iodide-containing sorbent and teaches methods for its formation and use.

Method for Removal of Mercury.

Various embodiments of the present invention provide sorbents for removal of mercury from coal-fired power plant emissions and methods of using the same. The method can include placing a promoter or promoter precursor (e.g., as a liquid, solid, gas, or combination thereof) into the combustion chamber of the furnace, either via addition (e.g., injection) into the combustion chamber or via addition to the coal prior to feeding the coal to the combustion chamber. The promoter precursor, if used, transforms into the promoter under the temperature conditions of the combustion chamber and flue gas. The promoter transforms to a gaseous state in the combustion chamber and flue gas. The method includes adding a sorbent into the flue gas, wherein the sorbent can include a carbon sorbent, a non-carbon sorbent, or a combination thereof. The sorbent added into the flue gas reacts with the gaseous promoter to form a promoted sorbent. The method optionally includes addition of additional materials into the flue gas, such as an ammonium salt (e.g., ammonium sulfate), alkaline materials (e.g., lime), clay (e.g., bentonite), or a combination thereof. The ammonium salt can react with the promoted sorbent to form a promoted ammonium salt-protected sorbent. In some embodiments the ammonium salt can be a non-carbon sorbent, and can optionally be promoted by the promoter. The method can also include separating the sorbent that has reacted with mercury from the mercury-containing gas, such as using a particulate removal device, to provide a cleaned gas.

Although the sorbents and methods herein are described primarily with respect to mercury removal, other materials can also be removed by the sorbent and method, such as boron, tin, arsenic, gallium, Sb, Pb, Bi, Cd, Ag, Cu, Zn, Se, other contaminants, or combinations thereof, will also react with the oxidation sites generated on the carbon.

The sorbent can include a carbon sorbent (e.g., activated carbon), a non-carbon sorbent, or a combination thereof. The carbon sorbent can be any of several types, as understood by those skilled in the art. For example, the activated carbon may include powdered activated carbon, granular activated carbon, carbon black, carbon fiber, carbon honeycomb or plate structure, aerogel carbon film, pyrolysis char, a regenerated activated carbon sorbent, an activated carbon or regenerated activated carbon with a mass mean particle size of 1 micron to 1.000 microns, 1 micron to 200 microns, 1 micron to 100 microns, 1 micron to 20 microns, 10 microns to 50 microns, 50 microns to 200 microns, or a size that is greater than the fly ash in a flue gas stream to be treated (e.g., greater than 40 microns, or greater than 60 microns), or a combination thereof. The non-carbon sorbent can be any suitable non-carbon material, such as a porous felsic material, a vesicular felsic material, a porous basaltic material, a vesicular basaltic material, a clay-based compound, an alkaline compound, a calcium hydroxide compound, a sodium acetate compound, a bicarbonate compound, or a combination thereof. The non-carbon sorbent can be a clay (e.g., bentonite), an ammonium salt (e.g., ammonium sulfate), an alkaline material (e.g., lime), or a combination thereof. In various embodiments, the non-carbon sorbent can be an ammonium salt that is promoted by the halogen or halide promoter. In various embodiments, mercury removal efficiencies of embodiments including non-carbon sorbent (e.g., promoted or not) can exceed or match that of conventional methods with added benefits such as reduced costs.

The sorbent can have any suitable proportion of the carbon sorbent to the non-carbon sorbent, such as a weight ratio of about 0:1, about 1:0, about 5:1 to about 1:5, about 2:1 to about 1:2, or about 5:1 or less, or less than, equal to, or greater than about 4:1, 3:1, 2:1, 1:1, 1:2, 1:3, 1:4, or about 1:5 or more. The carbon sorbent and non-carbon sorbent, together, can form any suitable proportion of the sorbent, such as about 100 wt %, such as 50 wt % or more, or less than, equal to, or greater than 60 wt %, 70, 80, 85, 90, 92, 94, 96, 98, 99, 99.9, or 99.99 wt % or more. The sorbent can have any suitable particle size (e.g., largest dimension). In an embodiment, the sorbent may have a mass mean particle diameter of 1 micron to 1.000 microns, 1 micron to 200 microns, 1 micron to 100 microns, 1 micron to 20 microns, 10 microns to 50 microns, 50 microns to 200 microns, 1-15 micrometers, 5-25 micrometers, 25-40 micrometers, 40-100 micrometers, 60-200 micrometers, or greater than about 200 micrometers. In some embodiments, the promoted and optionally ammonium salt-protected sorbent can have an average particle size distribution dissimilar to the entrained ash particles in the gas stream from which mercury is to be removed, such that the reaction product can be substantially removed from the entrained ash particles by physical means.

The promoted sorbent can include any suitable amount of promoter. For example, the sorbent can include from about 1 to about 30 grams promoter per 100 grams of sorbent (e.g., carbon sorbent, non-carbon sorbent, or a combination thereof). The promoter can be about 0.001 wt % to about 30 wt % of the promoted and optionally ammonium salt-protected sorbent, about 1 wt % to about 15 wt %, or about 0.001 wt % or less, or less than, equal to, or greater than about 0.01 wt %, 0.1, 1, 2, 3, 4, 5, 6, 7, 8, 9, 10, 11, 12, 13, 14, 15, 16, 18, 20, 22, 24, 26, 28, or about 30 wt % or more. Further, for example, when the promoter or promoter precursor are added to the coal or to the combustion zone (e.g., furnace), the promoter (or promoter precursor) can have a concentration of about 1 to about 3000 ppmw per weight of coal, or about 1 to 1000 ppmw, or about 1 to 500, or about 1 to 250 ppmw, or about 1 to 100 ppmw, or about 1 to 50 ppmw, or about 1-30 ppmw, or about 1 to 10 ppmw, or about 1 to 5 ppmw per weight of coal.

The promoter can be any suitable promoter that forms a promoted and optionally ammonium-protected sorbent as described herein. For example, the promoter can be a halide promoter such as HCl, HBr, HI, $Br_2$, $Cl_2$, $I_2$, BrCl, IBr, ICl, ClF, $PBr_3$, $PCl_5$, $SCl_2$, $CuCl_2$, $CuBr_2$, $Al_2Br_6$, $FeI_x$ (x=1, 2, 3, or 4). $FeBr_y$ (y=1, 2, 3, or 4). $FeCl_z$ (z=1, 2, 3, or 4), $MnBr_2$, $MnCl_2$, $NiBr_2$, $NiCl_2$, $NiI_2$, $ZnBr_2$, $ZnCl_2$, $ZnI_2$, $NH_4Br$, $NH_4Cl$, $NH_4I$, $NH_4F$, or a combination thereof. The promoter precursor can be a metal halide or a nonmetal halide. The promoter can be HBr.

The method can include forming the promoter from a promoter precursor, such as during combustion with the coal or downstream of the coal combustion in the flue gas. The promoter precursor can be any suitable material that can transform into a suitable promoter, such as an elemental halogen, a Group V halide, a Group VI halide, a hydrohalide, an ammonium halide, a metal halide, a nonmetal halide, an alkali earth metal halide, an alkaline earth metal halide, or a combination thereof. The promoter precursor can be NaBr, NaCl, $CaI_2$, NaI, $Br^-$, $Cl^-$, $I^-$, KI, KCl, LiCl, LiBr, $CuCl_2$, $CuBr_2$, AgCl, AgBr, $CHI_3$, $CH_3Br$, AuBr, $FeI_x$ (x=1, 2, 3, or 4), $FeBr_y$ (y=1, 2, 3, or 4). $FeCl_z$ (z=1, 2, 3, or 4), $MgBr_2$, $MgCl_2$, $MnBr_2$, $MnCl_2$, $NiBr_2$, $NiCl_2$, $NiI_2$, $ZnBr_2$, $ZnCl_2$, $ZnI_2$. $CaI_2$, $CaBr_2$, $CaCl_2$, or a combination thereof. The promoter precursor can have any suitable particle size, such as a particle size of about 0.1 µm to about 1000 µm, or about 0.1 µm or less, or less than, equal to, or greater than 1, 2, 3, 4, 5, 6, 7, 8, 9, 10, 12, 14, 16, 18, 20, 25, 30, 35, 40, 45, 50, 60, 70, 80, 90, 100, 125, 150, 175, 200, 250, 300, 350, 400, 450, 500, 600, 700, 800, 900, or about 1000 µm or more.

In various embodiments, at least one of the promoter and the promoter precursor is independently HCl, HBr, HI, $Br_2$, $Cl_2$, $I_2$, BrCl, IBr, ICl, ClF, $PBr_3$, $PCl_5$, $SCl_2$, $CuCl_2$, $CuBr_2$, $Al_2Br_6$, $FeI_x$ (x=1, 2, 3, or 4), $FeBr_y$ (y=1, 2, 3, or 4), $FeCl_z$ (z=1, 2, 3, or 4), $MnBr_2$, $MnCl_2$, $NiBr_2$, $NiCl_2$, $NiI_2$, $ZnBr_2$, $ZnCl_2$, $ZnI_2$, $NH_4Br$, $NH_4Cl$, $NH_4I$, $NH_4F$, NaBr, NaCl, NaI, $Br^-$, $Cl^-$, $I^-$, KI, KCl, LiCl, LiBr, $CuCl_2$, $CuBr_2$, AgCl, AgBr, $CHI_3$, $CaI_2$, $CH_3Br$, AuBr, $FeI_x$ (x=1, 2, 3, or 4), $FeBr_y$ (y=1, 2, 3, or 4), $FeCl_z$ (z=1, 2, 3, or 4), $MgBr_2$, $MgCl_2$, $MnBr_2$, $MnCl_2$, $NiBr_2$, $NiCl_2$, $NiI_2$, $ZnBr_2$, $ZnCl_2$, $ZnI_2$, $CaI_2$, $CaBr_2$, $CaCl_2$, or a combination thereof.

Promotion.

The method can include combusting coal that includes the promoter (e.g., halide promoter), a promoter precursor, or a combination thereof (e.g., coal to which the promoter precursor has been added), wherein the promoter or promoter precursor is in the form of a liquid (e.g., solution), solid, gas, or combination thereof. The promoter or promoter precursor can be added to the combustion chamber as a liquid, solid, gas, or combination thereof. The promoter precursor can transform into the promoter during or after the combustion. The promoter can combine with an added sorbent downstream of the combustion to form a promoted sorbent. The method can include adding the promoter, promoter precursor, or a combination thereof, to the coal prior to the combustion thereof. The promoter, promoter precursor, or a combination thereof, can be added to the coal in any suitable way, for example, as a solid, liquid, gas, or in an organic solvent, such as a hydrocarbon, a chlorinated hydrocarbon, supercritical carbon dioxide, or a combination thereof.

The method can include adding into the mercury-containing gas stream the promoter, a promoter precursor, or a combination thereof. For example, the promoter, the promoter precursor, or a combination thereof, can be added (e.g., as a solid, liquid, gas, or combination thereof) into the furnace, into the flue gas, or into any suitable location that allows the promoter to combine with the sorbent to form a promoted sorbent.

The method can include adding the promoter or promoter precursor within (e.g., to) the coal/gas combustion zone, or gasification zone. The promoter precursor can transform into the promoter during or after the combustion, or gasification. The promoter can combine with an added sorbent downstream of the combustion to form a promoted sorbent.

Ammonium Salt Protection.

The promoted ammonium salt-protected sorbent can include ammonia (e.g., ammonia that forms from thermal decomposition of the ammonium salt), the ammonium salt, or a combination thereof. The ammonia can result from the ammonium salt protection of the promoted sorbent or non-promoted sorbent. The ammonia or ammonium salt can be any suitable proportion of the promoted ammonium salt-protected sorbent, such as about 0.001 wt % to about 30 wt %, about 0.01 wt % to about 15 wt %, or about 0.001 wt % or less, or less than, equal to, or greater than about 0.01 wt %, 0.1, 1, 2, 3, 4, 5, 6, 7, 8, 9, 10, 11, 12, 13, 14, 15, 16, 18, 20, 22, 24, 26, 28, or about 30 wt % or more. The released ammonia can collect in the pore structures of the sorbent or release into the gas phase in close proximity to the sorbent particle. In either space the ammonia can react with and neutralize sulfur(VI) species in the gas phase, removing them from the gas phase and preventing their interference with the active site on the sorbent surface. Some ammonia can also bind to deposits of ammonium salt surrounding the active site, and can react with sulfur VI species before they neutralize the active site in the sorbent. In some embodiments, the ammonium salt can be promoted and can react with mercury; for example, the counterion of the ammonium salt can act as a Lewis base, donating electrons to an elemental halogen promoter to form a diatomic elemental halogen having an electron-rich end and an electron-deficient end that is activated for reaction with mercury, thereby providing a promoted non-carbon sorbent that is activated for reaction with mercury via reaction of electron-rich mercury with the electron-deficient end of the elemental halogen.

In some embodiments, the promoted ammonium salt-protected sorbent can include an anionic counterion of the ammonium salt. The anionic counterion can result from the ammonium salt protection of the promoted sorbent or a non-promoted sorbent. The anionic counterion of the ammonium salt can be any suitable proportion about 0.001 wt % to about 30 wt % of the promoted ammonium salt-protected sorbent, 0.01 wt % to about 15 wt %, or about 0.001 wt % or less, or less than, equal to, or greater than about 0.01 wt %, 0.1, 1, 2, 3, 4, 5, 6, 7, 8, 9, 10, 11, 12, 13, 14, 15, 16, 18, 20, 22, 24, 26, 28, or about 30 wt % or more.

The method can further include protecting a precursor sorbent with an ammonium salt to form the promoted ammonium salt-protected sorbent particles. The precursor sorbent can be a promoted sorbent, or a sorbent that is free of halide-promotion. The protecting of the promoted or non-promoted sorbent particles with the ammonium salt can include subjecting a mixture including the sorbent particles and the ammonium salt to heating, microwaving, irradiating, or a combination thereof. The mixture including the sorbent particles and the ammonium salt can have any suitable ratio of the sorbent particles (e.g., either promoted or unpromoted) to the ammonium salt, such as about 1:100 to about 100:1, about 1:1 to about 1:5, or about 1:100 or less, or less than, equal to, or greater than about 1:90, 1:80, 1:70, 1:60, 1:50, 1:40, 1:30, 1:20, 1:10, 1:9, 1:8, 1:7, 1:6, 1:5, 1:4, 1:3, 1:2, 1:1, 2:1, 3:1, 4:1, 5:1.6:1, 7:1, 8:1, 9:1, 10:1, 20:1, 30:1, 40:1, 50:1, 60:1, 70:1, 80:1, 90:1, or about 100:1 or more.

The promoted ammonium salt-protected sorbent particles can be ammonium salt-protected prior to addition to the mercury-containing gas stream, wherein the ammonium salt-protection of the promoted sorbent particles or of precursor sorbent particles occurs prior to addition of the promoted sorbent particles to the mercury-containing gas stream. The ammonium salt-protection of the promoted sorbent particles or of precursor sorbent particles (e.g., sorbent particles free of promotion) can occur in-flight in the mercury-containing gas stream.

The ammonium salt can be added to a coal-burning power plant at any suitable location. The method can include adding the ammonium salt into the mercury-containing gas stream, such as into the flue gas, such as at any location within the combustion zone or downstream of the combustion zone. The ammonium salt can be added together with the promoted sorbent particles or precursor sorbent particles (e.g., sorbent particles free of halide-promotion) into the mercury-containing gas stream. The ammonium salt can be added into the mercury-containing gas stream separately from addition of the promoted sorbent particles or precursor sorbent particles into the mercury-containing gas stream.

The ammonium salt can be any suitable ammonium salt that can form an ammonium salt-protected sorbent as described herein. The ammonium salt can be an ammonium halide that is also used as a promoter precursor in the method, wherein addition of the promoter precursor and the ammonium salt can occur simultaneously as the same step in the method, advantageously producing ammonia and promoting the sorbent. The ammonium salt can be an ammonium halide, a methylammonium halide, an ammonium salt of an oxyacid of a Group VI element, an ammonium salt of an oxyacid of a Group V element, or a combination thereof. The counterion of the ammonium salt can be an anion of a halogen or Group VI element, an oxyanion of a Group VI element such as sulfate, sulfite, thiosulfate, dithionite, or an oxyanion of a Group V element such as nitrate, nitrite, phosphate, phosphite, thiophosphate, or carbonate. The ammonium salt can be ammonium bromide, ammonium iodide, ammonium chloride, an organic halide with a formula of $CH_3NH_3X$ (wherein X is Cl, Br or I), ammonium sulfate, ammonium hydrogen sulfate, ammonium sulfite, ammonium hydrogen sulfite, ammonium persulfate, ammonium pyrosulfate, ammonium thiosulphate, ammonium dithionite, ammonium aluminium sulfate, ammonium iron sulfate, ammonium sulfamate, ammonium phosphate, diammonium phosphate, ammonium hydrogen phosphate, ammonium dihydrogen phosphate, ammonium thiophosate, ammonium nitrate, ammonium nitrite, ammonium carbonate, ammonium thiocyanate, ammonium sulfide, ammonium hydrogen sulfide, ammonium acetate, ammonium carbamate, ammonium carbonate, ammonium chlorate, ammonium chromate, ammonium fluoride, ammonium formate, ammonium hydroxide, ammonium perchlorate, or a combination thereof. The ammonium salt can be ammonium sulfate. The ammonium salt can have any suitable particle size, such as a particle size of about 0.1 µm to about 1000 µm, about 0.1 µm to about 10 µm, or about 0.1 µm or less, or less than, equal to, or greater than about 0.5 µm, 1, 2, 3, 4, 5, 6, 8, 10, 12, 14, 16, 18, 20, 25, 30, 35, 40, 45, 50, 60, 70, 80, 90, 100, 125, 150, 175, 200, 250, 300, 350, 400, 450, 500, 600, 700, 800, 900, or about 1000 µm or more.

Ammonium Salt-Protected Sorbent Particles.

In various embodiments, the present invention provides ammonium salt-protected sorbent particles, such as any embodiment of the promoted or unpromoted ammonium salt-protected sorbent particles described herein or that can perform an embodiment of the method for mercury removal described herein. The ammonium salt-protected sorbent particles can include ammonia, an ammonium salt, or a combination thereof in at least a surface layer thereof.

In some embodiments, the ammonium salt-protected sorbent particles are promoted ammonium salt-protected sorbent particles. For example, the promoted ammonium salt-protected sorbent particles can include active sites that bind with mercury atoms. The active sites can include carbocations bound to promoter anions (e.g., halides).

The ammonium salt-protected sorbent particles can further include an anionic counterion. The anionic counterion can be derived from the ammonium salt or precursor thereof.

Hydrogen Iodide-Promoted Sorbent.

An iodine promoter, or promoter precursor, can be introduced into the furnace (combustion zone) or hot zone as either an alkali iodide salt (or solution) or as an oxidizing iodine salt. The iodine salt can be any suitable iodine salt, $CaI_2$, $NaI$, $KI$, $CHI_3$, $FeI_x$ (x=1, 2, 3, or 4), $NiI_2$, $ZnI_2$, $CaI_2$, $HI$, $IBr$, $ICl$, $NH_4I$, or a combination thereof. The one or more iodine salts can be converted at high temperature to an elemental form, such as to the elemental iodine, which further reacts with flue gas components to form a variety of forms including hydrogen iodide (HI) and other nonmetal iodides. These forms then further react with added sorbent (e.g., carbon, non-carbon, or a combination thereof), or sorbent impregnated with the secondary components, leading to formation of the promoted form of sorbent. In sorbents including carbon (e.g., activated carbon), the promoted form of sorbent includes reactive carbenium iodide species. A similar process of activation also occurs for non-carbon sorbents.

For other technologies, where molecular iodine ($I_2$) is added directly to sorbent, the addition is recognized in the art to occur in a reversible fashion, and subsequently iodine vapor is emitted from the sorbent even at lower temperatures. Thus, concentrations of remaining iodine on the sorbent at elevated temperatures is extremely low. On carbon sorbents, the molecular iodine in the reversible state is believed to be physisorbed and attached not at the edge structures but rather on the basal planes as a weak pi-complex, and in this complexed state, the molecular iodine is not a good oxidant and capturing agent.

In contrast, the promoted sorbent of this invention is thermally stable and does not emit the purple vapors characteristic of iodine even when heated to temperatures of 125° C. typically encountered in utility flue gas. Unlike sorbent exposed to iodine vapor, the promoted sorbent in this invention is odorless and does not cause skin irritation since the hydrogen iodide is completely reacted with the sorbent to produce the HI-promoted sorbent. It is therefore structurally similar in composition to the bromide-containing sorbents described in U.S. Pat. No. 7,435,286. XPS spectra has demonstrated that the bromide-promoted sorbent contains both covalent carbon-bound (organic) bromide as well as anionic bromide paired with the carbenium ions on the carbon surface.

The present invention provides a cost-effective way to capture pollutants by utilizing exceptionally reactive halogen/halide promoted sorbents (carbon, non-carbon, or a combination thereof) using a iodide (or other halogen/halide) treatment that enhances capture of mercury via mercury-sorbent surface reactions, at very short contact times of seconds or less. The sorbent does not require in situ activation (no induction period) in the gas stream to achieve high reactivity, as do, for example, conventional activated carbon sorbents. The reactivity of the sorbent toward the pollutants is greatly enhanced and the sorption capacity can be regenerated, the promoted sorbent may be regenerated, recycled and/or reused.

The promoted sorbents, treatment techniques, and optional additives discussed herein have applicability to mercury control from the product or effluent gas or gases from gasification systems, syngas generators, and other mercury-containing gas streams, in addition to the flue gas from combustion systems. Thus, it should be understood that the terms combustion system and flue gas as used throughout this description may apply equally to gasification systems and syngas or fuel gas, as will be understood by those skilled in the art.

Mercury Control System.

Referring now to FIG. 1, a schematic flow diagram is provided of mercury control system 100 including preparation of promoted sorbents, and flue gas mercury reduction, in accordance with embodiments of the present invention. There is provided sorbent reservoir 110 (e.g., carbon sorbent, non-carbon material, or a combination thereof, wherein carbon sorbents can include powdered activated carbon, granular activated carbon, carbon black, carbon fiber, aerogel carbon, pyrolysis char, any carbonaceous material described herein or a material derived via pyrolization/devolatization thereof, or a combination thereof) wherein the reservoir 110 can optionally include ammonium salt and/or alkali, an optional halogen/halide promoter (or promoter precursor) reservoir 120, an optional ammonium salt reservoir 130, and an optional alkali (or ammonium salt) component reservoir 180, each of which with corresponding flow control device(s) 201, 202, 203, and 208/209, respectively.

In conjunction with the optional alkali (or ammonium salt) component reservoir 180, optional flow control devices 208 and 209 can be used independently, together, or not at all. Reservoirs 110, 120, 130, and 180 connect through their respective flow control devices and via associated piping, to transport line 115. Optional alkali (or ammonium salt) component reservoir 180 may also connect, through respective flow control devices and via associated piping, to transport line 118. A source of air, nitrogen, or other transport gas(es) is provided by gas source 170 to transport line 115 for the purpose of entraining materials discharged from reservoirs 110, 120, 130, and 180 and injecting such materials, via injection point 116, into contaminated flue gas stream 15. A source of air, nitrogen, or other transport gas(es) may be provided by gas source 171 to transport line 118 for the purpose of entraining materials discharged from reservoirs 180 and injecting such materials, via injection point 119, into flue gas stream 15. Reservoirs 110, 120, 130, and 180 may be the same or different, as desired. Reservoirs 110, 120, 130, and 180 through 201, 202, 208, and 209 may be injected/added to stream 15 directly, together, or separately, at any location. Gas sources 170 and 171 may be the same or different, as desired. Alternatively, transport gas(es) may be provided to both transport lines 115 and 118 by gas source 170 (connection from source 170 to line 118 not shown). Although gas sources 170 and 171 are shown in FIG. 1 as compressors or blowers, any source of transport energy known in the art may be acceptable, as will be appreciated by those of skill in the art. Stream 15 may be contaminated (mercury containing) flue gas, or coal stream that is combusted to generate contaminated (mercury containing) flue gas stream.

For clarity, single injection points 116 or 119 are shown in FIG. 1, although one skilled in the art will understand that multiple injection points are within the scope of the present invention. Further, points 116 and 119 may be interchangeable, with one or the other preceding the other. Optical density measuring device (s) 204 is connected to transport line 115 and/or 118 to provide signals representative of the optical density inside transport line 115 and/or 118 as a function of time.

Downstream from injection point 116 and 119 is provided particulate separator 140. By way of illustration and not limitation, particulate separator 140 may include one or more fabric filters, one or more electrostatic precipitators (hereinafter "ESP"), one or more scrubbers, or other particulate removal devices as are known in the art. It should be further noted that more than one particulate separator 140 may exist, sequentially or in parallel and that injection point 116 and 119 may be at a location upstream and/or downstream of 140 when parallel, sequential, or combinations thereof exist. Particulate separator 140 produces at least a predominantly gaseous ("clean") stream 142, and a stream 141 including separated solid materials. An optional sorbent/ash separator 150 separates stream 141 into a largely ash stream 152, and a largely sorbent stream 151. Stream 151 may then be passed to an optional sorbent regenerator 160, which yields a regenerated sorbent stream 161 and a waste stream 162.

An optional Continuous Emission Monitor (hereinafter "CEM") 205 for mercury is provided in exhaust gas stream 35, to provide electrical signals representative of the mercury concentration in exhaust stream 35 as a function of time. The optional mercury CEM 205 and flow controllers 201, 202, 203, 208, and 209 are electrically connected via optional lines 207 (or wirelessly) to an optional digital computer (or controller) 206, which receives and processes signals and controls the preparation and addition of promoted sorbent into contaminated flue gas stream 15.

In operation, sorbent along with optional alkali (or ammonium salt) component (or precursor) is added (e.g., injected) into contaminated flue gas stream 15. After contacting the injected material with the contaminated flue gas stream 15, the injected sorbent, or precursors that then form the promoted ammonium salt-protected sorbent, reduces the mercury concentration, transforming contaminated flue gas into reduced mercury flue gas, 25. The injected material is removed from the flue gas 25, by separator 140, disposed of or further separated by optional separator 150, and disposed of or regenerated by an optional regenerator 160, respectively. The reduced mercury "clean" flue gas stream 42 (or 35) is then monitored for mercury content by an optional CEM 205, which provides corresponding signals to an optional computer/controller 206. Logic and optimization signals from 206 then adjust flow controllers 201, 202, 203, 208, 209 to maintain the mercury concentration in exhaust stream 35 within desired limits, according to control algorithms well known in the art. Flow controllers 201, 202, 203, 208, 209 can also be adjusted manually or be some other automated means to maintain the mercury concentration in exhaust stream 35 within desired limits, according to control algorithms well known in the art.

Referring still to FIG. 1, there are illustrated several embodiments for preparation and addition of sorbent and/or alkali (or ammonium salts) components in accordance with the present invention. Stream 111 provides for introduction of sorbent (and optionally alkali, or ammonium salt) from reservoir 110, as metered by flow controller 201 manually or under the direction of computer 206. The halogen/halide may be combined and react with the sorbent according to any of several provided methods. The halogen/halide and/or promoter precursors may be combined via line 121 directly into transport line 115, within which it contacts and reacts with the sorbent prior to injection point 116. This option is one form of what is referred to herein as "in-flight" preparation of a promoted sorbent in accordance with the invention. The halogen/halide and/or precursors may be combined via line 121 directly into stream 15, or upstream of stream 15 (such as in the furnace, or on the coal which is combusted to form stream 15), within which it contacts and reacts with the sorbent in stream 15. This option is another form of what is referred to herein as "in-flight" preparation of a promoted sorbent or promoted protected sorbent in accordance with the invention. Further, the halogen/halide and/or promoter precursors may be combined via line 121b with sorbent prior to entering transport line 115. The halogen/halide and/or promoter may be a liquid, salt solution, solvent, solid, or gas/vapor.

Still further, the halogen/halide and/or promoter precursors may be contacted and react with the sorbent by introduction via line 121c into reservoir 110. This option is employed when, for example, reservoir 110 includes an ebulliated or fluidized bed of sorbent, through which halogen/halide flows in gaseous form or as a vapor. The halogen/halide may be contacted with the sorbent in liquid form or in a solvent, as discussed previously, and solvent removal (not shown in FIG. 1) may then be provided if necessary.

Similarly, the optional alkali (or ammonium salt) may be contacted and react directly in transport line 115 via line 131, or optionally as described above with respect to the halogen/halide, via lines 131b and 131c, or added in reservoir 110 (in which case 110 and 130 are same reservoir) and added via lines 111 and 115, or injected directly into stream 115 to form the promoted protected sorbent, either in line 115 or stream 15.

Similarly, the optional alkali and/or ammonium salt component (s) from 180 may either be added to reservoir 110 (in which case 110 and 180 are same reservoir) and injected via lines 111 and 115, or injected in transport line 115 directly, or may be injected separately by transport line 118, combining in 115, or in flue gas stream 15 for synergistic effects with sorbent, promoted sorbent, or optional secondary components. Being able to vary the amount of the optional alkali and/or ammonium salt component(s) relative to sorbent, promoted sorbent, or optional secondary components is a key feature to overcome and optimize for site-specific operating and flue gas conditions.

Proposed Chemical Mechanism.

Figure 2:
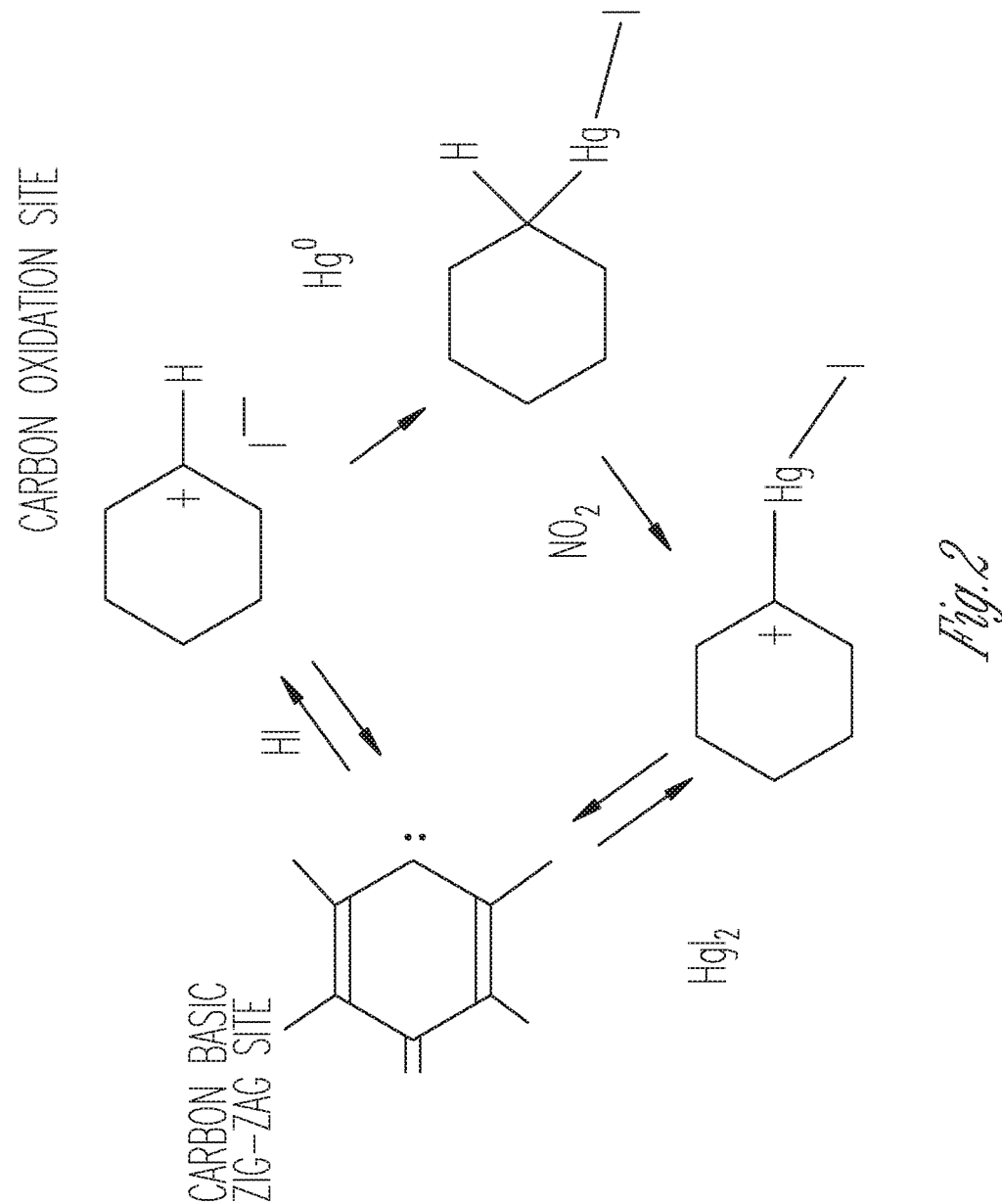
FIG. 2 illustrates an overall proposed mechanism of promotion of activated carbon with iodide and subsequent reaction with elemental mercury, in accordance with various embodiments.
Figure 3:
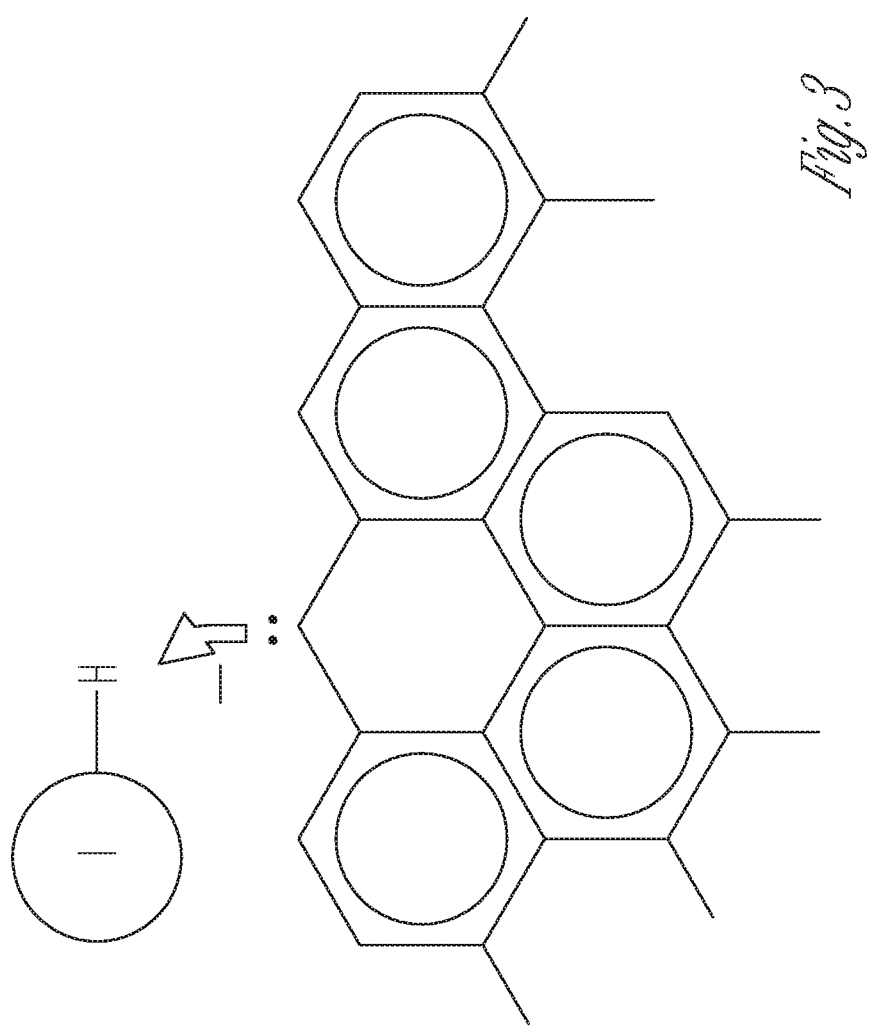
FIG. 3 illustrates a reaction of HI with a carbene site on the activated carbon, in accordance with various embodiments.

The present invention is not limited to any particular mechanism of operation. Referring now to FIG. 2, there is illustrated a proposed chemical mechanism to explain the formation of iodide-promoted activated carbon and its reaction with elemental mercury. The promotion mechanism in initiated by hydrogen iodide reacting with the unsaturated edge structure of the activated carbon, as illustrated in FIG.

Figure 4:
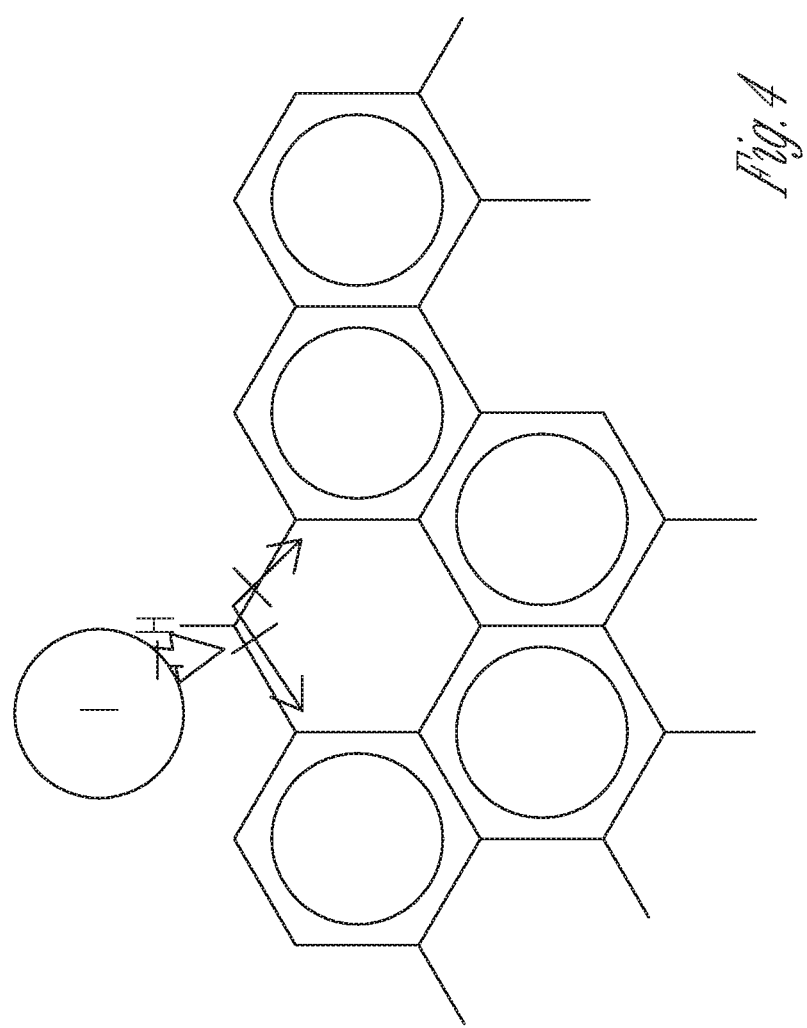
FIG. 4 illustrates a promoted carbenium-iodide ion pair resulting from reaction with HI, in accordance with various embodiments.

3, to form the carbenium ion which exists as an ion pair with the iodide ion, as illustrated in FIG. 4.

In contrast, molecular iodine does not react to form a similar structure, but instead can form a weak molecular complex with the basal planes of the activated carbon but only at low temperatures. At elevated temperatures the thermodynamically unstable complex will not persist, and concentrations of complexed iodine on the surface will be extremely low."

Molecular orbital theory predicts that carbenium ions that are part of unsaturated systems typically exhibit a delocalization or dispersal of the charge over alternating carbons of the unsaturated structure. Sometimes delocalization results in greater stability and hence lower reactivity. However, the extent of the delocalization depends on the environment, and thus reactivity can be adjusted by factors such as the type and proximity of anionic constituents of the sorbent. FIG. 4 illustrates the inductive effect of the iodide closely proximate to the reacted edge carbon, whereby the iodide negative charge pushes away pi electrons on the edge carbon thereby increasing the net positive charge on the carbon. This induces a polarization (e.g., greater charge separation) on the edge structure. The higher charge on the carbon results in greater reactivity toward the mercury (e.g., increased oxidation potential).

Figure 5:
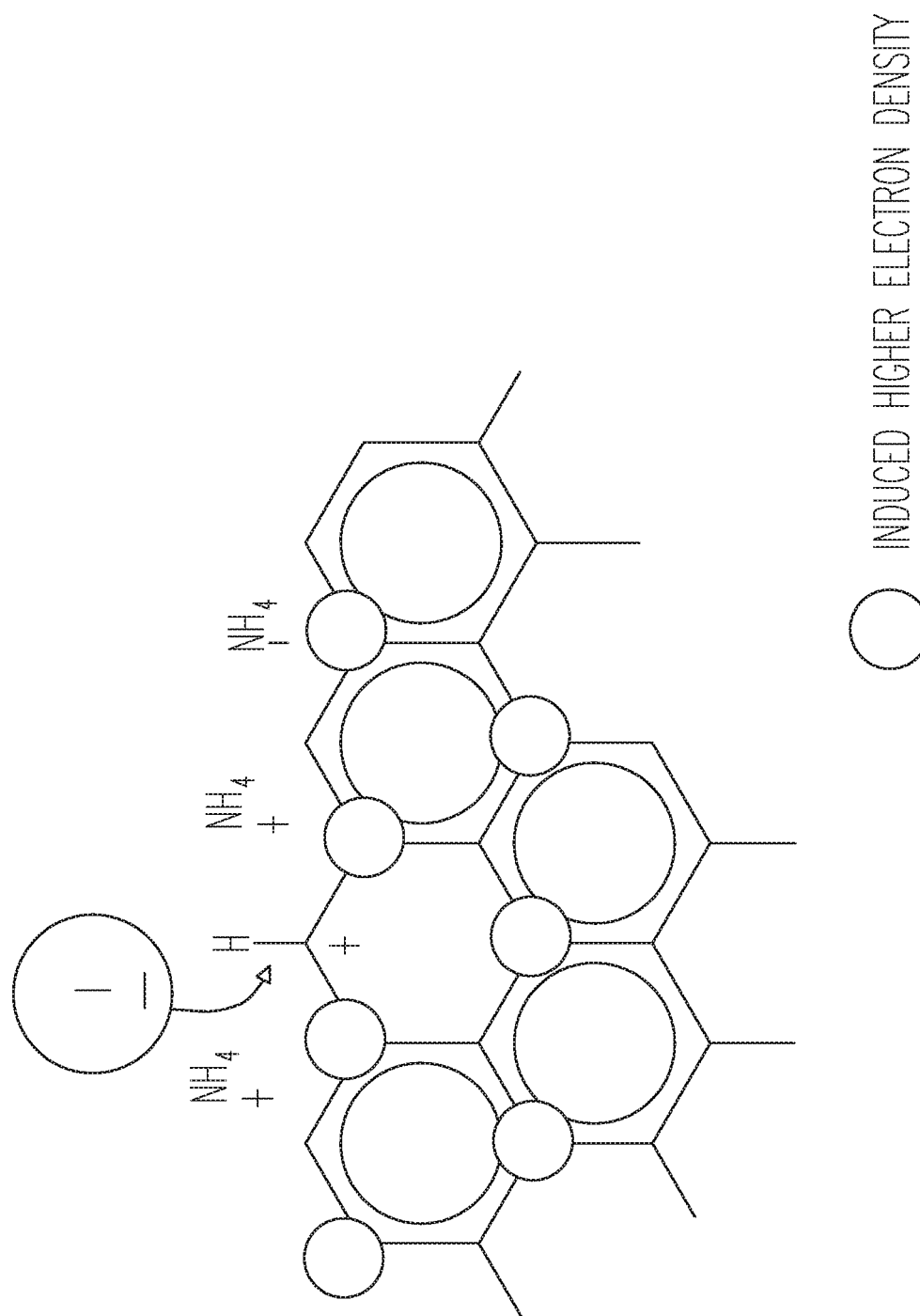
FIG. 5 illustrates a promoted carbenium-iodide ion pair in the present of an ammonium salt, in accordance with various embodiments.

FIG. 5 illustrates the product of the reaction of the carbenium-iodide ion pair with a secondary component, ammonium sulfate, a volatile Group 5 salt. In various embodiments, formation of the iodide compound with secondary component increases the reactivity of the iodide-carbenium ion pair toward mercury and other pollutants. FIG. 5 illustrates the reason for the enhancement of reactivity toward elemental mercury. The ammonium cations from the ammonium salt are shown having collected on the surface adjacent to the active site. The cationic ammonium ions collected on the surface create an additional inductive effect on the pi electrons on the edge structure, with electrons drawn in the direction of the additional cations and away from the carbenium carbon. This is shown with shading on the adjacent carbons of the rings. This induction makes the carbenium center carbon more positive and a better electrophile for attracting the electron clouds of the mercury atom. The more polarized state has a higher oxidation potential and is therefore more reactive.

Figure 6:
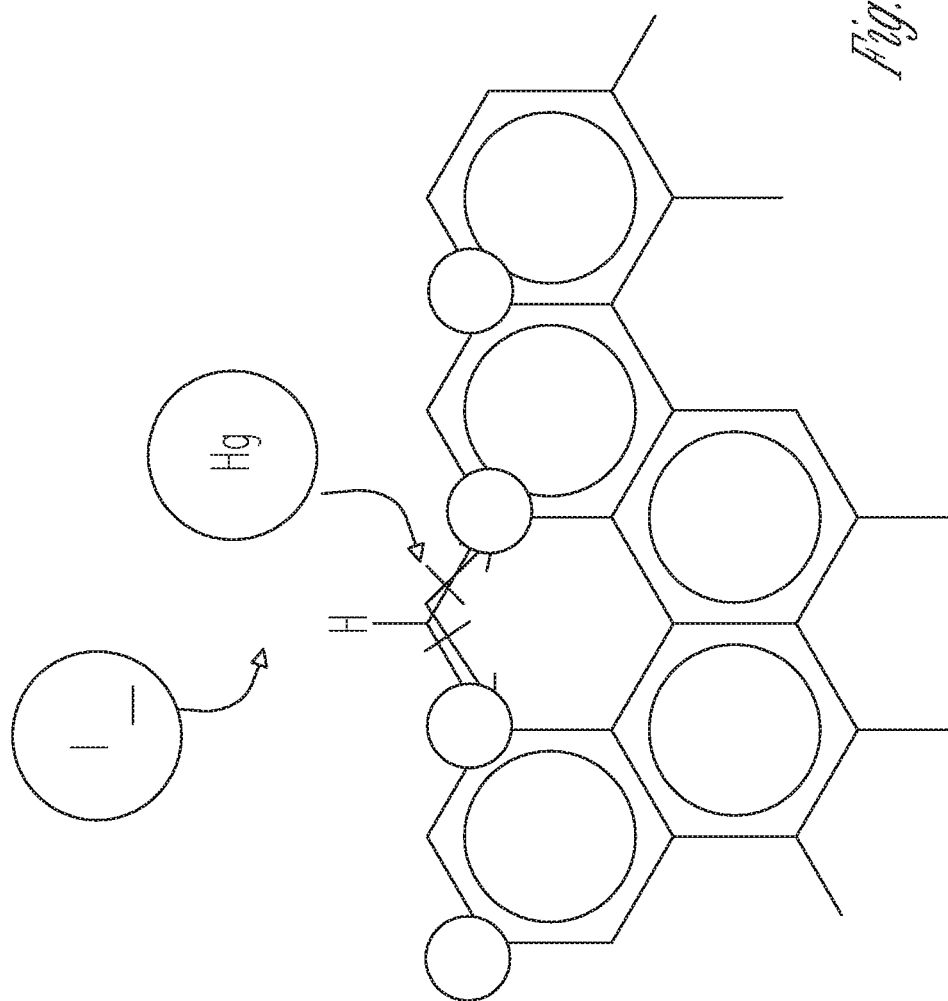
FIG. 6 illustrates a reaction of elemental mercury with a promoted carbenium-iodide ion pair in the presence of an ammonium salt, with ammonium ions omitted for simplicity, in accordance with various embodiments.

The resulting iodide-carbenium ion pair is uniquely suited to facilitate oxidation of the mercury. FIG. 6 illustrates the approach of the mercury atom owing to the attractive electrostatic force exerted by the cationic center for the diffuse electrons of the mercury atom. Ammonium groups are omitted from FIG. 6 for simplicity. As the mercury atom approaches the carbenium, the iodide moves away.

Figure 7:
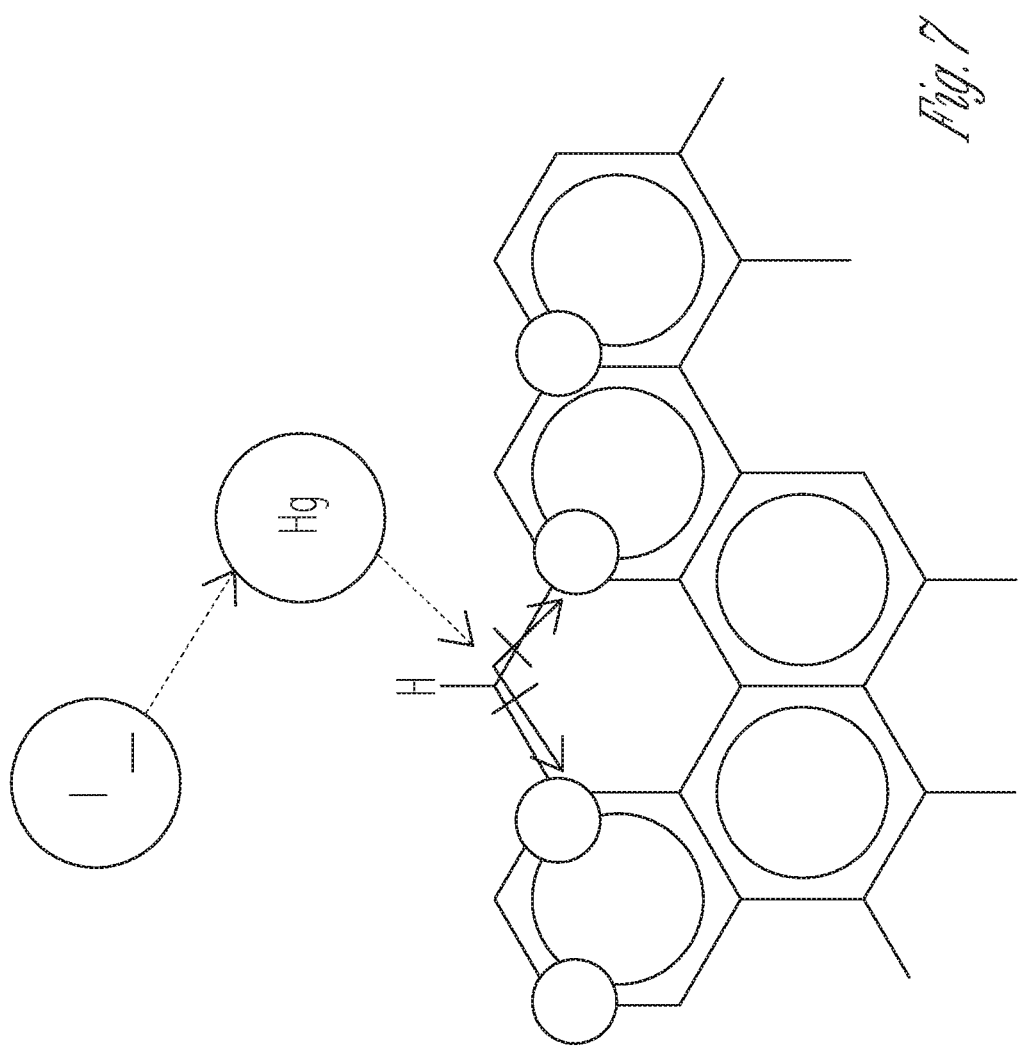
FIG. 7 illustrates a transition state for reaction of elemental mercury with a promoted carbenium-iodide ion pair in the presence of an ammonium salt, with ammonium ions omitted for simplicity, in accordance with various embodiments.

FIG. 7 illustrates a transition state for the bond-forming reaction of the mercury with the carbenium group. A covalent bond begins to develop between the mercury and the carbon utilizing a pair of electrons from the mercury. Simultaneously the iodide begins to donate electrons to the mercury from the backside, thereby stabilizing the positive charge developing on the mercury and lowering the energy requirement for the oxidation process. Iodide is especially reactive, owing to the highly polarizable electrons in the outer 5p orbitals of the ion.

The effectiveness of the oxidation can therefore result from the promotion effect of the halide and the bonding effect exerted on the developing positive charge on the mercury during the oxidation, known in the chemical art as a specific catalytic effect. The effectiveness of the oxidation is enhanced by use of the secondary component, which can enhance the positive charge of the carbenium as well as help to stabilize the transition state as the mercury reacts with the carbenium group.

Figure 8:
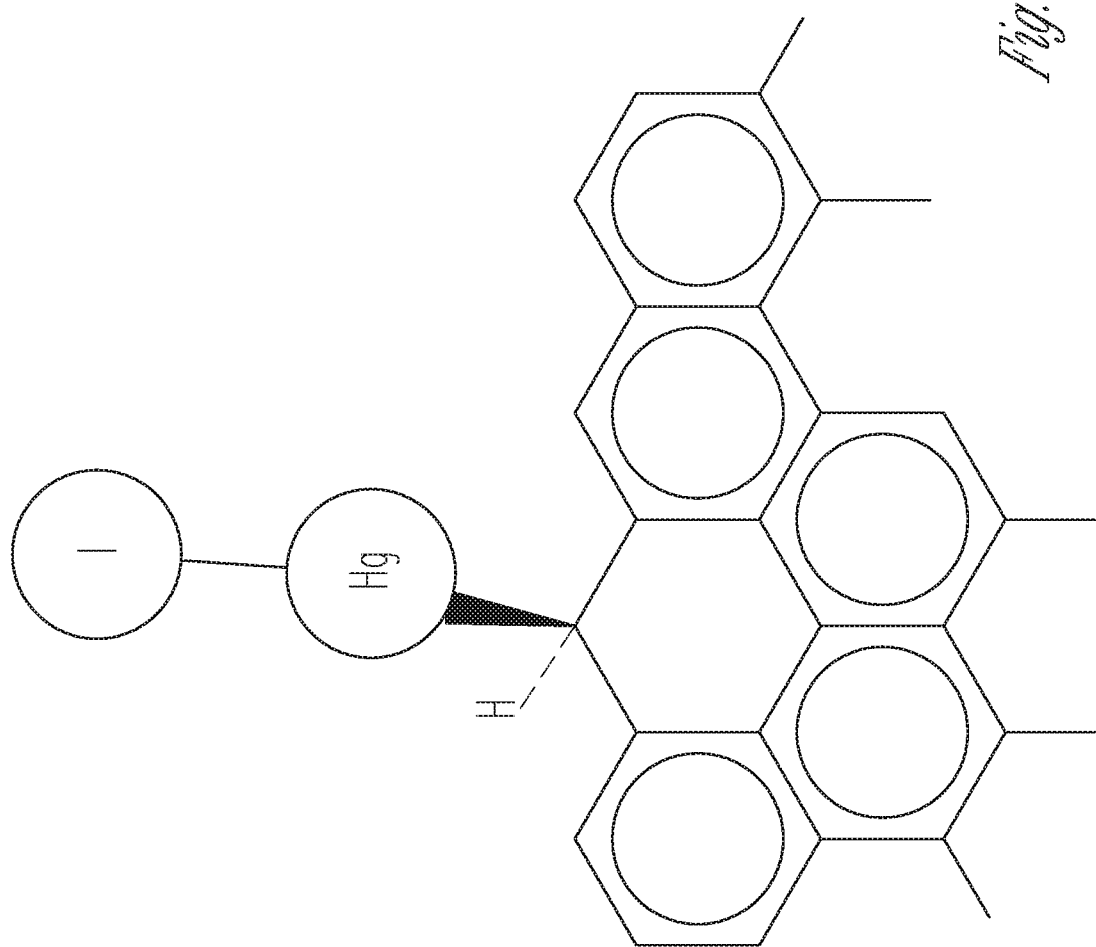
FIG. 8 illustrates a product of reaction of elemental mercury with a promoted carbenium-iodide ion pair in the presence of an ammonium salt, with ammonium ions omitted for simplicity, showing mercury covalently bonded with the edge carbon of the activated carbon, in accordance with various embodiments.

In the final product illustrated in FIG. 8, covalent bonds have formed between the carbon and mercury and mercury and iodine, forming an organomercury iodide.

Halogens in Mercury Capture.

Methodologies for using halogens for the treatment of flue gas have been problematic, owing to their reactivity with other gases and metals, resulting in corrosion and health issues. A "halogen" is defined as a member of the very active elements including Group VIIA (CAS nomenclature is used throughout; Group VIIA (CAS) corresponds to Group VIIB (IUPAC)) of the periodic table. In the molecular elemental form of the halogens, including $F_2$, $Cl_2$, $Br_2$, and $I_2$, the reaction with other hot flue gas components leave little to react with elemental mercury. The atomic elemental halogen form, which includes the fluorine, chlorine, bromine, and iodine atoms, is about a million times more reactive to mercury but the concentration of the atomic forms is typically extremely low. In a large portion of electric utility coal combustion facilities, the concentrations are generally not sufficient to oxidize a significant amount of mercury.

The term "halide" as used herein is defined as a compound formed from the reaction of a halogen with another element or radical. In general, halide compounds are much less reactive than the molecular halogens, having a low chemical potential. Halides are considered reduced forms that do not, alone, oxidize other compounds. In the conventional view therefore, a halide-salt-treated sorbent will not effectively oxidize elemental mercury and capture elemental mercury. However, a halide salt that has been added to the coal or combustion zone as a precursor to form a HI promoter will be very effective at oxidizing elemental mercury and capture of elemental mercury.

Halogen Promoted Sorbent Characteristics.

The sorbent described here has a very high initial reactivity for oxidizing mercury and therefore can be used in very small amounts to achieve very high capture efficiencies, thus lowering operation costs and lessening waste disposal problems. In addition, further disposal reductions are obtainable by regenerating and reusing the sorbents produced using the inventive technology. The time interval required for the mercury and the promoted sorbents of the present invention to successfully interact in a flue gas duct, with the subsequent collection of the mercury on the sorbent and ash is very short—less than seconds. Clearly, such collection times require the sorbent to have both high capacity and high reactivity toward mercury. The promoted sorbent can be utilized in a very finely powdered form to minimize mass transfer limitations. However, again, the reactivity should be very high to capture all of the mercury encountered by the fine particles. Additionally, use of these enhancement technologies allows capture to be effective for larger sorbent particles which also allows separation of the sorbent from the ash to enable subsequent regeneration as well as ash utilization. One feature of this invention is the process to prepare a sorbent containing a halide compound formed on the sorbent that is highly active on initial contact with the mercury contaminated gas stream, which allows for very effective capture of the mercury.

It appears that the inventive sorbents chemically combine hydrogen halides with the sorbent, such as activated carbon (edge sites). X-ray photoelectron spectroscopy has established that the addition of bromine, chlorine, HBr, or HCl formed a chemical compound in the sorbent (e.g., carbon) structure. Thus, the sorbent produced from halogen and sorbent does not represent a molecular halogen or hydrogen halide form, but rather a new chemically modified sorbent structure, such as a new carbon (or halocarbon) structure. This phenomenon may not occur with the less reactive molecular iodine, where an $I_2$ molecular complex can exist on the carbon basal plane. But the addition of hydrogen iodide to the sorbent, such as the carbon edge structure, forms a modified cationic sorbent (e.g., carbenium-iodide pair) with a high chemical potential for oxidation of mercury. Thus, an entirely new model is presented for the reactivity of the HI-treated carbon with mercury, similar to the HBr and HCl model. The reactive sorbent can be generated by the addition of hydrogen iodide, but not molecular iodine. Halogen treatment results in higher-activity sorbents because the halide anions (especially bromide and iodide) were effective in promoting the oxidation by stabilizing the developing positive charge on the mercury in the transition state for oxidation. Based on this model, several innovative, inexpensive, activity-enhancing features have been developed.

Optional Secondary Component.

The method can include addition of an optional secondary component in the preparation of the protonated sorbent, which can result in improved reactivity and capacity for the sorbent, typically exceeding that of both the untreated sorbent and the halogenated sorbent. In another embodiment, the optional secondary component is selected from the group consisting of a halogen, a halide (e.g., hydrogen iodide), an alkaline material (e.g., lime), clay (e.g., bentonite), an ammonium salt, an acidic component, iodine, hydrohalides, Group V halides. Group VI halides, and combinations thereof. In an embodiment, the optional secondary component is added at from about 1 to about 15 wt % of the promoter content, or about 1 to about 30 wt % of the sorbent.

The secondary component can include a second halogen or a compound derived from a second halogen, such as HI. Thus, in addition to having a reactive sorbent present, the second component generates a Lewis base with greater ability to stabilize the developing positive charge on the mercury. Thus, one component could be HCl or HBr and the second component is a compound including an element with more polarized electrons (5p), such as hydrogen iodide. When two or more promoter compounds are used, less expensive HCl or HBr can create large numbers of active sites and HI can displace the more volatile acids forming sites with higher reactivity to mercury and forms eventual products with greater stability and lower volatility, such organomercury iodides or mercury iodide.

Optional Alkali Component.

The method can include also adding (e.g., co-injecting) an optional alkaline material with the sorbent, including without limitation alkaline and alkaline earth components, to improve the efficiency of mercury capture by capturing oxidized mercury and/or capturing gaseous components that might otherwise reduce sorbent capacity. In another embodiment, the optional alkaline material may include lime, calcium oxide, sodium carbonate, and the like.

It has been demonstrated that addition of an optional alkali component with a promoted sorbent results in improved mercury capture, typically exceeding that of both the untreated sorbent and the promoted sorbent. Test data indicate that flue gas contaminants, flue gas constituents ($SO_2$, $NO_x$, HCl, etc), operating temperature, mercury form, and mercury concentration may impact the effectiveness of the alkali addition. This suggests the need to be able to adjust and tailor the alkali-to-sorbent ratio (e.g., alkali-to-activated-carbon ratio) onsite in order to overcome and optimize for a given set of site conditions.

The synergy that can be gained when adding (e.g., co-injecting) the two materials can be explained as follows. First, testing shows that binding sites on sorbents such as activated carbon can be consumed by chlorine species, sulfur species (i.e., sulfates), and other flue gas contaminants (arsenates, selenates, and the like). The addition of optional alkali material will interact and react with these species/contaminants thus minimizing their consumption of sorbent binding sites such as activated carbon mercury binding sites. Second, testing also shows that standard sorbent such as activated carbon will continue to oxidize mercury, even though the binding sites are fully consumed. This oxidized mercury can then react with alkali material and subsequently be captured by particulate control devices. Consequently, the addition of the optional alkali component acts to protect mercury binding sites and capture oxidized mercury, thereby resulting in improved mercury reduction at lower cost. Alkali is generally much lower in cost (e.g., an order of magnitude less) than sorbents such as activated carbon, thus more of it can be used still resulting in overall lower costs.

The alkali material can be lime. The alkali material can be an ammonium salt, such as any suitable ammonium salt described herein.

"In-Flight" Sorbent Preparation.

Halogen-promoted and optionally ammonium-protected sorbent can be readily produced "in-flight". This can be accomplished by, for example, contacting the vapors of any combination of halogens and optionally a second component, in-flight, with fine sorbent particles. The contacting can occur downstream of the combustion chamber such as in the flue gas, or in a transport line (e.g., pneumatic transport line). The particles may be dispersed in a stream of transport air (or other gas), which also conveys the halogen/halide promoted sorbent particles to the flue gas duct, or other contaminated gas stream, from which mercury is to then be removed. There is no particular temperature requirement for this contact. This technology is very simple to implement, and results in a great cost savings to facilities using this technology for mercury capture.

Advantages of On-Site Preparation.

In-flight preparation of the halogen/halide promoted sorbent on location can provide certain advantages. For example, treatment/promotion of the sorbent can be adjusted in real time. This allows for different sorbent to promoter (or promoter precursor) ratios, which can be adjusted to meet different coal and flue gas conditions. Additionally, and one option, the treatment system can be combined with the sorbent injection system at the end-use site. With this technique, the halogen/halide is introduced to the sorbent-air (or other gas) mixture in a transport line (or other part of the sorbent storage and injection system). Or, the promoter (or precursor) and sorbent (carbon and/or non-carbon) can be injected (added) separately at different locations, with the promoted sorbent prepared in-flight in the flue gas. This inflight onsite preparation provides benefits over current conventional concepts for treating sorbents off-site such as a decrease or elimination of capital equipment costs at a treatment facility, costs to operate the treatment facility are decreased or eliminated, there are no costs for transporting sorbent and additive to a treatment facility, use of existing hardware and operation procedures, the sorbent used is fresh and therefore has greater reactivity, no new handling concerns are introduced, no costs for removing sorbent from treatment system, reduction of the amount of spent sorbents that are disposed, and rapid on-site tailoring of additive-sorbent ratios in order to match the requirements of flue gas changes, such as may be needed when changing fuels or reducing loads, thus further optimizing the economics.

Sorbent Addition Location.

Some embodiments contemplate the use of a halogen promoted sorbent in a powdered form that has been added into a flue gas stream before or after ash particulates have been removed. Other embodiments of the inventive composition of the halogen promoted sorbent include a powdered modified sorbent prepared by adding HI, $Br_2$, or HBr, plus a second optional component. Other embodiments allow the addition of the optional alkali and/or ammonium component in conjunction with a base sorbent and/or with the use of a halogen-promoted sorbent and any other combinations of the sorbent technologies provided herein. Alternatively, embodiments include methods wherein the sorbent is on a moving contactor consisting of particles or fibers containing one or more of the compositions listed above.

Sorbent Regeneration.

Any of the above embodiments of the halogen/halide promoted sorbent can be easily regenerated; the poisoning contaminants from the flue gas can be removed and an inexpensive promoting agent added, to restore mercury sorption activity. This process of promoting the activity of the sorbent itself contrasts with the earlier, more expensive, conventional methods of adding a reagent (such as peroxide, gold, triiodide, etc.) to a sorbent. The halogen/halide promoted sorbent of the present invention, treated with bromine and/or optional components, is noncorrosive. Detailed examples of sorbent regeneration techniques are described in commonly owned PCT patent application no. PCT/US04/12828, titled "PROCESS FOR REGENERATING A SPENT SORBENT", which is hereby incorporated by reference in its entirety.

Sorbent Addition Control Schemes

Another advantage of the present invention relates to the use of a feedback system to more efficiently utilize certain aspects of the invention. Where possible and desirable, the mercury control technology of the present invention may utilize continuous measurement of mercury emissions as feedback to assist in control of the sorbent addition rate. Tighter control on the promoter, sorbents and optional component(s) levels can be achieved in this way, which will ensure mercury removal requirements are met with minimal material requirements, thus minimizing the associated costs. In an embodiment, the mercury emissions are continuously measured downstream of the addition location, such as in the exhaust gas at the stack.

EXAMPLES

Various embodiments of the present invention can be better understood by reference to the following Examples which are offered by way of illustration. The present invention is not limited to the Examples given herein.

Part I. Bench-Scale Testing of Halide-Promoted Sorbents

Example I-1. Preparation and Bench-Scale Testing of Hydrogen Iodide-Promoted Sorbent A sample (5 g) of finely powdered activated carbon (such as NORIT Darco FGD. NORIT Americas. Inc., Marshall, Tex. (USA), although others are suitable, as will be recognized by those skilled in the art), was placed in a beaker and 20 mL of a 0.1 N aqueous solution of hydrogen iodide (HI) was added and stirred with the carbon. The resulting paste was dried in an oven in air at 110° C. The residual moisture was not determined, but was estimated to be similar to that in the starting carbon. Thus, the HI loading was approximately 5 wt %.

A bench-scale apparatus and procedure was used to test the initial activities and capacities of promoted activated carbon sorbents in a powdered form. A detailed description of the apparatus and its operation is provided in Dunham, G. E.; Miller, S. J. Chang, R.; Bergman, P. *Environmental Progress* 1998, 17, 203, which is incorporated herein by reference in its entirety. The bench scale mercury sorbent tests in the flue gas compositions were performed with finely (~400 mesh) powdered sorbents (37 mg) mixed with 113 mg sand and loaded on a quartz filter (2.5 inch (6.35 cm)). The loaded filter and holder were heated in an oven (125° C.) in the simulated flue gas stream (30 SCFH (standard cubic feet/hr) or 0.79 NCMH (normal cubic meters per hour)) containing the following: $O_2$ (6%), $CO_2$ (12%). $SO_2$ (600 ppm), NO (120 ppm) $NO_2$ (6 ppm), HCl (1 ppm), $Hg^0$ (11 μg/m$^3$), $H_2O$ (15%), and $N_2$ (balance). Elemental mercury was provided by a standard permeation tube source placed in a double jacketed glass condenser, and heated to the desired temperature. Mercury concentrations in the gas streams were determined with a continuous mercury emission monitor (Sir Galahad mercury CEM mfr. P. S. Analytical Deerfield Beach Fla. USA), and a $SnCl_2$ cell was used to convert oxidized species to elemental, so that both elemental and oxidized mercury concentration data could be obtained for both the influent and the effluent concentrations from the sorbent bed. Mercury concentrations were calibrated for the flow rates used. Spent sorbents were analyzed for mercury to determine the mass balance.

Figure 9:
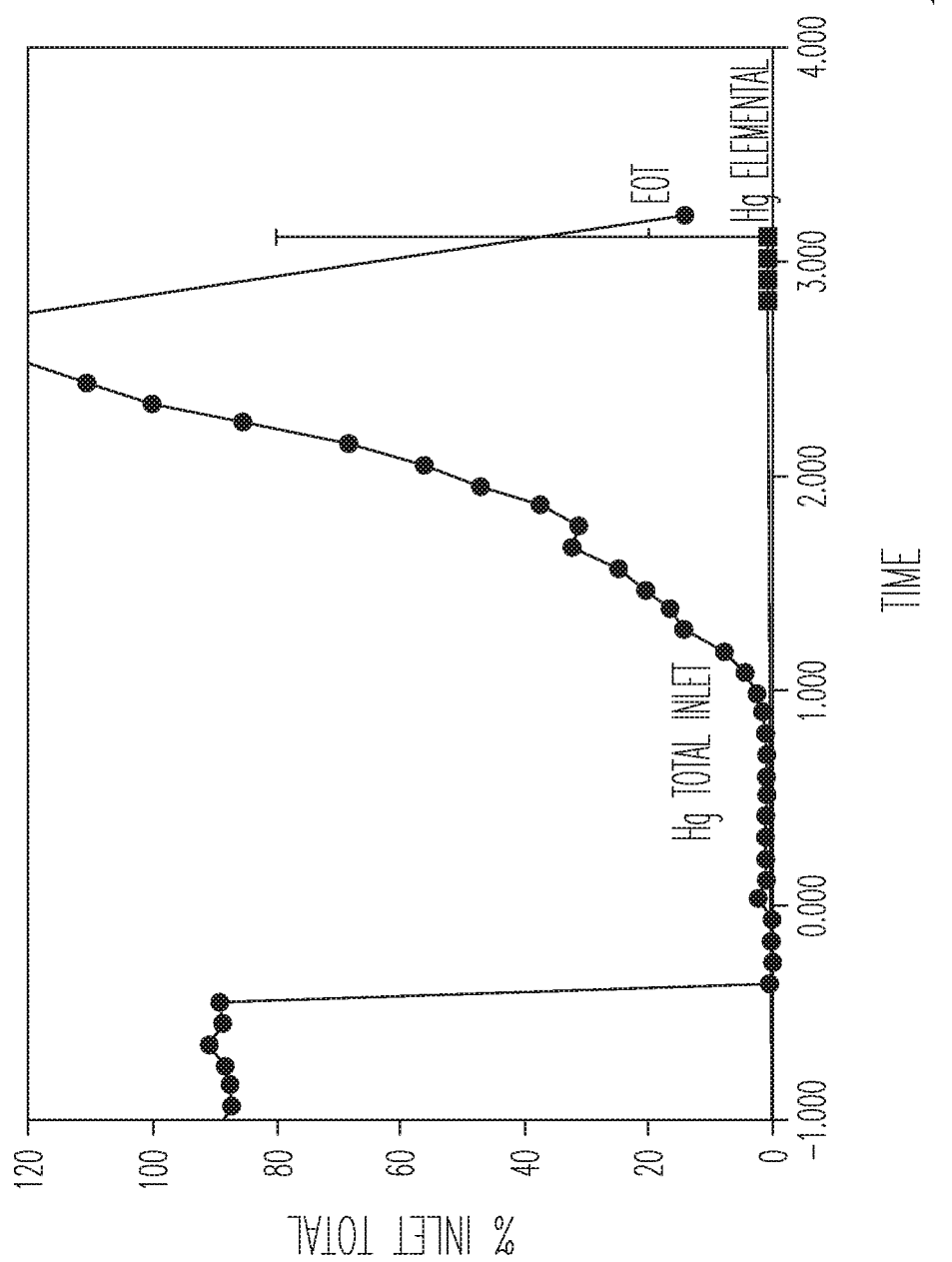
FIG. 9 is a diagram illustrating the breakthrough curve for 5 wt/wt % HI-promoted NORIT Darco FGD sorbent (37 mg+113 mg sand) in low-HCl (1 ppm) synthetic flue gas, in accordance with various embodiments.

Referring to FIG. 9, the effluent mercury concentration data are plotted as a percent of the influent mercury versus time. Total Hg (solid circles) and elemental Hg (solid squares) in the effluent are presented as a percent of the inlet Hg. "EOT" indicates the end of test (the later data points shown are for calibration checks).

The resulting curve for the total Hg (breakthrough curve) showed 0-1% Hg in the effluent as a percentage of the inlet Hg, corresponding to 99+% capture). After 1.0 hr the Hg in the effluent began to increase (initial breakthrough point). Only after 2.0 hr had the capture dropped to the 50% level (50% breakthrough). At 2.5 hr. the 100% level was reached, signaling complete breakthrough. At longer times, total Hg in the effluent was higher than the inlet, as typical for sorbent Hg capture.

After complete breakthrough of the total Hg, the elemental Hg in the effluent was determined. This was about 1-2% of the influent Hg, indicating that most of the Hg was being oxidized on the sorbent, even though it was not captured.

Example I-2. Preparation and Bench-Scale Testing of Bromine-Promoted Sorbent and Non-Promoted Sorbent Finely powdered activated carbon (such as NORIT Darco FGD, NORIT Americas, Inc., Marshall, Tex. (USA), although others are suitable, as will be recognized by those skilled in the art), was placed in a rotating plastic barrel with side blades (a 5 ft$^3$ (0.14 m$^3$) cement mixer) fitted with a tight plastic lid to prevent loss of the fine powder during the preparation. In a separate vessel, gas phase bromine was generated by passing a nitrogen stream over a weighed amount of liquid bromine that is warmed to about 40°-50° C. The vapor pressure of the bromine was such that a dark red gas is generated and passed out of the generator. The outlet from the gaseous bromine generator is connected via a ¼ inch (0.0.64 cm) plastic hose to a stationary metal tube inserted through a flange in the center of the plastic lid and passing into the center of the barrel. The flange was not air tight so that the excess of nitrogen is released after the bromine is transferred to the tumbling carbon. Thus, the bromine gas stream continuously passed into the rotating barrel where it contacted the tumbling carbon. The unit was then operated until the desired amount of bromine had combined with the carbon, about 0.4 to 1 kg of bromine to 20 kg of carbon (2-5 wt %). When the reaction was completed, the carbon was weighed. The treated carbon was odorless and did not cause skin irritation since the bromine had completely reacted with the carbon to produce the brominated carbon.

XPS spectra demonstrate that the brominated carbon contained both covalent carbon-bound (organic) bromide as well as anionic bromide. The product contained the same moisture originally present in the activated carbon (5-17 wt %), but did not require further drying for use. The moisture is driven out at higher temperatures (>150° C.), and the bromine was not released until very high temperatures.

The bench-scale apparatus and procedure of Example I-1 was used to test the initial activities and capacities of several promoted activated carbon sorbents using powdered carbon, including bromine-containing activated carbons prepared from a variety of carbons, including commercially available sorbents, aerogel film sorbents, and the original precursor carbons for comparison.

Figure 10:
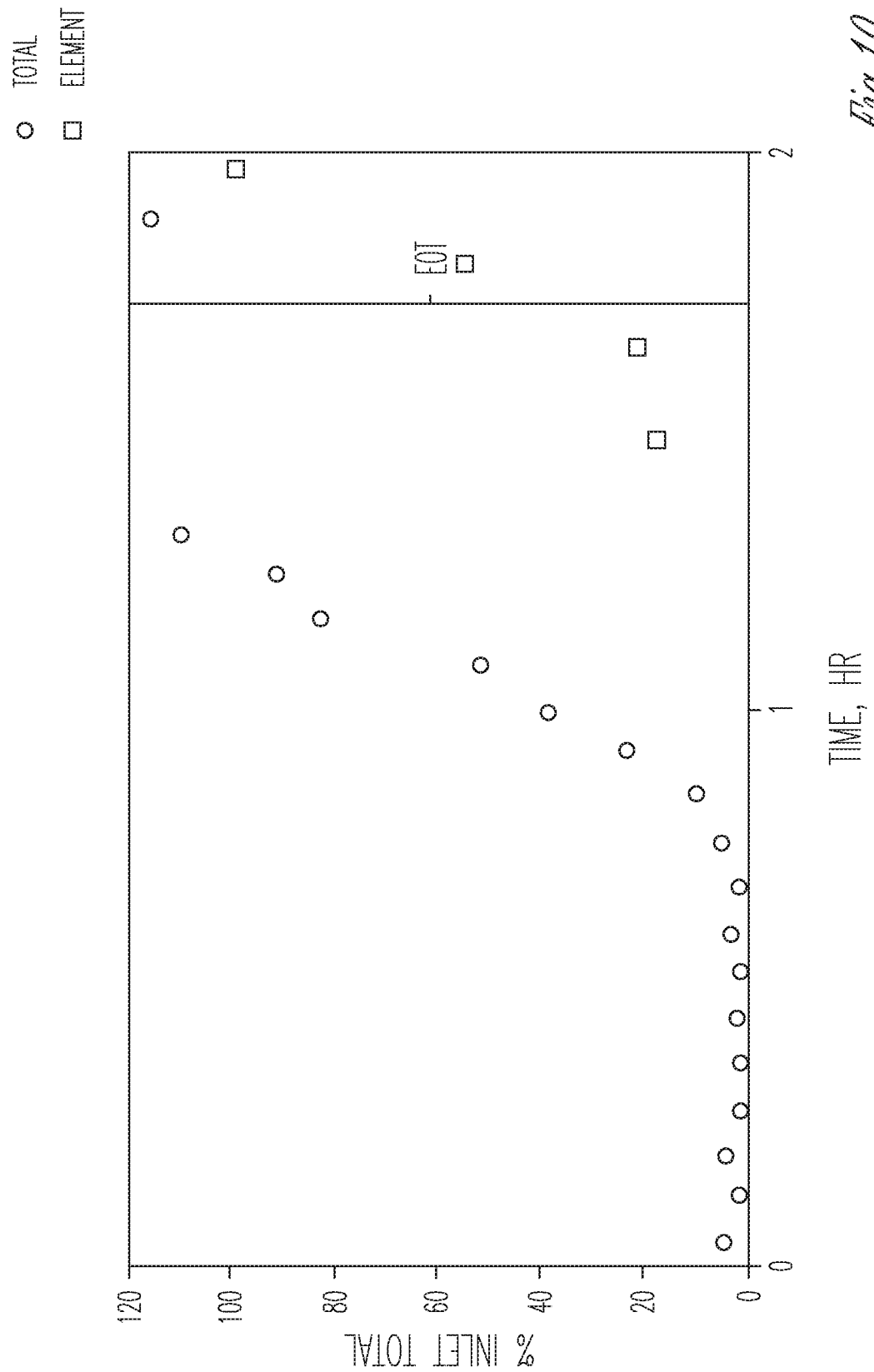
FIG. 10 is a diagram illustrating breakthrough curves for 5 wt/wt % brominated NORIT Darco FGD sorbent (37 mg+113 mg sand) in low-HCl (1 ppm) synthetic flue gas, in accordance with various embodiments.

Referring to FIG. 10 the effluent mercury concentration data are plotted as a percent of the influent mercury versus time. The resulting curve (breakthrough curve) for the brominated sorbents typically showed 0%-1% Hg in the effluent (99+% capture) at the beginning, and increasing only after 30-60 minutes (breakthrough point). FIG. 10 illustrates the breakthrough curves for 5 wt/wt % brominated NORIT Darco FGD sorbent (37 mg+113 mg sand) with synthetic flue gas containing 1 ppm HCl. Total Hg (solid circles) and elemental Hg (solid squares) in the effluent are presented as a percent of the inlet Hg. "EOT" indicates the end of test (the later data points shown are for calibration checks). Breakthrough occurred at 42 minutes with 50% breakthrough at 2 hours. The elemental Hg after breakthrough was about 20% of the inlet, compared to 98% in the case of the HI-promoted carbon.

Figure 11:
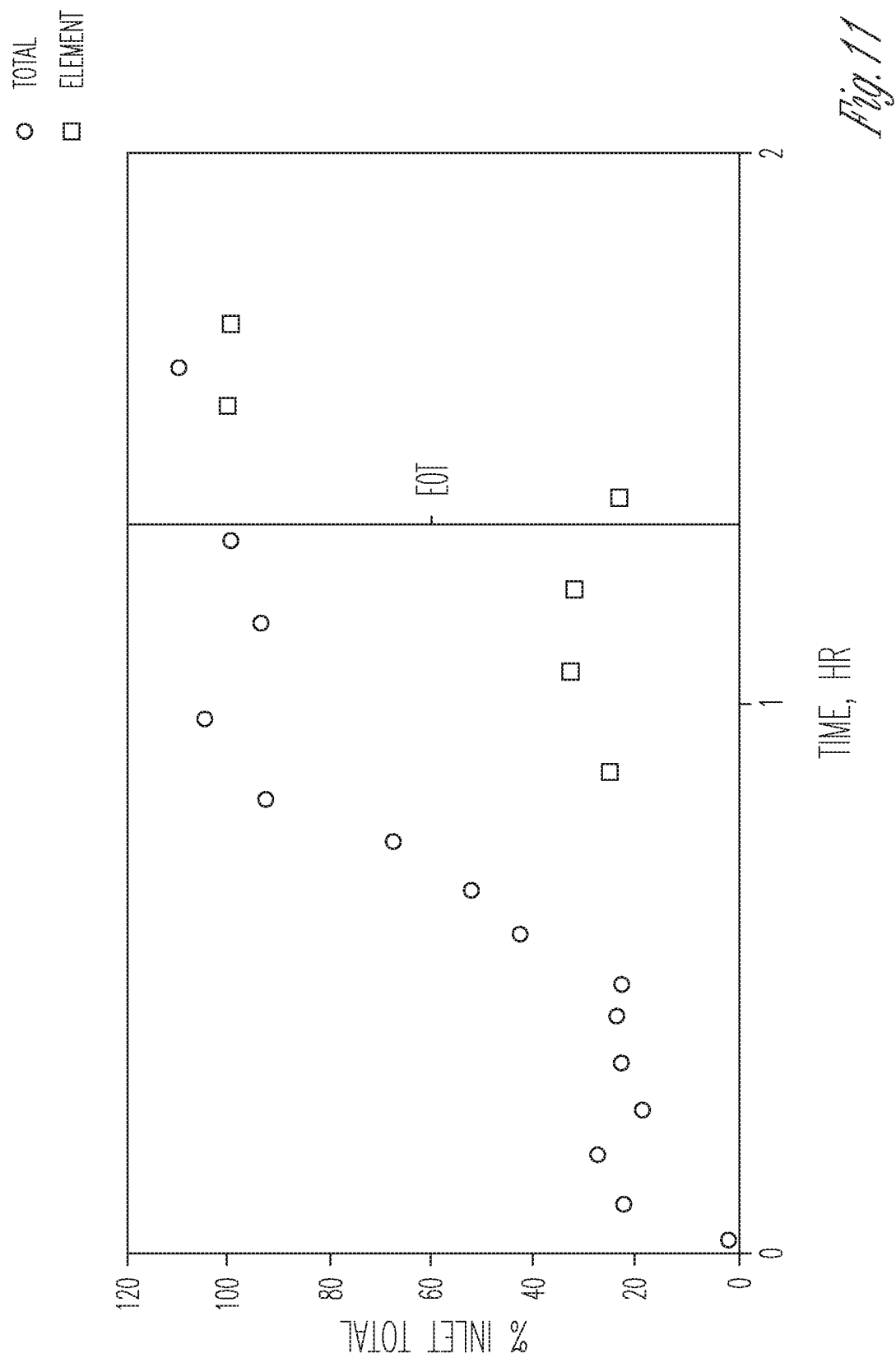
FIG. 11 is a diagram illustrating breakthrough curves for non-halogenated NORIT Darco FGD sorbent (37 mg+113 mg sand) in low-HCl (1 ppm) synthetic flue gas, in accordance with various embodiments.

FIG. 11 presents the comparative breakthrough curves for the corresponding non-halogenated sorbent typically initiated at 5%-50% of inlet mercury, depending on the HCl concentration in the synthetic flue gas, thus indicating considerably lower reactivity for oxidation and capture of the mercury for the nonhalogenated sorbents.

Example I-3. Analysis of Examples I-1 and I-2

Comparison of the breakthrough curves for the HI-promoted carbon in Example I-1 showed a very high initial capture rate, comparable to the brominated carbon in Example I-2. The relatively late onset of the breakthrough of the HI promoted carbon compared to the brominated carbon showed that the capture rates of the HI-promoted carbon exceed those of the brominated carbon when many of the sites for binding have been used up.

The reason for the superior capacity performance of the HI-promoted carbon might not simply be attributed to higher reaction rates of the HI-promoted carbon or higher stability of the carbon-bound HgI. In general, the shape of the breakthrough curve and the onset of breakthrough are determined by the $SO_2$ oxidation to sulfuric acid, the main poisoning species for the Hg-binding sites. Previous work showed that the halogen-promoted carbons oxidize $SO_2$ at similar rates; therefore, sulfuric acid will build up on the carbon surface and poison the sites to similar extents. In contrast, halogen-promoted carbons exhibit a specific acid catalysis rate effect, with the affinity of the halide anion for the incipient positive charge developing on the mercury in the transition state for oxidation and simultaneous formation of the bound state affecting the rates of Hg oxidation to a significant degree. Iodide ions are more nucleophilic, owing to the more polarizable electrons in the anion, resulting from the large size and shielding of the outer electrons. The reaction rate is therefore faster for carbonium sites associated with iodide in the HI-promoted carbons, as compared to carbonium sites associated with bromide in the $Br_2$-promoted carbons. If sulfuric acid build-up is similar for the carbons, the effect of the iodide anion can be observed. A second rate factor favoring the HI-promoted sites over $Br_2$-promoted sites is the lower degree of hydration of the iodide ion and the carbenium ion with which it is associated, compared to the more dense bromide carbenium ion pairs (chloride would be similar to bromide), which are more strongly hydrated and more stabilized. The less hydrated carbenium iodide ion pair will be less stabilized and therefore more reactive.

Examining the breakthrough data further, the lower amount of elemental Hg in the effluent after breakthrough of the HI-promoted carbon provides further evidence that the HI-promoted site must be more effective for oxidation compared to the corresponding brominated site. After breakthrough, the sulfuric acid present prevents binding but does not affect the oxidation; therefore, the effect of the iodide anion on the oxidation can be observed. The species of oxidized mercury in the effluent was not determined for the HI-promoted sorbent, but is likely the most volatile Hg species, which is $HgCl_2$, formed from the low concentration of HCl in the flue gas.

The ion hydration effect described above may also be important in use of the sorbent in aqueous environments such as a wet scrubber. Water molecules will inhibit or interfere more when the anion is bromide or chloride compared to iodide, and hence use of the HI-promoted sorbent in scrubbers is effective in achieving higher removal rates.

Part II. Large Scale Test of HI-Promoted Sorbent

Example II-1

Tests were conducted on a full-scale nominal 800 Mw plant equipped with an ESP for particulate control and a wet scrubber for $SO_2$ compliance. During the test, a low-sulfur subbituminous coal was combusted to produce a mercury-containing flue gas. Without the injection/addition of any sorbents, promotors, or promoter precursors, the coal when combusted produced a flue gas with mercury concentration of 8-12 lb/TBtu and a high proportion of elemental mercury, generally greater than 50%. All tests were conducted at full load. The goal of the tests was to demonstrate mercury emissions at the stack below 1.2 lb/TBtu.

During the test, halide promoters (bromine-based (NaBr) and iodine-based (KI) precursors) were injected (added) separately into the combustion zone in the furnace along with injection into the flue gas of a sorbent (Sorbent 1) that included activated carbon and hydrated lime. Sorbent 1 and the additional components were injected upstream of the air heaters into the flue gas. Sorbent 1 included activated carbon and hydrated lime, and had a higher wt % of activated carbon than of hydrated lime. The activated carbon component had a mass average particle size of approximately 14-18 microns, and the lime component had a mean particle size of approximately 5-10 microns. The promoter precursors were injected in the range of 0.0-0.5 lb/Macf (million actual cubic feet) and the sorbents were injected in the range of 0-3 lb/Macf. A brominated activated carbon (BAC) provided by a commercial supplier with carbon characteristics similar to Sorbent 1 was also injected during the test and was injected upstream of the air heaters at the same location as Sorbent 1. Sorbent 1 was tested in conjunction with bromine promoters (e.g., HBr. $Br_2$, and the like, derived from the bromine precursor (NaBr) under the conditions tested) and iodine promoters (e.g., HI, $I_2$, and the like, derived from the iodine precursor (KI) under the conditions tested) and the BAC was tested alone for comparative results, as shown in Table 1. The bromine precursor NaBr was mixed with bentonite to form a mixture having a greater wt % of NaBr than of bentonite, and the mixture was injected (added) into the combustion zone with the coal. The iodine precursor was mixed with a bentonite at approximate ratios of 20-40 wt % of KI and 60-80 wt % bentonite. It was also injected (added) into the combustion zone. The SEA rate shown in Table 1 includes both the halide precursor and bentonite as a mixture. While in these tests the bromine and iodine precursors were mixed with bentonite to facilitate feed, similar results would be expected if the bromine and iodine precursors are added individually, or with some other material, as a liquid, solid, or gas to the coal or combustion zone.

and bromine- and iodine-based promotors are provided in the flue gas by promoter precursors added/injected to the combustion zone (either as mixed with the coal, or added directly). This approach yields significantly improved mercury capture compared to standard activated carbons and BACs, resulting in improved mercury capture at reduced costs.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Exemplary Embodiments

The following exemplary embodiments are provided, the numbering of which is not to be construed as designating levels of importance:

Embodiment 1 provides a method of separating mercury from a mercury-containing gas, the method comprising:

combusting a fossil fuel in a combustion chamber, to provide the mercury-containing gas, wherein the mercury-containing gas comprises a halogen or halide promoter, wherein the halogen or halide promoter comprises iodine, iodide, or a combination thereof;

adding a sorbent material into the mercury-containing gas downstream of the combustion chamber such that the sorbent material reacts with the halogen or halide promoter in the mercury-containing gas to form a promoted sorbent;

reacting mercury in the mercury-containing gas with the promoted sorbent, to form a mercury/sorbent composition; and separating the mercury/sorbent composition from the mercury-containing gas.

Embodiment 2 provides the method of Embodiment 1, wherein the combustion chamber comprises the halogen or halide promoter.

TABLE 1

Tests with Bromine and Iodine Promoters.

| Test condition | Sorbent inj. rate lb/hr | SEA inj. rate lb/hr | NaBr* lb/hr | KI* lb/hr | ESP outlet Hg concentration µg/dscm | ESP outlet Hg concentration lb/TBtu | ESP Hg average lb/TBtu | Stack Hg concentration µg/dscm | Stack Hg concentration lb/TBtu | Stack Hg average lb/TBtu |
|---|---|---|---|---|---|---|---|---|---|---|
| BAC Only | 340 | 0 | 0 | 0 | 2.48 | 1.90 | 2.06 | 1.68 | 1.50 | 1.73 |
| BAC Only | 320 | 0 | 0 | 0 | 3.00 | 2.30 | | 2.05 | 1.83 | |
| BAC Only | 380 | 0 | 0 | 0 | 2.86 | 2.19 | | 2.30 | 2.05 | |
| BAC Only | 450 | 0 | 0 | 0 | 2.77 | 2.12 | | 2.12 | 1.89 | |
| BAC Only | 600 | 0 | 0 | 0 | 2.41 | 1.78 | | 1.60 | 1.40 | |
| Bromine-Sorbent 1 | 300 | 50 | 35 | 0 | 1.05 | 0.81 | 1.22 | 0.67 | 0.57 | 0.95 |
| Bromine-Sorbent 1 | 250 | 50 | 35 | 0 | 1.76 | 1.35 | | 1.25 | 1.03 | |
| Bromine-Sorbent 1 | 300 | 50 | 35 | 0 | 1.94 | 1.50 | | 1.50 | 1.24 | |
| Iodine-Sorbent 1 | 300 | 40 | 0 | 8 | 2.60 | 2.00 | 1.88 | 1.30 | 1.16 | 1.05 |
| Iodine-Sorbent 1 | 250 | 80 | 0 | 16 | 2.30 | 1.77 | | 1.13 | 0.94 | |
| Iodine-Sorbent 1 | 250 | 150 | 0 | 30 | 2.42 | 1.86 | | 1.23 | 1.04 | |

*Promoter precursor.

The data in Table 1 shows that bromine- and iodine-promoted sorbents performed better than BAC alone, resulting in lower mercury emissions at the ESP outlet and stack, while using less carbon compared to BAC alone. The data convincingly suggests that promotion of the activated carbon contained in Sorbent 1 by either iodine- or bromine-based promoters resulted in effective mercury capture in the ESP of over 80%, and mercury stack emissions below 1.2 lb/TBtu. The comparative tests with BAC alone demonstrated that mercury emissions were generally between 1.5-2.0 lb/TBtu, at higher injection rates of 300-400 lb/hr. Follow-on tests showed that even at BAC injection rates of 500-600 lb/hr, mercury emissions were still above 1.2 lb/TBtu.

The data in Table 1 indicates that synergy occurs when a carbon-based sorbent (Sorbent 1) is injected into flue gas Embodiment 3 provides the method of any one of Embodiments 1-2, wherein the halogen or halide promoter is a molecular halogen, a halide, a Group V halide, a Group VI halide, a hydrohalide, a halide salt, or a combination thereof.

Embodiment 4 provides the method of any one of Embodiments 1-3, wherein the halogen or halide promoter comprises $I_2$, HI, a Group V iodide, a Group VI iodide, or a combination thereof.

Embodiment 5 provides the method of any one of Embodiments 1-4, wherein the halogen or halide promoter comprises $Br_2$, HBr, a Group V bromide, a Group VI bromide, or a combination thereof.

Embodiment 6 provides the method of any one of Embodiments 1-5, wherein the promoter is HCl, HBr, HI, $Br_2$, $Cl_2$, $I_2$, BrCl, IBr, ICl, ClF, $PBr_3$, $PCl_5$, $SCl_2$, $CuCl_2$, $CuBr_2$, $Al_2Br_6$. $FeI_x$ (x=1, 2, 3, or 4). $FeBr_y$ (y=1, 2, 3, or 4), $FeCl_z$ (z=1, 2, 3, or 4), $MnBr_2$, $MnCl_2$, $NiBr_2$, $NiCl_2$, $NiI_2$, $ZnBr_2$, $ZnCl_2$. $ZnI_2$, $NH_4Br$, $NH_4Cl$, $NH_4I$, $NH_4F$, or a combination thereof.

Embodiment 7 provides the method of any one of Embodiments 1-6, wherein the promoter is reacted with the sorbent in vapor form, gaseous form, liquid form, or in an organic solvent.

Embodiment 8 provides the method of any one of Embodiments 1-7, further comprising adding another halogen or halide promoter downstream of the combustion chamber.

Embodiment 9 provides the method of any one of Embodiments 1-8, wherein the promoted sorbent comprises about 1 g to about 30 g of the halogen or halide promoter per 100 g of the sorbent material.

Embodiment 10 provides the method of any one of Embodiments 1-9, further comprising adding a secondary material into the mercury-containing gas downstream of the combustion chamber.

Embodiment 11 provides the method of Embodiment 10, wherein the secondary material comprises a halogen, a compound derived from a halogen, a hydrohalide, a compound comprising a Group V or Group VI element and a molecular halogen, or a combination thereof.

Embodiment 12 provides the method of any one of Embodiments 1-11, wherein the sorbent material added into the mercury-containing gas comprises at least one of a carbon sorbent material and a non-carbon sorbent material.

Embodiment 13 provides the method of Embodiment 12, wherein the carbon sorbent material comprises at least one of activated carbon, activated carbon, carbon black, unburned carbon, carbon fiber, carbon honeycomb or plate structure, aerogel carbon film, pyrolysis char, and regenerated activated carbon.

Embodiment 14 provides the method of Embodiment 13, wherein the activated carbon comprises powdered activated carbon, granular activated carbon, or a combination thereof.

Embodiment 15 provides the method of any one of Embodiments 12-14, wherein the non-carbon sorbent material comprises at least one of a porous felsic material, a vesicular felsic material, a porous basaltic material, a vesicular basaltic material, a clay-based compound, an alkaline compound, a calcium hydroxide compound, a sodium acetate compound, and a bicarbonate compound.

Embodiment 16 provides the method of any one of Embodiments 1-15, wherein the sorbent material added into the mercury-containing gas is substantially free of halogen and halide promotion.

Embodiment 17 provides the method of any one of Embodiments 1-16, wherein the sorbent material is a promoted sorbent obtained by reaction of a base sorbent with another halogen or halide promoter.

Embodiment 18 provides the method of any one of Embodiments 1-17, wherein the combustion chamber comprises a boiler.

Embodiment 19 provides the method of any one of Embodiments 1-18, wherein the mercury-containing gas is a flue gas.

Embodiment 20 provides the method of any one of Embodiments 1-19, wherein the fossil fuel comprises coal.

Embodiment 21 provides the method of any one of Embodiments 1-20, wherein the addition of the sorbent material into the mercury-containing gas occurs upstream of an air pre-heater.

Embodiment 22 provides the method of any one of Embodiments 1-21, wherein the addition of the sorbent material into the mercury-containing gas occurs upstream of a particulate separator or a scrubber.

Embodiment 23 provides the method of any one of Embodiments 1-22, wherein the promoter is formed from a promoter precursor.

Embodiment 24 provides the method of Embodiment 23, wherein the promoter precursor is NaBr, NaCl, NaI, $Br^-$, $Cl^-$, $I^-$, KI, KCl, LiCl, LiBr, $CuCl_2$, $CuBr_2$, AgCl, AgBr, $CHI_3$, $CaI_2$, $CH_3Br$, AuBr, $FeI_x$ (x=1, 2, 3, or 4), $FeBr_y$ (y=1, 2, 3, or 4), $FeCl_z$ (z=1, 2, 3, or 4), $MgBr_2$, $MgCl_2$, $MnBr_2$, $MnCl_2$, $NiBr_2$, $NiCl_2$, $NiI_2$, $ZnBr_2$, $ZnCl_2$, $ZnI_2$, $CaI_2$, $CaBr_2$, $CaCl_2$, or a combination thereof.

Embodiment 25 provides the method of any one of Embodiments 1-24, further comprising adding an ammonium salt into the flue gas to produce a promoted ammonium salt-protected sorbent.

Embodiment 26 provides the method of Embodiment 25, wherein the ammonium salt is an ammonium halide, a methylammonium halide, an ammonium salt of an oxyacid of a Group VI element, an ammonium salt of an oxyacid of a Group V element, or a combination thereof.

Embodiment 27 The method of any one of Embodiments 25-26, wherein the ammonium salt is ammonium bromide, ammonium iodide, ammonium chloride, an organic halide with a formula of $CH_3NH_3X$ (wherein X is Cl, Br or I), ammonium sulfate, ammonium hydrogen sulfate, ammonium sulfite, ammonium hydrogen sulfite, ammonium persulfate, ammonium pyrosulfate, ammonium thiosulphate, ammonium dithionite, ammonium aluminium sulfate, ammonium iron sulfate, ammonium sulfamate, ammonium phosphate, diammonium phosphate, ammonium hydrogen phosphate, ammonium dihydrogen phosphate, ammonium thiophosate, ammonium nitrate, ammonium nitrite, ammonium carbonate, ammonium thiocyanate, ammonium sulfide, ammonium hydrogen sulfide, ammonium acetate, ammonium carbamate, ammonium carbonate, ammonium chlorate, ammonium chromate, ammonium fluoride, ammonium formate, ammonium hydroxide, ammonium perchlorate, or a combination thereof.

Embodiment 28 provides a method of separating mercury from a mercury-containing gas, the method comprising:

combusting a fossil fuel in a combustion chamber, to provide the mercury-containing gas, wherein the mercury-containing gas comprises the first halogen or halide promoter;

adding a sorbent material into the mercury-containing gas downstream of the combustion chamber such that the sorbent material reacts with the first halogen or halide promoter in the mercury-containing gas to form a promoted sorbent, wherein the sorbent material is a promoted sorbent obtained by reaction of a base sorbent with a second halogen or halide promoter, wherein (a) the first halogen or halide promoter comprises iodine, iodide, or a combination thereof, (b), the second halogen or halide promoter comprises iodine, iodide, or a combination thereof, or (c) both (a) and (b);

reacting mercury in the mercury-containing gas with the promoted sorbent, to form a mercury/sorbent composition; and separating the mercury/sorbent composition from the mercury-containing gas.

Embodiment 29 provides the method of Embodiment 28, wherein the combustion chamber comprises the first halogen or halide promoter.

Embodiment 30 provides the method of any one of Embodiments 28-29, wherein the first or second halogen or halide promoter is a molecular halogen, a Group V halide, a Group VI halide, a hydrohalide, a halide salt, or a combination thereof.

Embodiment 31 provides the method of any one of Embodiments 28-30, wherein the first or second halogen or halide promoter comprises $I_2$, HI, a Group V iodide, a Group VI iodide, or a combination thereof.

Embodiment 32 provides the method of any one of Embodiments 28-31, wherein the first or second halogen or halide promoter comprises $Br_2$, HBr, a Group V bromide, a Group VI bromide, or a combination thereof.

Embodiment 33 provides the method of any one of Embodiments 28-32, wherein the first or second halogen or halide promoter comprises HCl, HBr, HI, $Br_2$, $Cl_2$, $I_2$. BrCl, IBr, ICl, ClF, $PBr_3$, $PCl_5$. $SCl_2$, $CuCl_2$, $CuBr_2$, $Al_2Br_6$, $FeI_x$ (x=1, 2, 3, or 4), $FeBr_y$ (y=1, 2, 3, or 4). $FeCl_z$ (z=1, 2, 3, or 4), $MnBr_2$, $MnCl_2$, $NiBr_2$, $NiCl_2$, $NiI_2$, $ZnBr_2$, $ZnCl_2$, $ZnI_2$, $NH_4Br$, $NH_4Cl$, $NH_4I$, $NH_4F$, or a combination thereof.

Embodiment 34 provides the method of any one of Embodiments 28-33, wherein the first or second promoter is formed from a promoter precursor.

Embodiment 35 provides the method of Embodiment 34, wherein the promoter precursor is NaBr, NaCl, NaI, $Br^-$, $Cl^-$, $I^-$, KI, KCl, LiCl, LiBr, $CuCl_2$, $CuBr_2$, AgCl, AgBr, $CHI_3$, $CaI_2$, $CH_3Br$, AuBr, $FeI_x$ (x=1, 2, 3, or 4). $FeBr_y$ (y=1, 2, 3, or 4), $FeCl_z$ (z=1, 2, 3, or 4), $MgBr_2$, $MgCl_2$, $MnBr_2$, $MnCl_2$, $NiBr_2$, $NiCl_2$, $NiI_2$, $ZnBr_2$, $ZnCl_2$, $ZnI_2$, $CaI_2$. $CaBr_2$, $CaCl_2$, or a combination thereof.

Embodiment 36 provides the method of any one of Embodiments 28-35, wherein the first or second promoter is reacted with the sorbent in vapor form, gaseous form, liquid form, or in an organic solvent.

Embodiment 37 provides the method of any one of Embodiments 28-36, further comprising adding the second promoter downstream of the combustion chamber.

Embodiment 38 provides the method of any one of Embodiments 28-37, wherein the sorbent material added into the mercury-containing gas comprises at least one of a carbon sorbent material and a non-carbon sorbent material.

Embodiment 39 provides the method of Embodiment 38, wherein the carbon sorbent material comprises at least one of activated carbon, activated carbon, carbon black, unburned carbon, carbon fiber, carbon honeycomb or plate structure, aerogel carbon film, pyrolysis char, and regenerated activated carbon.

Embodiment 40 provides the method of Embodiment 39, wherein the activated carbon comprises powdered activated carbon, granular activated carbon, or a combination thereof.

Embodiment 41 provides the method of any one of Embodiments 38-40, wherein the non-carbon sorbent material comprises at least one of a porous felsic material, a vesicular felsic material, a porous basaltic material a vesicular basaltic material, a clay-based compound, an alkaline compound, a calcium hydroxide compound, a sodium acetate compound, and a bicarbonate compound.

Embodiment 42 provides the method of any one of Embodiments 28-41, wherein the combustion chamber comprises a boiler.

Embodiment 43 provides the method of any one of Embodiments 28-42, wherein the fossil fuel comprises coal.

Embodiment 44 provides the method of any one of Embodiments 28-43, wherein the addition of the sorbent material into the mercury-containing gas occurs upstream of an air pre-heater, a particulate separator, or scrubber.

Embodiment 45 provides the method of any one of Embodiments 28-44, further comprising adding an ammonium salt into the flue gas to produce a promoted ammonium salt-protected sorbent.

Embodiment 46 provides the method of Embodiment 45, wherein the ammonium salt is an ammonium halide, a methylammonium halide, an ammonium salt of an oxyacid of a Group VI element, an ammonium salt of an oxyacid of a Group V element, or a combination thereof.

Embodiment 47 provides the method of any one of Embodiments 45-46, wherein the ammonium salt is ammonium bromide, ammonium iodide, ammonium chloride, an organic halide with a formula of $CH_3NH_3X$ (wherein X is Cl, Br or I), ammonium sulfate, ammonium hydrogen sulfate, ammonium sulfite, ammonium hydrogen sulfite, ammonium persulfate, ammonium pyrosulfate, ammonium thiosulphate, ammonium dithionite, ammonium aluminium sulfate, ammonium iron sulfate, ammonium sulfamate, ammonium phosphate, diammonium phosphate, ammonium hydrogen phosphate, ammonium dihydrogen phosphate, ammonium thiophosate, ammonium nitrate, ammonium nitrite, ammonium carbonate, ammonium thiocyanate, ammonium sulfide, ammonium hydrogen sulfide, ammonium acetate, ammonium carbamate, ammonium carbonate, ammonium chlorate, ammonium chromate, ammonium fluoride, ammonium formate, ammonium hydroxide, ammonium perchlorate, or a combination thereof.

Embodiment 48 provides a method for separating mercury from a mercury-containing gas, the method comprising:

reacting mercury in a mercury-containing gas with a promoted carbon sorbent that is iodine-promoted, iodide-promoted, or a combination thereof, to form a mercury/sorbent composition; and separating the mercury/sorbent composition from the mercury-containing gas.

Embodiment 49 provides the method of Embodiment 48, wherein reacting the mercury in the mercury-containing gas with the promoted halogenated carbon sorbent to form the mercury/sorbent composition comprises reacting the mercury in the mercury-containing gas with the promoted halogenated carbon sorbent and with a promoted halogenated non-carbon sorbent to form the mercury/sorbent composition.

Embodiment 50 provides a method for separating mercury from a mercury containing gas comprising:

(a) providing a sorbent material;

(b) providing a halogen or halide promoter, wherein the halogen or halide promoter comprises iodine, iodide, or a combination thereof;

(c) promoting at least a portion of the sorbent material by chemically reacting the sorbent material with the halogen or halide promoter to form a promoted halogenated sorbent;

(d) chemically reacting elemental mercury in the mercury containing gas with the promoted halogenated sorbent to form a mercury/sorbent chemical composition; and (e) separating particulates from the mercury containing gas to form a cleaned gas, the particulates including ash and the first mercury/sorbent chemical composition.

Embodiment 51 provides the method of Embodiment 50, further comprising the step of adding the sorbent material and the halogen or halide promoter into the mercury containing gas.

Embodiment 52 provides the method of Embodiment 51, wherein said halogen or halide promoter and the sorbent material are added into the mercury containing gas at the same location.

Embodiment 53 provides the method of any one of Embodiments 51-52, wherein said halogen or halide promoter and the sorbent material are added into the mercury containing gas at separate locations.

Embodiment 54 provides the method of Embodiment 53, wherein said halogen or halide promoter is added into the mercury-containing gas upstream of the addition of said sorbent.

Embodiment 55 provides the method of Embodiment 54, wherein said halogen or halide promoter is added into a combustion chamber that produces a mercury-containing gas, and the sorbent is added downstream of the combustion chamber.

Embodiment 56 provides the method of Embodiment 55, wherein said halogen or halide promoter is additionally added downstream of the combustion chamber.

Embodiment 57 provides the method of any one of Embodiments 55-56, wherein said combustion chamber is a boiler and the mercury-containing gas is a flue gas.

Embodiment 58 provides the method of any one of Embodiments 52-57, wherein said halogen or halide promoter and sorbent are added downstream of a chamber that produces a mercury-containing gas.

Embodiment 59 provides the method of Embodiment 58, wherein said chamber is a boiler and the mercury-containing gas is a flue gas.

Embodiment 60 provides the method of any one of Embodiments 51-59, wherein the rate at which said sorbent is added or the rate at which said promoter is added or combination thereof is adjusted according to a monitored mercury content in the cleaned gas so that the mercury content of the cleaned gas is maintained at substantially a desired level.

Embodiment 61 provides the method of any one of Embodiments 50-60, wherein said sorbent comprises carbon based materials.

Embodiment 62 provides the method of Embodiment 61, wherein said sorbent comprises activated carbon.

Embodiment 63 provides the method of any one of Embodiments 50-62, wherein said sorbent is selected from the group consisting of noncarbon-based materials, including porous felsic materials, vesicular felsic materials, porous basaltic materials, vesicular basaltic materials, clay-based compounds, alkaline compounds, calcium hydroxide compounds, sodium acetate compounds, bicarbonate compounds, or combinations thereof.

Embodiment 64 provides the method of any one of Embodiments 62-63, wherein said sorbent is an activated carbon base material that reacts with oxidized mercury in the mercury-containing gas to form a second mercury/sorbent chemical composition.

Embodiment 65 provides the method of any one of Embodiments 63-64, wherein said sorbent is a non-carbon base material that reacts with oxidized mercury in the mercury-containing gas to form a second mercury/sorbent chemical composition.

Embodiment 66 provides the method of any one of Embodiments 50-65, wherein said sorbent is a non-carbon material that comprises Lewis basic groups.

Embodiment 67 provides the method of any one of Embodiments 50-66, wherein said sorbent is a carbon material that comprises Lewis acid groups.

Embodiment 68 provides the method of any one of Embodiments 50-67, wherein said sorbent includes both a carbon material and a non-carbon material.

Embodiment 69 provides the method of any one of Embodiments 63-68, wherein said non-carbon material comprises amorphous forms of tectosilicates comprising nanoscale cavities lined with Lewis basic oxygen associated with alkaline earth metals.

Embodiment 70 provides the method of Embodiment 69, wherein said alkaline-earth metals comprise Group I and Group II alkaline-earth metals.

Embodiment 71 provides the method of any one of Embodiments 62-70, wherein said non-carbon material comprises amorphous forms of phyllosilicates comprising nanoscale cavities lined with Lewis basic oxygen.

Embodiment 72 provides the method of any one of Embodiments 50-71, wherein said promoted sorbent comprises metastable complexes formed between said promoter and inorganic species on a non-carbon sorbent.

Embodiment 73 provides the method of Embodiment 72, wherein said inorganic species is selected from the group consisting of sodium compounds, calcium compounds, magnesium compounds, aluminum compounds, iron compounds, and combinations thereof.

Embodiment 74 provides the method of any one of Embodiments 50-73, wherein said promoted sorbent comprises metastable complexes formed between said promoter and metal-oxygen-metal structures on a non-carbon sorbent.

Embodiment 75 provides the method of any one of Embodiments 50-74, wherein the promoter is wherein the promoter is HCl, HBr, HI, $Br_2$, $Cl_2$, $I_2$, BrCl, IBr, ICl, ClF, $PBr_3$, $PCl_5$, $SCl_2$, $CuCl_2$, $CuBr_2$, $Al_2Br_6$, $FeI_x$ (x=1, 2, 3, or 4), $FeBr_y$ (y=1, 2, 3, or 4), $FeCl_z$ (z=1, 2, 3, or 4), $MnBr_2$, $MnCl_2$, $NiBr_2$, $NiCl_2$, $NiI_2$. $ZnBr_2$, $ZnCl_2$, $ZnI_2$, $NH_4Br$, $NH_4Cl$, $NH_4I$, $NH_4F$, or a combination thereof.

Embodiment 76 provides the method of any one of Embodiments 74-75, wherein said promoter after being complexed with the metal-oxygen-metal structures is in the form selected from the group consisting of a dihalogen group, a halogen atom, a hydrohalogen group, a Group V halide, a Group VI halide, and combinations thereof.

Embodiment 77 provides the method of any one of Embodiments 50-76, wherein the promoter is formed from a promoter precursor.

Embodiment 78 provides the method of Embodiment 77, wherein the promoter precursor is NaBr, NaCl, NaI, $Br^-$, $Cl^-$, $I^-$, KI, KCl, LiCl, LiBr, $CuCl_2$, $CuBr_2$, AgCl, AgBr, $CHI_3$. $CaI_2$, $CH_3Br$, AuBr, $FeI_x$ (x=1, 2, 3, or 4), $FeBr_y$ (y=1, 2, 3, or 4). $FeCl_z$ (z=1, 2, 3, or 4). $MgBr_2$, $MgCl_2$, $MnBr_2$, $MnCl_2$, $NiBr_2$, $NiCl_2$, $NiI_2$. $ZnBr_2$, $ZnCl_2$, $ZnI_2$, $CaI_2$, $CaBr_2$, $CaCl_2$, or a combination thereof.

Embodiment 79 provides the method of any one of Embodiments 50-78, further comprising adding an ammonium salt into the flue gas to produce a promoted ammonium salt-protected sorbent.

Embodiment 80 provides the method of Embodiment 79, wherein the ammonium salt is an ammonium halide, a methylammonium halide, an ammonium salt of an oxyacid of a Group VI element, an ammonium salt of an oxyacid of a Group V element, or a combination thereof.

Embodiment 81 provides the method of any one of Embodiments 79-80, wherein the ammonium salt is ammonium bromide, ammonium iodide, ammonium chloride, an organic halide with a formula of $CH_3NH_3X$ (wherein X is Cl, Br or I), ammonium sulfate, ammonium hydrogen sulfate, ammonium sulfite, ammonium hydrogen sulfite, ammonium persulfate, ammonium pyrosulfate, ammonium thiosulphate, ammonium dithionite, ammonium aluminium sulfate, ammonium iron sulfate, ammonium sulfamate, ammonium phosphate, diammonium phosphate, ammonium hydrogen phosphate, ammonium dihydrogen phosphate, ammonium thiophosate, ammonium nitrate, ammonium nitrite, ammonium carbonate, ammonium thiocyanate, ammonium sulfide, ammonium hydrogen sulfide, ammonium acetate, ammonium carbamate, ammonium carbonate, ammonium chlorate, ammonium chromate, ammonium fluoride, ammonium formate, ammonium hydroxide, ammonium perchlorate, or a combination thereof.

Embodiment 82 provides the method of any one of Embodiments 50-81, wherein said promoted sorbent comprises activated Lewis basic groups or activated Lewis acid groups or combination thereof.

Embodiment 83 provides the method of any one of Embodiments 50-82, wherein said interaction between promoted sorbent and said mercury-containing gas stream comprises:
mercury diffusing from the gas phase onto said promoted sorbent surface; and
reacting with activated Lewis basic groups or activated Lewis acid groups or combination thereof to cause chemisorption on the sorbent surface.

Embodiment 84 provides the method of any one of Embodiments 50-83, further comprising pretreating said sorbent to increase the number of Lewis basic groups or Lewis acid groups or combination thereof on said sorbent.

Embodiment 85 provides the method of Embodiment 84, wherein pretreating said sorbent comprises chemical treatment, thermal treatment, vacuum treatment, and combinations thereof.

Embodiment 86 provides the method of Embodiment 85, wherein said chemical treatment comprises acid treatment and alkaline treatment.

Embodiment 87 provides the method of any one of Embodiments 50-86, further comprising introducing an alkali component into the mercury-containing gas.

Embodiment 88 provides the method of any one of Embodiments 50-87, wherein a carbon sorbent is reacted with said promoter to produce a promoted carbon sorbent.

Embodiment 89 provides the method of Embodiment 88, wherein said carbon sorbent or said promoter or combination thereof are introduced into the mercury-containing gas at one or more locations.

Embodiment 90 provides the method of Embodiment 89, wherein the rate at which said carbon sorbent is introduced or the rate at which said promoter is introduced or combination thereof is adjusted according to a monitored mercury content in the cleaned gas so that the mercury content of the cleaned gas is maintained at substantially a desired level.

Embodiment 91 provides a method for separating mercury from a mercury-containing gas stream, the method comprising:
contacting a mercury-containing gas stream with a sorbent comprising promoted ammonium salt-protected sorbent particles, to form a mercury-sorbent composition, wherein the ammonium salt-protected sorbent particles are iodine-promoted, iodide-promoted, or a combination thereof; and
separating at least some of the mercury-sorbent composition from the mercury-containing gas stream, to give a separated gas.

Embodiment 92 provides the method of Embodiment 91, wherein the sorbent comprises activated carbon, wherein the promoted ammonium salt-protected sorbent particles comprise promoted ammonium salt-protected activated carbon sorbent particles.

Embodiment 93 provides the method of Embodiments 91-92, wherein the sorbent comprises a non-carbon sorbent, wherein the promoted ammonium salt-protected sorbent particles comprise promoted ammonium salt-protected non-carbon sorbent particles.

Embodiment 94 provides the method of Embodiment 91-93, further comprising combusting coal to form the mercury-containing gas stream.

Embodiment 95 provides the method of any one of Embodiments 91-94, wherein the mercury-containing gas stream comprises a concentration of sulfur(VI) that is about 1 ppm-2000 ppm.

Embodiment 96 provides the method of any one of Embodiments 91-95, wherein the sorbent combines with about 0.001 wt % to about 100 wt % of mercury in the mercury-containing gas stream to form the mercury-sorbent composition.

Embodiment 97 provides the method of any one of Embodiments 91-96, wherein the sorbent combines with at least about 70 wt % of mercury in the mercury-containing gas stream to form the mercury-sorbent composition.

Embodiment 98 provides the method of any one of Embodiments 91-97, wherein the sorbent is in a fixed bed, in a moving bed, in a scrubber, in a filter, suspended in the mercury-containing gas stream, or a combination thereof.

Embodiment 99 provides the method of any one of Embodiments 91-98, further comprising adding a sorbent into the mercury-containing gas stream, wherein
the added sorbent is the sorbent comprising the promoted ammonium salt-protected sorbent particles,
the added sorbent is a precursor of the sorbent comprising the promoted ammonium salt-protected sorbent particles with halide-promotion, ammonium salt-protection, or a combination thereof, occurring after the addition of the precursor, or
a combination thereof.

Embodiment 100 provides the method of Embodiment 99, wherein the added sorbent is the sorbent comprising the promoted ammonium salt-protected sorbent particles.

Embodiment 101 provides the method of any one of Embodiments 99-100, wherein the precursor is a promoted non-ammonium salt-protected sorbent, wherein the ammonium salt-protection occurs after addition of the precursor into the mercury-containing gas stream.

Embodiment 102 provides the method of any one of Embodiments 99-101, wherein the precursor is an ammonium salt-protected non-promoted sorbent, wherein the halide-promotion occurs after addition of the precursor into the mercury-containing gas stream.

Embodiment 103 provides the method of any one of Embodiments 99-102, wherein the precursor is a non-promoted non-ammonium salt-protected sorbent, wherein halide-promotion and ammonium salt-protection occurs after addition of the precursor in the mercury-containing gas stream.

Embodiment 104 provides the method of any one of Embodiments 91-103, wherein the sorbent comprises an alkaline component selected from the group consisting of alkali elements, alkaline earth elements, alkali salts, alkaline earth salts, and combinations thereof.

Embodiment 105 provides the method of any one of Embodiments 91-104, wherein the sorbent comprises a mercury-stabilizing reagent selected from the group consisting of S, Se, $H_2S$, $SO_2$, $H_2Se$, $SeO_2$, $CS_2$, $P_2S_5$, and combinations thereof.

Embodiment 106 provides the method of any one of Embodiments 91-105, wherein the sorbent further comprises a substrate comprising at least one of diatomaceous earth, a clay, a zeolite, or a mineral.

Embodiment 107 provides the method of Embodiment 106, wherein the sorbent comprises a product of subjecting a mixture comprising a carbonaceous material and the substrate to heating, microwaving, irradiating, or a combination thereof, comprises a material derived from the product via one or more of halide-promotion and ammonium salt-protection, or a combination thereof.

Embodiment 108 provides the method of Embodiment 107, wherein the heating comprises heating to about 100° C. to about 1200° C.

Embodiment 109 provides the method of any one of Embodiments 107-108, wherein the heating of the mixture comprising the carbonaceous material and the substrate to form the product thereof is performed prior to contacting the activated sorbent and the mercury-containing gas stream.

Embodiment 110 provides the method of any one of Embodiments 91-109, wherein the sorbent comprises a carbon nanocomposite sorbent.

Embodiment 111 provides the method of any one of Embodiments 91-110, wherein the promoted ammonium salt-protected sorbent particles comprise promoted ammonium salt-protected powdered activated carbon, granular activated carbon, carbon black, carbon fiber, aerogel carbon, pyrolysis char, or a combination thereof.

Embodiment 112 provides the method of Embodiment 111, wherein the promoted ammonium salt-protected powdered activated carbon, granular activated carbon, carbon black, carbon fiber, aerogel carbon, pyrolysis char, or a combination thereof have a particle size of about 0.1 μm to about 1000 μm.

Embodiment 113 provides the method of any one of Embodiments 111-112, wherein the promoted ammonium salt-protected powdered activated carbon, granular activated carbon, carbon black, carbon fiber, aerogel carbon, pyrolysis char, or a combination thereof have a particle size of about 0.1 μm to about 30 μm.

Embodiment 114 provides the method of any one of Embodiments 91-113, wherein the promoted ammonium salt-protected sorbent particles comprise a product of subjecting a mixture comprising a carbonaceous material and a nitrogenous material to heating, microwaving, irradiating, or a combination thereof, comprise a material derived from the product via one or more of halide-promotion and ammonium salt-protection, or a combination thereof.

Embodiment 115 provides the method of Embodiment 114, wherein the promoted ammonium salt-protected sorbent particles comprise a product of acid or base treatment of the product of subjecting a mixture comprising a carbonaceous material and a nitrogenous material to heating, microwaving, irradiating, or a combination thereof.

Embodiment 116 provides the method of any one of Embodiments 114-115, wherein the carbonaceous material comprises powdered activated carbon, granular activated carbon, carbon black, carbon fiber, aerogel carbon, pyrolysis char, brown sugar, barley sugar, caramel, cane sugar, corn syrup, starch, molasses, a glucan, a galactan, a xylan, a sugar waste product, or a combination thereof.

Embodiment 117 provides the method of any one of Embodiments 114-116, wherein the nitrogenous material comprises a nitrogen-containing organic or inorganic material.

Embodiment 118 provides the method of Embodiment 117, wherein the nitrogenous material comprises a nitrogen heterocycle, a nitrogen-containing polymer or copolymer, a nitrile, a carbamate, an amino acid, nitrobenzene, hydroxylamine, urea, hydrazine, sulfamic acid, an ammonium salt, or a combination thereof.

Embodiment 119 provides the method of any one of Embodiments 117-118, wherein the nitrogenous material comprises indole, quinoxaline, carbazole, isoquinoline, nitrobenzene, urea, sulfamic acid, polyvinylpyrrolidone, vinylpyrrolidone-vinyl acetate copolymer, vinylpyrrolidone-acrylic acid copolymer, vinylpyrrolidone-maleic acid copolymer, polyethylenimine, alanine, piperazine, quinolone, quinoxaline, diazabicyclooctane, an amino acid, an ammonium salt, or a combination thereof.

Embodiment 120 provides the method of any one of Embodiments 91-119, wherein the promoted ammonium salt-protected sorbent comprises a halide, a hydrogen halide, or a combination thereof.

Embodiment 121 provides the method of Embodiment 120, wherein the halide, hydrogen halide, or combination thereof is about 0.001 wt % to about 30 wt % of the promoted ammonium salt-protected sorbent.

Embodiment 122 provides the method of any one of Embodiments 120-121, wherein the halide, hydrogen halide, or combination thereof is about 1 wt % to about 15 wt % of the promoted ammonium salt-protected sorbent.

Embodiment 123 provides the method of any one of Embodiments 91-122, wherein the promoted ammonium salt-protected sorbent comprises ammonia, the ammonium salt, or a combination thereof.

Embodiment 124 provides the method of Embodiment 123, wherein the ammonia, the ammonium salt, or the combination thereof, is about 0.001 wt % to about 30 wt % of the promoted ammonium salt-protected sorbent.

Embodiment 125 provides the method of any one of Embodiments 123-124, wherein the ammonia, the ammonium salt, or the combination thereof, is about 0.01 wt % to about 15 wt % of the promoted ammonium salt-protected sorbent.

Embodiment 126 provides the method of any one of Embodiments 91-125, wherein the promoted ammonium salt-protected sorbent comprises an anionic counterion of the ammonium salt.

Embodiment 127 provides the method of Embodiment 126, wherein the anionic counterion of the ammonium salt is about 0.001 wt % to about 30 wt % of the promoted ammonium salt-protected sorbent.

Embodiment 128 provides the method of any one of Embodiments 126-127, wherein the anionic counterion of the ammonium salt is about 0.01 wt % to about 15 wt % of the promoted ammonium salt-protected sorbent.

Embodiment 129 provides the method of any one of Embodiments 91-128, wherein the promoted ammonium salt-protected sorbent particles comprise nitrogen atoms in at least a surface layer thereof.

Embodiment 130 provides the method of Embodiment 129, wherein the surface layer of the promoted ammonium salt-protected sorbent particles is a continuous surface layer.

Embodiment 131 provides the method of any one of Embodiments 129-130, wherein the surface layer of the promoted ammonium salt-protected sorbent particles has a thickness of about 0.001% to about 99% of a radius of the particles.

Embodiment 132 provides the method of any one of Embodiments 129-131, wherein the surface layer of the promoted ammonium salt-protected sorbent particles has a thickness of about 0.001% to about 50% of a radius of the particles.

Embodiment 133 provides the method of any one of Embodiments 129-132, wherein the surface layer of the promoted ammonium salt-protected sorbent particles comprises about 0.001 wt % to about 99 wt % nitrogen.

Embodiment 134 provides the method of any one of Embodiments 129-133, wherein the promoted ammonium salt-protected sorbent particles have an overall nitrogen atom concentration of about 0.001 wt % to about 50 wt %.

Embodiment 135 provides the method of any one of Embodiments 129-134, wherein a concentration of nitrogen atoms in the surface layer is greater than a concentration of nitrogen atoms in a core of the promoted ammonium salt-protected sorbent particles.

Embodiment 136 provides the method of Embodiment 135, wherein the core of the promoted ammonium salt-protected sorbent particles comprises about 0 wt % to about 99 wt % nitrogen atoms.

Embodiment 137 provides the method of any one of Embodiments 135-136, wherein the core of the promoted ammonium salt-protected sorbent particles comprises about 1 wt % to about 6 wt % nitrogen atoms.

Embodiment 138 provides the method of any one of Embodiments 135-137, wherein the surface layer of the promoted ammonium salt-protected sorbent particles comprises about 0.001 wt % to about 99 wt % nitrogen atoms.

Embodiment 139 provides the method of any one of Embodiments 135-138, wherein the surface layer of the promoted ammonium salt-protected sorbent particles comprises about 5 wt % to about 80 wt % nitrogen atoms.

Embodiment 140 provides the method of any one of Embodiments 129-139, wherein nitrogen atoms are substantially homogeneously distributed throughout the promoted ammonium salt-protected sorbent particles.

Embodiment 141 provides the method of any one of Embodiments 129-140, wherein the nitrogen in the surface layer decreases neutralization of carbocations in the promoted ammonium salt-protected sorbent particles by at least one of $SO_3$, $H_2SO_4$, and $HSO_4^{1-}$, as compared to corresponding promoted ammonium salt-protected sorbent particles comprising less or substantially no nitrogen in a corresponding particle surface layer.

Embodiment 142 provides the method of any one of Embodiments 129-141, wherein the nitrogen in the surface layer at least partially blocks carbocations in the promoted ammonium salt-protected sorbent particles from at least one of $SO_3$, $H_2SO_4$, and $HSO_4^{1-}$, as compared to a corresponding promoted ammonium salt-protected sorbent particles comprising less or substantially no nitrogen in a corresponding particle surface layer.

Embodiment 143 provides the method of any one of Embodiments 129-142, wherein the mercury-containing gas stream further comprises a concentration of sulfur(VI) that is greater than about 0 ppm by mole and the sorbent forms a mercury-sorbent composition at a higher absorption rate relative to a corresponding sorbent comprising less or substantially no ammonium salt-protection.

Embodiment 144 provides the method of any one of Embodiments 91-143, wherein the mercury-containing gas stream further comprises a concentration of sulfur(VI) that is greater than about 0 ppm by mole and the sorbent forms a mercury-sorbent composition at a higher absorption rate relative to a corresponding sorbent comprising at least one of a) less or substantially no halide- or halogen-promotion, wherein the sorbent comprising the sorbent particles is halide- or halogen-promoted, and b) less or substantially no ammonium salt-protection.

Embodiment 145 provides the method of any one of Embodiments 91-144, wherein the promoted ammonium salt-protected sorbent particles have a particle size of about 0.1 μm to about 1000 μm.

Embodiment 146 provides the method of any one of Embodiments 91-145, wherein the promoted ammonium salt-protected sorbent particles have a particle size of about 0.1 μm to about 10 μm.

Embodiment 147 provides the method of any one of Embodiments 91-146, wherein the promoted ammonium salt-protected sorbent particles are promoted prior to addition to the mercury-containing gas stream.

Embodiment 148 provides the method of any one of Embodiments 91-147, further comprising promoting precursor sorbent particles with a promoter to form promoted sorbent particles.

Embodiment 149 provides the method of Embodiment 148, wherein promoting precursor sorbent particles with the promoter comprises chemically reacting carbene species edge sites in the sorbent particles with the promoter.

Embodiment 150 provides the method of any one of Embodiments 148-149, wherein promoting precursor sorbent particles with the promoter comprises subjecting a mixture comprising the precursor sorbent particles and the promoter to heating, microwaving, irradiating, or a combination thereof.

Embodiment 151 provides the method of any one of Embodiments 148-150, wherein during the promoting the promoter is substantially in vapor or gaseous form.

Embodiment 152 provides the method of any one of Embodiments 148-151, wherein the promoting of the precursor sorbent particles occurs in-flight in the mercury-containing gas stream.

Embodiment 153 provides the method of any one of Embodiments 148-152, wherein the promoting of the precursor sorbent particles occurs prior to addition of the sorbent particles to the mercury-containing gas stream.

Embodiment 154 provides the method of any one of Embodiments 148-153, further comprising combusting coal that comprises the promoter, a promoter precursor, or a combination thereof.

Embodiment 155 provides the method of Embodiment 154, wherein the promoter precursor transforms into the promoter which then reacts with a precursor sorbent to give a promoted sorbent.

Embodiment 156 provides the method of any one of Embodiments 154-155, further comprising adding the promoter, promoter precursor, or a combination thereof, to the coal prior to the combustion thereof.

Embodiment 157 provides the method of Embodiment 156, wherein the promoter, promoter precursor, or a combination thereof, is added to the coal in an organic solvent.

Embodiment 158 provides the method of Embodiment 157, wherein the organic solvent is a hydrocarbon, a chlorinated hydrocarbon, supercritical carbon dioxide, or a combination thereof.

Embodiment 159 provides the method of any one of Embodiments 148-158, wherein the promoting occurs in an aqueous scrubber, wherein the scrubber comprises an aqueous slurry that comprises the promoter.

Embodiment 160 provides the method of any one of Embodiments 148-159, further comprising adding into the mercury-containing gas stream the promoter, a promoter precursor, or a combination thereof.

Embodiment 161 provides the method of Embodiment 160, wherein the promoter, promoter precursor, or a combination thereof, is added together with the precursor sorbent particles into the mercury-containing gas stream.

Embodiment 162 provides the method of any one of Embodiments 160-161, wherein the promoter, promoter precursor, or a combination thereof, is added into the mercury-containing gas stream separately from addition of the precursor sorbent particles into the mercury-containing gas stream.

Embodiment 163 provides the method of any one of Embodiments 148-162, wherein the promoter is HCl, HBr, HI, $Br_2$, $Cl_2$, $I_2$, BrCl, IBr, ICl, ClF, $PBr_3$, $PCl_5$, $SCl_2$, $CuCl_2$, $CuBr_2$, $Al_2Br_6$, $FeI_x$ (x=1, 2, 3, or 4), $FeBr_y$ (y=1, 2, 3, or 4), $FeCl_z$ (z=1, 2, 3, or 4), $MnBr_2$, $MnCl_2$, $NiBr_2$, $NiCl_2$, $NiI_2$, $ZnBr_2$, $ZnCl_2$, $ZnI_2$, $NH_4Br$, $NH_4C$, $NH_4I$, $NH_4F$, or a combination thereof.

Embodiment 164 provides the method of any one of Embodiments 148-163, wherein the promoter is HBr.

Embodiment 165 provides the method of any one of Embodiments 148-164, further comprising forming the promoter from a promoter precursor.

Embodiment 166 provides the method of Embodiment 165, wherein the promoter precursor is an elemental halogen, a Group V halide, a Group VI halide, a hydrohalide, an ammonium halide, a metal halide, a nonmetal halide, an alkali earth metal halide, an alkaline earth metal halide, or a combination thereof.

Embodiment 167 provides the method of any one of Embodiments 165-166, wherein the promoter precursor is NaBr, NaCl, NaI, $Br^-$, $Cl^-$, $I^-$, KI, KCl, LiCl, LiBr, $CuCl_2$, $CuBr_2$, AgCl, AgBr, $CHI_3$, $CaI_2$, $CH_3Br$, AuBr, $FeI_x$ (x=1, 2, 3, or 4), $FeBr_y$ (y=1, 2, 3, or 4), $FeCl_z$ (z=1, 2, 3, or 4), $MgBr_2$, $MgCl_2$, $MnBr_2$, $MnCl_2$, $NiBr_2$, $NiCl_2$, $NiI_2$, $ZnBr_2$, $ZnCl_2$, $ZnI_2$, $CaI_2$, $CaBr_2$, $CaCl_2$, or a combination thereof.

Embodiment 168 provides the method of any one of Embodiments 165-167, wherein the promoter precursor has a particle size of about 0.1 μm to about 1000 μm.

Embodiment 169 provides the method of any one of Embodiments 91-168, further comprising protecting promoted sorbent particles with an ammonium salt, to form the promoted ammonium salt-protected sorbent particles.

Embodiment 170 provides the method of Embodiment 169, wherein protecting promoted sorbent particles with the ammonium salt comprises subjecting a mixture comprising the promoted sorbent particles and the ammonium salt to heating, microwaving, irradiating, or a combination thereof.

Embodiment 171 provides the method of Embodiment 170, wherein the mixture comprising the promoted sorbent particles and the ammonium salt has a ratio of the promoted sorbent particles to the ammonium salt of about 1:100 to about 100:1.

Embodiment 172 provides the method of any one of Embodiments 170-171, wherein the mixture comprising the promoted sorbent particles and the ammonium salt has a ratio of the promoted sorbent particles to the ammonium salt of about 1:1 to about 1:5.

Embodiment 173 provides the method of any one of Embodiments 91-172, wherein the promoted ammonium salt-protected sorbent particles are ammonium salt-protected prior to addition to the mercury-containing gas stream.

Embodiment 174 provides the method of any one of Embodiments 169-173, wherein the ammonium salt-protection of the promoted sorbent particles or of precursor sorbent particles occurs in-flight in the mercury-containing gas stream.

Embodiment 175 provides the method of any one of Embodiments 169-174, wherein the ammonium salt-protection of the promoted sorbent particles or of precursor sorbent particles occurs prior to addition of the promoted sorbent particles to the mercury-containing gas stream.

Embodiment 176 provides the method of any one of Embodiments 169-175, further comprising combusting coal that comprises the ammonium salt.

Embodiment 177 provides the method of any one of Embodiments 169-176, further comprising adding into the mercury-containing gas stream the ammonium salt.

Embodiment 178 provides the method of Embodiment 177, wherein the ammonium salt is added together with the promoted sorbent particles or precursor sorbent particles into the mercury-containing gas stream.

Embodiment 179 provides the method of any one of Embodiments 177-178, wherein the ammonium salt is added into the mercury-containing gas stream separately from addition of the promoted sorbent particles or precursor sorbent particles into the mercury-containing gas stream.

Embodiment 180 provides the method of any one of Embodiments 169-179, wherein the ammonium salt is an ammonium halide, a methylammonium halide, an ammonium salt of an oxyacid of a Group VI element, an ammonium salt of an oxyacid of a Group V element, or a combination thereof.

Embodiment 181 provides the method of any one of Embodiments 169-180, wherein the ammonium salt is ammonium bromide, ammonium iodide, ammonium chloride, an organic halide with a formula of $CH_3NH_3X$ (wherein X is Cl, Br or I), ammonium sulfate, ammonium hydrogen sulfate, ammonium sulfite, ammonium hydrogen sulfite, ammonium persulfate, ammonium pyrosulfate, ammonium thiosulphate, ammonium dithionite, ammonium aluminium sulfate, ammonium iron sulfate, ammonium sulfamate, ammonium phosphate, diammonium phosphate, ammonium hydrogen phosphate, ammonium dihydrogen phosphate, ammonium thiophosate, ammonium nitrate, ammonium nitrite, ammonium carbonate, ammonium thiocyanate, ammonium sulfide, ammonium hydrogen sulfide, ammonium acetate, ammonium carbamate, ammonium carbonate, ammonium chlorate, ammonium chromate, ammonium fluoride, ammonium formate, ammonium hydroxide, ammonium perchlorate, or a combination thereof.

Embodiment 182 provides the method of any one of Embodiments 169-181, wherein the ammonium salt is ammonium sulfate.

Embodiment 183 provides the method of any one of Embodiments 169-182, wherein the ammonium salt has a particle size of about 0.1 μm to about 1000 μm.

Embodiment 184 provides the method of any one of Embodiments 169-183, wherein the ammonium salt has a particle size of about 0.1 μm to about 10 μm.

Embodiment 185 provides the method of any one of Embodiments 91-184, wherein contacting the mercury-containing gas stream with the sorbent comprising promoted ammonium salt-protected sorbent particles to form the mercury-sorbent composition comprises chemically reacting the mercury in the mercury-containing gas stream with the promoted ammonium salt-protected sorbent.

Embodiment 186 provides the method of any one of Embodiments 91-185, wherein the promoted ammonium salt-protected sorbent particles comprise active sites, wherein the active sites comprise halide anions bound to the sorbent particles.

Embodiment 187 provides the method of any one of Embodiments 91-186, wherein the promoted ammonium salt-protected sorbent particles comprise active sites, wherein the active sites comprise carbocations bound to halide anions.

Embodiment 188 provides the method of any one of Embodiments 91-187, wherein carbocations in the promoted ammonium salt-protected sorbent particles accept electrons from mercury atoms of the mercury-sorbent particulate.

Embodiment 189 provides the method of any one of Embodiments 91-188, wherein in the promoted ammonium salt-protected sorbent particles ammonia or an anionic ammonium counterion derived from the ammonium salt intercepts $SO_2$, $SO_3$, $NO_x$, selenates, or a combination thereof, in the mercury-containing gas stream, preventing reaction thereof with active carbon sites in the promoted ammonium salt-protected.

Embodiment 190 provides the method of any one of Embodiments 91-189, wherein ammonia or an anionic ammonium counterion derived from the ammonium salt intercepts $SO_3$ in the mercury-containing gas stream, preventing reaction thereof with active carbon sites in the promoted ammonium salt-protected.

Embodiment 191 provides the method of any one of Embodiments 91-190, wherein the separating at least some of the mercury-sorbent composition from the mercury-containing gas stream comprises separating in a particulate separator.

Embodiment 192 provides the method of Embodiment 191, wherein the particulate separator comprises an electrostatic precipitator (ESP), a baghouse, a wet scrubber, a filter, cyclone, fabric separator, or any combination thereof.

Embodiment 193 provides the method of any one of Embodiments 91-192, further comprising regenerating the mercury-sorbent composition to give a regenerated sorbent.

Embodiment 194 provides the method of any one of Embodiments 91-193, wherein the contacting, the separating, or a combination thereof, occurs in an aqueous scrubber.

Embodiment 195 provides the method of Embodiment 194, wherein the scrubber comprises an aqueous slurry that comprises the sorbent.

Embodiment 196 provides a method for separating mercury from a mercury-containing gas stream, the method comprising:

contacting a mercury-containing gas stream with an activated carbon sorbent comprising HI-promoted ammonium sulfate-protected activated carbon sorbent particles, to form a mercury-sorbent composition; and separating at least some of the mercury-sorbent composition from the mercury-containing gas stream, to give a separated gas.

Embodiment 197 provides ammonium salt-protected activated carbon sorbent particles comprising active sites that bind with mercury atoms, wherein the active sites comprise carbocations bound to promoter anions, and ammonia, an ammonium salt, or a combination thereof, in at least a surface layer thereof.

Embodiment 198 provides the ammonium salt-protected activated carbon sorbent particles of Embodiment 197, wherein the ammonium salt-protected activated carbon sorbent particles are promoted ammonium salt-protected activated carbon sorbent particles comprising active sites that bind with mercury atoms, wherein the active sites comprise carbocations bound to promoter anions.

Embodiment 199 provides the ammonium salt-protected activated carbon sorbent particles of any one of Embodiments 197-198, wherein the promoted ammonium salt-protected activated carbon sorbent particles further comprise an anionic counterion.

Embodiment 200 provides the ammonium salt-protected activated carbon sorbent particles of any one of Embodiments 198-199, wherein the anionic counterion is derived from the ammonium salt.

Embodiment 201 provides a method of making the ammonium salt-protected activated carbon particles of any one of Embodiments 197-200, the method comprising:

subjecting a mixture comprising a precursor activated carbon sorbent and an ammonium salt to heating, microwaving, irradiation, or a combination thereof, to form an activated carbon sorbent comprising the ammonium salt-protected activated carbon sorbent particles.

Embodiment 202 provides the method of Embodiment 201, wherein the precursor activated carbon sorbent is a promoted activated carbon sorbent.

Embodiment 203 provides the method of any one of Embodiments 201-202, further comprising promoting an activated carbon with a promoter to provide the precursor activated carbon sorbent.

Embodiment 204 provides a method for separating mercury from a mercury-containing gas stream, the method comprising:

contacting a mercury-containing gas stream with a sorbent comprising promoted or non-promoted activated carbon sorbent particles and ammonia, to form a mercury-sorbent composition; and separating at least some of the mercury-sorbent composition from the mercury-containing gas stream, to give a separated gas.

Embodiment 205 provides the method of Embodiment 204, wherein the ammonia or a precursor thereof is added into the mercury-containing gas stream.

Embodiment 206 provides the Embodiment of any one or any combination of Embodiments 1-205 optionally configured such that all elements or options recited are available to use or select from.

What is claimed is:

1. A method of separating mercury from a mercury-containing gas, the method comprising:
   combusting in a combustion chamber
      coal fed to the combustion chamber, and
      a halogen or halide promoter, a promoter precursor that transforms into the promoter, or combination thereof, added to the coal, added to the combustion chamber, or a combination thereof,
   to provide the mercury-containing gas, wherein
      the mercury-containing gas comprises the halogen or halide promoter,
      the halogen or halide promoter and promoter precursor comprises iodine ($I_2$), iodide ($I^-$), or a combination thereof, and
      the $I_2$, $I^-$, or the combination thereof added to the combustion chamber, added to the coal, or a combination thereof is about 1 to about 3000 ppmw per weight of the coal fed to the combustion chamber;
   adding an ammonium salt into the mercury-containing gas;
   adding a sorbent material into the mercury-containing gas downstream of the combustion chamber such that the sorbent material contacts the halogen or halide promoter in the mercury-containing gas;

contacting mercury in the mercury-containing gas with the sorbent, to form a mercury/sorbent composition; and separating the mercury/sorbent composition from the mercury-containing gas.

2. The method of claim 1, comprising adding the promoter into the combustion chamber, placing the promoter on the coal prior to combusting the coal, adding the promoter precursor into the combustion chamber that transforms into the promoter, placing the promoter precursor on the coal prior to combusting the coal, or a combination thereof.

3. The method of claim 1, wherein at least one of the promoter and the promoter precursor is independently IBr, ICl, $FeI_x$ (x=1, 2, 3, or 4), $NiI_2$, $ZnI_2$, $NH_4I$, NaI, $I^-$, KI, $CHI_3$, $CaI_2$, or a combination thereof.

4. The method of claim I, wherein the halogen or halide promoter comprises HI, a Group V iodide, a Group VI iodide, or a combination thereof.

5. The method of claim 1, further comprising adding a secondary material into the mercury-containing gas downstream of the combustion chamber, wherein the secondary material comprises an alkaline material, a clay, halogen, a compound derived from a halogen, a hydrohalide, a compound comprising a Group V or Group VI element and a molecular halogen, or a combination thereof.

6. The method of claim I, wherein the sorbent material added into the mercury-containing gas comprises at least one of a carbon sorbent material and a non-carbon sorbent material.

7. The method of claim 6, wherein the carbon sorbent material is activated carbon.

8. The method of claim 1, wherein the ammonium salt is ammonium bromide, ammonium iodide, ammonium chloride, an organic halide with a formula of $CH_3NH_3X$ (wherein X is Cl, Br or I), ammonium sulfate, ammonium hydrogen sulfate, ammonium sulfite, ammonium hydrogen sulfite, ammonium persulfate, ammonium pyrosulfate, ammonium thiosulphate, ammonium dithionite, ammonium aluminum sulfate, ammonium iron sulfate, ammonium sulfamate, ammonium phosphate, diammonium phosphate, ammonium hydrogen phosphate, ammonium dihydrogen phosphate, ammonium thiophosate, ammonium nitrate, ammonium nitrite, ammonium carbonate, ammonium thiocyanate, ammonium sulfide, ammonium hydrogen sulfide, ammonium acetate, ammonium carbamate, ammonium carbonate, ammonium chlorate, ammonium chromate, ammonium fluoride, ammonium formate, ammonium hydroxide, ammonium perchlorate, or a combination thereof.

9. The method of claim 1, wherein the ammonium salt is ammonium sulfate.

10. The method of claim 1, wherein the sorbent comprises activated carbon.

11. The method of claim 1, wherein the sorbent comprises a non-carbon sorbent.

12. The method of claim 1, wherein the sorbent material added to the mercury-containing gas comprises a non-promoted non-ammonium salt-protected sorbent.

13. The method of claim 1, wherein adding the ammonium salt into the mercury-containing gas forms ammonium salt-protected activated carbon sorbent particles comprising active sites that bind with mercury atoms, wherein the active sites comprise carbocations bound to iodide-promoter anions, and ammonia, an ammonium salt, or a combination thereof, in at least a surface layer thereof.

14. The method of claim 1, comprising adding the promoter into the combustion chamber, placing the promoter on the coal prior to combusting the coal, or a combination thereof.

15. The method of claim 1, comprising adding the promoter precursor into the combustion chamber that transforms into the promoter, placing the promoter precursor on the coal prior to combusting the coal, or a combination thereof.

16. The method of claim 1, wherein the $I_2$, $I^-$, or the combination thereof added to the combustion chamber, added to the coal, or a combination thereof is about 1 to about 1000 ppmw per weight of the coal fed to the combustion chamber.

17. The method of claim 1, wherein the $I_2$, $I^-$, or the combination thereof added to the combustion chamber, added to the coal, or a combination thereof is about 1 to about 500 ppmw per weight of the coal fed to the combustion chamber.

18. The method of claim 1, wherein the $I_2$, $I^-$, or the combination thereof added to the combustion chamber, added to the coal, or a combination thereof is about 0.001 wt % to about 30 wt % of the sorbent material added to the mercury-containing gas.

19. The method of claim 1, wherein the $I_2$, $I^-$, or the combination thereof added to the combustion chamber, added to the coal, or a combination thereof is about 0.1 wt % to about 30 wt % of the sorbent material added to the mercury-containing gas.

20. The method of claim 1, wherein the $I_2$, $I^-$, or the combination thereof added to the combustion chamber added to the coal, or a combination thereof is about 1 wt % to about 30 wt % of the sorbent material added to the mercury-containing gas.

21. A method of separating mercury from a mercury-containing gas, the method comprising:

combusting in a combustion chamber coal fed to the combustion chamber, and a halogen or halide promoter, a promoter precursor that transforms into the promoter, or a combination thereof, added to the coal, added to the combustion chamber, or a combination thereof, to provide the mercury-containing gas, when the mercury-containing gas comprises the halogen or halide promoter, and the halogen or halide promoter and promoter precursor comprises iodine ($I_2$), iodide ($I^-$), or a combination thereof;

adding an ammonium salt into the mercury-containing gas;

adding a sorbent material into the mercury-containing gas downstream of the combustion chamber such that the sorbent material contacts the halogen or halide promoter in the mercury-containing gas, wherein the $I_2$, $I^-$, or the combination thereof added to the combustion chamber, added to the coal, or a combination thereof is about 0.001 wt % to about 30 wt % of the sorbent material added to the mercury-containing gas;

contacting mercury in the mercury-containing gas with the sorbent, to form a mercury/sorbent composition; and separating the mercury/sorbent composition from the mercury-containing gas.

22. The method of claim 21, wherein the $I_2$, $I^-$, or the combination thereof added to the combustion chamber, added to the coal, or a combination thereof is about 30 wt % of the sorbent material added to the mercury-containing gas.

23. The method of claim 21, wherein the $I_2$, $I^-$, or the combination thereof added to the combustion chamber, added to the coal, or a combination thereof is about 1 wt % to about 30 wt % of the sorbent material added to the mercury-containing gas.

\* \* \* \* \*